United States Patent
Nakao et al.

(10) Patent No.: US 12,272,390 B2
(45) Date of Patent: Apr. 8, 2025

(54) MAGNETIC TAPE CARTRIDGE, MAGNETIC TAPE DRIVE, MAGNETIC TAPE SYSTEM, AND METHOD OF OPERATING MAGNETIC TAPE DRIVE

(71) Applicant: FUJIFILM Corporation, Tokyo (JP)

(72) Inventors: Toru Nakao, Kanagawa (JP); Norihito Kasada, Kanagawa (JP); Tetsuya Kaneko, Kanagawa (JP); Atsushi Musha, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/170,683

(22) Filed: Feb. 17, 2023

(65) Prior Publication Data

US 2023/0206948 A1    Jun. 29, 2023

Related U.S. Application Data

(63) Continuation of application No. PCT/JP2021/028500, filed on Jul. 30, 2021.

(30) Foreign Application Priority Data

Aug. 28, 2020   (JP) ................................ 2020-144964
Jun. 25, 2021   (JP) ................................ 2021-106103

(51) Int. Cl.
  *G11B 5/58*   (2006.01)
  *G11B 5/584*  (2006.01)
  (Continued)

(52) U.S. Cl.
  CPC .............. *G11B 5/584* (2013.01); *G11B 15/43* (2013.01); *G11B 23/027* (2013.01)

(58) Field of Classification Search
None
See application file for complete search history.

(56) References Cited

U.S. PATENT DOCUMENTS 6,222,698 B1 *   4/2001   Barndt ............... G11B 5/00813
6,965,490 B2 *   11/2005  Ito ............................ G11B 5/52
(Continued)

FOREIGN PATENT DOCUMENTS

EP      1378891 A1 *   1/2004    ............... G11B 5/52
JP      11-353630 A    12/1999
(Continued)

OTHER PUBLICATIONS

Japanese Office Action issued Jul. 25, 2023 in Application No. 2021-106103.
(Continued)

*Primary Examiner* — William J Klimowicz
(74) *Attorney, Agent, or Firm* — Sughrue Mion, PLLC

(57) ABSTRACT

A magnetic tape cartridge includes a case in which a magnetic tape is accommodated and a storage medium provided in the case. At least one of reading or writing of data is performed by a plurality of magnetic elements, which are linearly disposed, with respect to the magnetic tape pulled out from the case. A disposition direction of the plurality of magnetic elements is tilted toward an entire length direction side of the magnetic tape with respect to a width direction of the magnetic tape. The storage medium stores tilt feature information indicating a feature of tilt of the disposition direction with respect to the width direction.

21 Claims, 32 Drawing Sheets

(51) Int. Cl.
*G11B 15/43* (2006.01)
*G11B 23/027* (2006.01)

(56) References Cited

U.S. PATENT DOCUMENTS

| | | | | |
|---|---|---|---|---|
| 8,797,682 | B1* | 8/2014 | Biskeborn | G11B 5/00826 360/121 |
| 8,810,957 | B1* | 8/2014 | Biskeborn | G11B 5/00826 360/85 |
| 9,007,712 | B1* | 4/2015 | Biskeborn | G11B 5/56 360/76 |
| 9,105,291 | B1* | 8/2015 | Biskeborn | G11B 5/56 |
| 9,117,470 | B1* | 8/2015 | Bui | G11B 5/4893 |
| 9,129,614 | B2* | 9/2015 | Biskeborn | G11B 5/4893 |
| 9,208,809 | B2* | 12/2015 | Biskeborn | G11B 5/115 |
| 9,218,838 | B2* | 12/2015 | Biskeborn | G11B 5/584 |
| 9,449,628 | B2* | 9/2016 | Biskeborn | G11B 5/4893 |
| 9,997,184 | B1* | 6/2018 | Bui | G11B 5/584 |
| 10,460,757 | B1* | 10/2019 | Judd | G11B 5/59633 |
| 11,145,329 | B2 | 10/2021 | Anno et al. | |
| 11,295,772 | B1* | 4/2022 | Watson | G11B 5/00813 |
| 11,373,681 | B2 | 6/2022 | Tochikubo et al. | |
| 11,373,683 | B2* | 6/2022 | Watson | G11B 15/093 |
| 11,783,857 | B2* | 10/2023 | Biskeborn | G11B 5/56 360/78.02 |
| 2004/0114266 | A1 | 6/2004 | Urano et al. | |
| 2004/0120070 | A1 | 6/2004 | Ito | |
| 2007/0285831 | A1* | 12/2007 | Goker | G11B 5/584 |
| 2009/0128949 | A1* | 5/2009 | Matsuno | G11B 5/584 |
| 2011/0043940 | A1* | 2/2011 | Wagner | G11B 5/0245 |
| 2012/0206832 | A1* | 8/2012 | Hamidi | G11B 5/584 360/75 |
| 2013/0100554 | A1* | 4/2013 | Biskeborn | G11B 5/584 |
| 2014/0016226 | A1* | 1/2014 | Bui | G11B 20/10305 360/75 |
| 2014/0327983 | A1* | 11/2014 | Biskeborn | G11B 5/00817 360/70 |
| 2014/0327984 | A1* | 11/2014 | Biskeborn | G11B 5/00826 360/71 |
| 2014/0327987 | A1* | 11/2014 | Biskeborn | G11B 5/29 360/76 |
| 2014/0334033 | A1* | 11/2014 | Biskeborn | G11B 5/00826 360/134 |
| 2015/0302875 | A1* | 10/2015 | Cherubini | G11B 27/19 360/77.12 |
| 2017/0372735 | A1* | 12/2017 | Biskeborn | G11B 5/531 |
| 2021/0125633 | A1* | 4/2021 | Jurneke | G11B 5/5928 |
| 2021/0233567 | A1* | 7/2021 | Tochikubo | G11B 15/43 |
| 2021/0249044 | A1 | 8/2021 | Nakashio et al. | |
| 2022/0108725 | A1* | 4/2022 | Watson | G11B 5/00813 |
| 2022/0180897 | A1* | 6/2022 | Biskeborn | G11B 5/29 |
| 2022/0254370 | A1 | 8/2022 | Yamaga et al. | |
| 2023/0104452 | A1* | 4/2023 | Kasada | G11B 5/71 428/840.2 |

FOREIGN PATENT DOCUMENTS

| | | |
|---|---|---|
| JP | 2003-257152 A | 9/2003 |
| JP | 2003-323266 A | 11/2003 |
| JP | 2004-39074 A | 2/2004 |
| JP | 2005-174484 A | 6/2005 |
| JP | 6669302 B1 | 3/2020 |
| JP | 6669326 B1 | 3/2020 |
| JP | 6747570 B1 | 8/2020 |
| WO | 2019/216015 A1 | 11/2019 |
| WO | 2020/027331 A1 | 2/2020 |

OTHER PUBLICATIONS

International Search Report for PCT/JP2021/028500 dated Oct. 26, 2021.
Written Opinion for PCT/JP2021/028500 dated Oct. 26, 2021.
International Preliminary Report on Patentability issued Feb. 28, 2023 in Application No. PCT/JP2021/028500.

* cited by examiner

IDEAL SERVO PATTERN

ACTUAL SERVO PATTERN

| SERVO BAND | SERVO POSITION | DISTANCE D [μm] | SERVO DISTANCE [μm] |
|---|---|---|---|
| 0 | 1 | 21.389 | 39.074 |
| | 2 | 22.613 | 35.195 |
| | 3 | 23.837 | 31.316 |
| | 4 | 25.062 | 27.434 |
| | 5 | 26.286 | 23.555 |
| | ... | ... | ... |
| | 19 | 31.874 | −39.074 |
| 1 | ... | ... | ... |
| ... | ... | ... | ... |

| SERVO BAND | SERVO POSITION | PITCH [μm] |
|---|---|---|
| 0 | 1 | 2858.92 |
|   | 2 | 2858.95 |
|   | 3 | 2858.87 |
|   | 4 | 2858.88 |
|   | 5 | 2858.95 |
|   | ... | ... |
|   | 12 | 2858.98 |
| 1 | ... | ... |
| ... | ... | ... |

142

MAGNETIC TAPE CARTRIDGE, MAGNETIC TAPE DRIVE, MAGNETIC TAPE SYSTEM, AND METHOD OF OPERATING MAGNETIC TAPE DRIVE

CROSS-REFERENCE TO RELATED APPLICATIONS

This application is a continuation application of International Application No. PCT/JP2021/028500, filed Jul. 30, 2021, the disclosure of which is incorporated herein by reference in its entirety. Further, this application claims priority from Japanese Patent Application No. 2020-144964, filed Aug. 28, 2020, and Japanese Patent Application No. 2021-106103, filed Jun. 25, 2021, the disclosures of which are incorporated herein by reference in its entirety.

BACKGROUND

1. Technical Field

The technology of the present disclosure relates to a magnetic tape cartridge, a magnetic tape drive, a magnetic tape system, and a method of operating a magnetic tape drive.

2. Related Art

A cartridge memory that stores information is mounted in a magnetic tape cartridge in which a magnetic tape is accommodated. JP6669326B discloses that information at a time of data recording in a magnetic tape drive is stored in a cartridge memory and the information is read out from the cartridge memory at a time of data reading for reference. The information includes information on tension applied to a running magnetic tape at the time of data recording.

JP6669302B discloses a cartridge including a cartridge case that accommodates a magnetic tape, and a memory that is provided in the cartridge case and that stores information before data recording on the magnetic tape, which is information for adjusting a width of the magnetic tape during data recording or data reproduction with respect to the magnetic tape.

SUMMARY

A magnetic tape cartridge is used by being loaded into a magnetic tape drive. The magnetic tape drive is provided with a head. The head reads and writes data with respect to the magnetic tape pulled out from the magnetic tape cartridge in the magnetic tape drive. In order to accurately read and write data with respect to a designated track in the magnetic tape, it is necessary to accurately match a position of a magnetic element in the head with a position of the track through a tracking control in a width direction of the magnetic tape.

The tracking control is realized by using a plurality of servo patterns and a plurality of servo reading elements. The plurality of servo patterns are formed on the magnetic tape, and the plurality of servo reading elements are mounted on the head. In the magnetic tape, the plurality of servo patterns are formed at positions spaced apart from each other in the width direction of the magnetic tape along an entire length direction of the magnetic tape, and the plurality of servo reading elements are disposed so as to correspond to the plurality of servo patterns, in the head. In order to enhance the tracking control, as a premise, it is necessary to accurately match positions of the plurality of servo reading elements and positions of the plurality of servo patterns with each other.

However, a size of the magnetic tape in the width direction may vary depending on, for example, a stress applied to the magnetic tape in a state of being wound on a reel in the magnetic tape cartridge, an environment of storage of the magnetic tape, and/or a time of storage in a state in which the magnetic tape is not used.

An embodiment according to the technology of the present disclosure provides a magnetic tape cartridge, a magnetic tape drive, a magnetic tape system, and a method of operating a magnetic tape drive capable of contributing to a correction of a positional relationship between a magnetic tape and a plurality of magnetic elements even in a case where the magnetic tape has been deformed in a width direction.

According to a first aspect of the technology of the present disclosure, there is provided a magnetic tape cartridge comprising: a case in which a magnetic tape is accommodated; and a storage medium provided in the case, in which at least one of reading or writing of data is performed by a plurality of magnetic elements, which are linearly disposed, with respect to the magnetic tape pulled out from the case, a disposition direction of the plurality of magnetic elements is tilted toward an entire length direction side of the magnetic tape with respect to a width direction of the magnetic tape, and the storage medium stores tilt feature information indicating a feature of tilt of the disposition direction with respect to the width direction.

According to a second aspect of the technology of the present disclosure, in the magnetic tape cartridge according to the first aspect, the feature includes a direction of the tilt.

According to a third aspect of the technology of the present disclosure, in the magnetic tape cartridge according to the second aspect, the magnetic tape has a plurality of tracks, the plurality of magnetic elements correspond to the plurality of tracks, respectively, and adjacent tracks, among the plurality of tracks, are assigned directions opposite to each other as the direction.

According to a fourth aspect of the technology of the present disclosure, in the magnetic tape cartridge according to any one of the first to third aspects, the feature includes an angle of the tilt.

According to a fifth aspect of the technology of the present disclosure, in the magnetic tape cartridge according to any one of the first to fourth aspects, the storage medium includes an internal memory of a noncontact communication medium where reading and writing of information are performed in a noncontact manner by a noncontact reading and writing device.

According to a sixth aspect of the technology of the present disclosure, in the magnetic tape cartridge according to any one of the first to fifth aspects, the storage medium includes a partial region of the magnetic tape.

According to a seventh aspect of the technology of the present disclosure, in the magnetic tape cartridge according to any one of the first to sixth aspects, the storage medium further stores pitch information capable of specifying a pitch in the width direction between the plurality of servo bands.

According to an eighth aspect of the technology of the present disclosure, in the magnetic tape cartridge according to the seventh aspect, the pitch information includes pitches at a plurality of positions in the width direction in the plurality of servo bands.

According to a ninth aspect of the technology of the present disclosure, in the magnetic tape cartridge according to the eighth aspect, the storage medium further stores servo pattern distance information in which the plurality of positions in the width direction in the plurality of servo bands and distances in an entire length direction of the magnetic tape at the plurality of positions between a pair of magnetization regions constituting a servo pattern formed in each of the plurality of servo bands are associated with each other, and the pitches correspond to positions of the plurality of magnetic elements in the width direction in the plurality of servo bands, the positions being detected by using the servo pattern distance information.

According to a tenth aspect of the technology of the present disclosure, in the magnetic tape cartridge according to the eighth or ninth aspect, the pitches are calculated on the basis of a result of reading the plurality of servo bands through a plurality of servo reading elements and a distance between the plurality of servo reading elements, in a stage before data recording is performed by the magnetic tape drive with respect to the magnetic tape.

According to an eleventh aspect of the technology of the present disclosure, there is provided a magnetic tape drive in which the magnetic tape cartridge according to any one of the first to tenth aspects is loaded, the magnetic tape drive comprising: a tilting mechanism that tilts a head on which the plurality of magnetic elements are mounted toward an entire length direction side of the magnetic tape with respect to a width direction of the magnetic tape; and a control device that controls the tilting mechanism according to the tilt feature information stored in the storage medium.

According to a twelfth aspect of the technology of the present disclosure, in the magnetic tape drive according to the eleventh aspect, a tension applying mechanism that applies tension to the magnetic tape is further provided.

According to a thirteenth aspect of the technology of the present disclosure, in the magnetic tape drive according to the eleventh or twelfth aspect, the storage medium further stores pitch information capable of specifying a pitch in the width direction between the plurality of servo bands, and the control device adjusts tension applied to the magnetic tape, on the basis of the pitch information.

According to a fourteenth aspect of the technology of the present disclosure, in the magnetic tape drive according to the thirteenth aspect, the pitch information includes pitches at a plurality of positions in the width direction in the plurality of servo bands.

According to a fifteenth aspect of the technology of the present disclosure, in the magnetic tape drive according to the fourteenth aspect, the storage medium further stores servo pattern distance information in which the plurality of positions in the width direction in the plurality of servo bands and distances in an entire length direction of the magnetic tape at the plurality of positions between a pair of magnetization regions constituting a servo pattern formed in each of the plurality of servo bands are associated with each other, and the control device adjusts the tension applied to the magnetic tape by using the pitches corresponding to positions of the plurality of magnetic elements in the width direction in the plurality of servo bands, the positions being detected by using the servo pattern distance information.

According to a sixteenth aspect of the technology of the present disclosure, in the magnetic tape drive according to the fourteenth or fifteenth aspect, the control device calculates the pitches on the basis of a result of reading the plurality of servo bands through a plurality of servo reading elements and a distance between the plurality of servo reading elements, in a stage before data recording is performed by the magnetic tape drive with respect to the magnetic tape.

According to a seventeenth aspect of the technology of the present disclosure, there is provided a magnetic tape system comprising: the magnetic tape cartridge according to any one of the first to tenth aspects; a tilting mechanism that tilts a head on which the plurality of magnetic elements are mounted toward an entire length direction side of the magnetic tape with respect to a width direction of the magnetic tape; and a control device that controls the tilting mechanism according to the tilt feature information stored in the storage medium.

According to an eighteenth aspect of the technology of the present disclosure, in the magnetic tape system according to the seventeenth aspect, a tension applying mechanism that applies tension to the magnetic tape is further provided.

According to a nineteenth aspect of the technology of the present disclosure, in the magnetic tape system according to the seventeenth or eighteenth aspect, the storage medium further stores pitch information capable of specifying a pitch in the width direction between the plurality of servo bands, and the control device adjusts tension applied to the magnetic tape, on the basis of the pitch information.

According to a twentieth aspect of the technology of the present disclosure, in the magnetic tape system according to the nineteenth aspect, the pitch information includes pitches at a plurality of positions in the width direction in the plurality of servo bands.

According to a twenty-first aspect of the technology of the present disclosure, in the magnetic tape system according to the twentieth aspect, the storage medium further stores servo pattern distance information in which the plurality of positions in the width direction in the plurality of servo bands and distances in an entire length direction of the magnetic tape at the plurality of positions between a pair of magnetization regions constituting a servo pattern formed in each of the plurality of servo bands are associated with each other, and the control device adjusts the tension applied to the magnetic tape by using the pitches corresponding to positions of the plurality of magnetic elements in the width direction in the plurality of servo bands, the positions being detected by using the servo pattern distance information.

According to a twenty-second aspect of the technology of the present disclosure, in the magnetic tape system according to the twentieth or twenty-first aspect, the control device calculates the pitches on the basis of a result of reading the plurality of servo bands through a plurality of servo reading elements and a distance between the plurality of servo reading elements, in a stage before data recording is performed by the magnetic tape drive with respect to the magnetic tape.

According to a twenty-third aspect of the technology of the present disclosure, there is provided a method of operating a magnetic tape drive, comprising: acquiring the tilt feature information stored in the storage medium provided in the magnetic tape cartridge according to any one of the first to tenth aspects; and controlling a tilting mechanism that tilts a head on which the plurality of magnetic elements are mounted toward an entire length direction side of the magnetic tape with respect to a width direction of the magnetic tape, according to the acquired tilt feature information.

According to a twenty-fourth aspect of the technology of the present disclosure, in the method of operating a magnetic tape drive according to the twenty-third aspect, applying tension to the magnetic tape is further provided.

According to a twenty-fifth aspect of the technology of the present disclosure, in the method of operating a magnetic tape drive according to the twenty-third or twenty-fourth aspect, the storage medium further stores pitch information capable of specifying a pitch in the width direction between the plurality of servo bands, and adjusting tension applied to the magnetic tape, on the basis of the pitch information, is further provided.

According to a twenty-sixth aspect of the technology of the present disclosure, in the method of operating a magnetic tape drive according to the twenty-fifth aspect, the pitch information includes pitches at a plurality of positions in the width direction in the plurality of servo bands.

According to a twenty-seventh aspect of the technology of the present disclosure, in the method of operating a magnetic tape drive according to the twenty-sixth aspect, the storage medium further stores servo pattern distance information in which the plurality of positions in the width direction in the plurality of servo bands and distances in an entire length direction of the magnetic tape at the plurality of positions between a pair of magnetization regions constituting a servo pattern formed in each of the plurality of servo bands are associated with each other, and adjusting the tension applied to the magnetic tape by using the pitches corresponding to positions of the plurality of magnetic elements in the width direction in the plurality of servo bands, the positions being detected by using the servo pattern distance information, is further provided.

According to a twenty-eighth aspect of the technology of the present disclosure, in the method of operating a magnetic tape drive according to the twenty-sixth or twenty-seventh aspect, calculating the pitches on the basis of a result of reading the plurality of servo bands through a plurality of servo reading elements and a distance between the plurality of servo reading elements, in a stage before data recording is performed by the magnetic tape drive with respect to the magnetic tape, is further provided.

BRIEF DESCRIPTION OF THE DRAWINGS

Exemplary embodiments of the technology of the disclosure will be described in detail based on the following figures, wherein:

FIG. 26 is a conceptual diagram showing an example of pitch information;

DETAILED DESCRIPTION

Hereinafter, an example of an embodiment of a magnetic tape cartridge, a magnetic tape drive, a magnetic tape system, and a method of operating a magnetic tape drive according to the technology of the present disclosure will be described with reference to the accompanying drawings.

First, terms that are used in the following description will be described.

CPU is an abbreviation for "Central Processing Unit". RAM is an abbreviation for "Random Access Memory". DRAM is an abbreviation for "Dynamic Random Access Memory". SRAM is an abbreviation for "Static Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". HDD is an abbreviation for "Hard Disk Drive". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RFID is an abbreviation for "Radio Frequency IDentifier". LTO is an abbreviation for "Linear Tape-Open". IBM is an abbreviation for "International Business Machines Corporation". ID is an abbreviation for "Identification Data". BOT is an abbreviation for "Beginning Of Tape". EOT is an abbreviation for "End Of Tape". MFM is an abbreviation for "Magnetic Force Microscope". SEM is an abbreviation for "Scanning Electron Microscope". QR is an abbreviation for "Quick Response".

Figure 1:
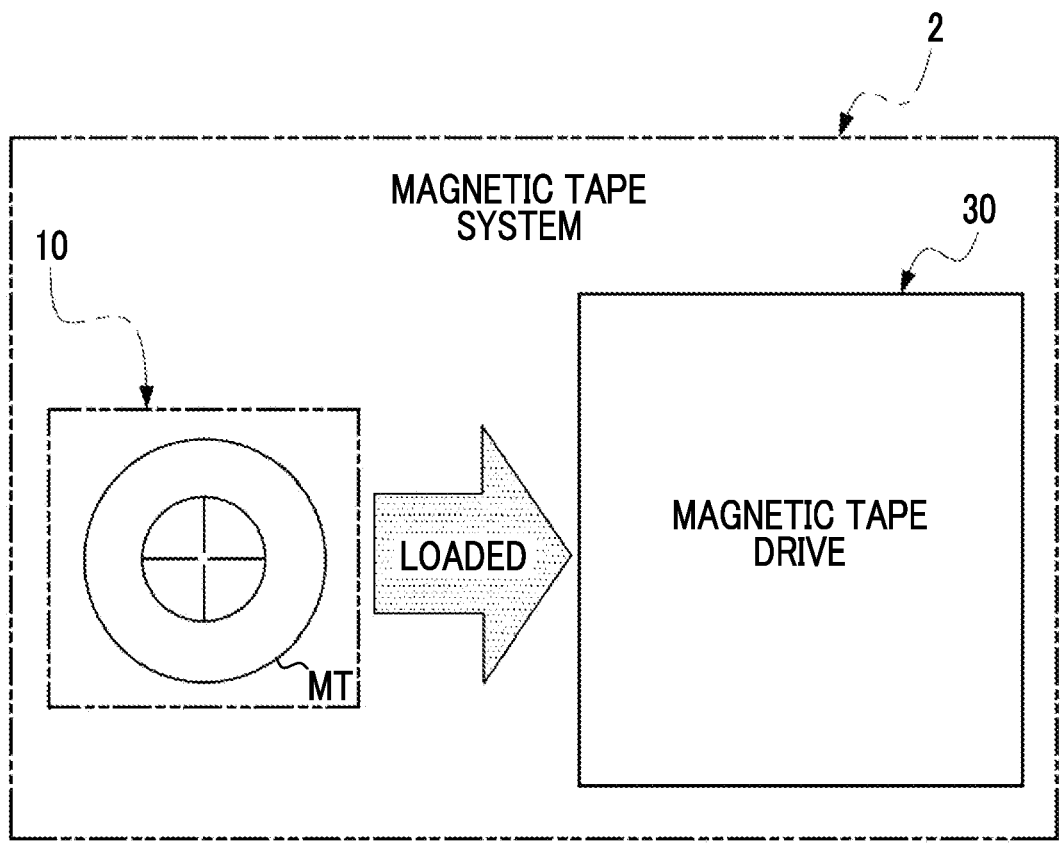
FIG. 1 is a block diagram showing an example of a configuration of a magnetic tape system.

As shown in FIG. 1 as an example, a magnetic tape system 2 comprises a magnetic tape cartridge 10 and a magnetic tape drive 30. The magnetic tape cartridge 10 is loaded into the magnetic tape drive 30. The magnetic tape cartridge 10 accommodates a magnetic tape MT. The magnetic tape drive 30 pulls out the magnetic tape MT from the loaded magnetic tape cartridge 30, and records data on the magnetic tape MT or reads data from the magnetic tape MT while causing the pulled-out magnetic tape MT to run.

Next, an example of a configuration of the magnetic tape cartridge 10 will be described with reference to FIGS. 2 to 4. In the following description, for convenience of description, in FIGS. 2 to 4, a loading direction of the magnetic tape cartridge 10 in a magnetic tape drive 30 (see FIG. 5) is indicated by an arrow A, a direction of the arrow A is referred to a front direction of the magnetic tape cartridge 10, and a side in the front direction of the magnetic tape cartridge 10 is referred to as a front side of the magnetic tape cartridge 10. In the following description of the structure, "front" indicates the front side of the magnetic tape cartridge 10.

In addition, in the following description, for convenience of description, in FIGS. 2 to 4, a direction of an arrow B perpendicular to the direction of the arrow A is referred to as a right direction, and a side in the right direction of the magnetic tape cartridge 10 is referred to as a right side of the magnetic tape cartridge 10. In the following description of the structure, "right" indicates the right side of the magnetic tape cartridge 10.

Further, in the following description, for convenience of description, in FIGS. 2 to 4, a direction opposite to the direction of the arrow B is referred to as a left direction, and a side in the left direction of the magnetic tape cartridge 10 is referred to as a left side of the magnetic tape cartridge 10. In the following description of the structure, "left" indicates the left side of the magnetic tape cartridge 10.

Further, in the following description, for convenience of description, in FIGS. 2 to 4, a direction perpendicular to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10. In the following description of the structure, "upper" indicates the upper side of the magnetic tape cartridge 10.

Further, in the following description, for convenience of description, in FIGS. 2 to 4, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description of the structure, "rear" indicates the rear side of the magnetic tape cartridge 10.

Further, in the following description, for convenience of description, in FIGS. 2 to 4, a direction opposite to the upper direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description of the structure, "lower" indicates the lower side of the magnetic tape cartridge 10.

Further, in the following description, although LTO will be described as an example of the specification of the magnetic tape cartridge 10, this is merely an example, and the specification of the magnetic tape cartridge 10 may conform to the specification of a magnetic tape cartridge of IBM3592.

Further, in the following description, unless otherwise specified, a deep (large) or shallow (small) angle means that the angle is deeper or shallower than the current angle. Further, in the following description, unless otherwise specified, a wide or narrow width of the magnetic tape MT means that the width is wider or narrower than a reference width. The reference width is a fixed value or a variable value. Further, in the following description, unless otherwise specified, strong or weak tension applied to the running magnetic tape MT means that the tension is stronger or weaker than reference tension. The reference tension is a fixed value or a variable value. Here, the variable value is, for example, a value that fluctuates depending on an instruction given from the outside and/or a predetermined condition.

Figure 2:
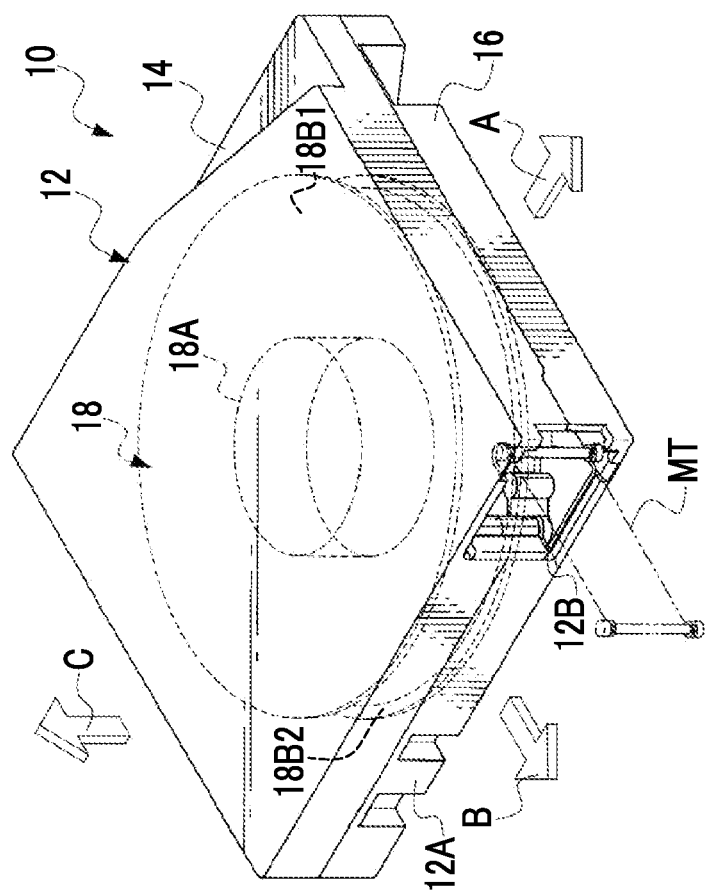
FIG. 2 is a schematic perspective view showing an example of an external appearance of a magnetic tape cartridge.

As shown in FIG. 2 as an example, the magnetic tape cartridge 10 has a substantially rectangular shape in plan view, and comprises a box-shaped case 12. The case 12 is an example of a "case" according to the technology of the present disclosure. The magnetic tape MT is accommodated in the case 12. The case 12 is made of a resin, such as polycarbonate, and comprises an upper case 14 and a lower case 16. The upper case 14 and the lower case 16 are bonded to each other by welding (for example, ultrasonic welding) and screwing in a state in which a lower peripheral edge surface of the upper case 14 and an upper peripheral edge surface of the lower case 16 are brought into contact with each other. The bonding method is not limited to the welding and the screwing, and other bonding methods may be used.

A cartridge reel 18 is rotatably accommodated inside the case 12. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a central portion of the case 12. Each of the upper flange 18B1 and the lower flange 18B2 is formed in an annular shape. A central portion in plan view of the upper flange 18B1 is fixed to an upper end part of the reel hub 18A, and a central portion in plan view of the lower flange 18B2 is fixed to a lower end part of the reel hub 18A. The reel hub 18A and the lower flange 18B2 may be integrally molded.

A magnetic tape MT is wound around an outer peripheral surface of the reel hub 18A, and widthwise end parts of the magnetic tape MT are held by the upper flange 18B1 and the lower flange 18B2.

An opening 12B is formed on a front side of a right wall 12A of the case 12. The magnetic tape MT is pulled out from the opening 12B.

Figure 3:
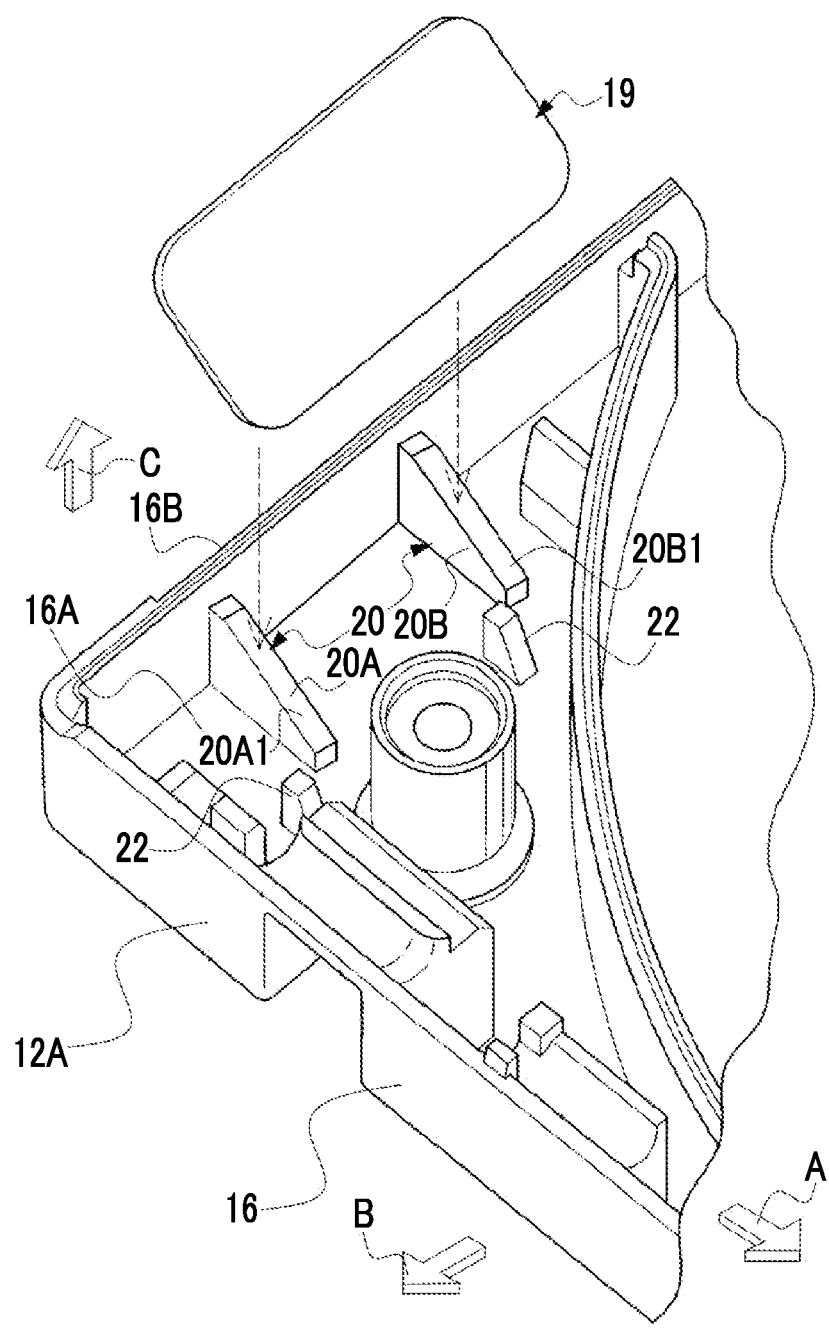
FIG. 3 is a schematic perspective view showing an example of a structure of a rear right end part inside a lower case of the magnetic tape cartridge.

As shown in FIG. 3 as an example, a cartridge memory 19 is provided in the lower case 16. Specifically, the cartridge memory 19 is accommodated in a rear right end part of the lower case 16. The cartridge memory 19 is an example of a "noncontact communication medium" according to the technology of the present disclosure. In the present embodiment, a so-called passive type RFID tag is employed as the cartridge memory 19.

Information regarding the magnetic tape MT is stored in the cartridge memory 19. The information regarding the magnetic tape MT indicates, for example, management information for managing the magnetic tape cartridge 10. Examples of the management information include information regarding the cartridge memory 19, information capable of specifying the magnetic tape cartridge 10, and information indicating a recording capacity of the magnetic tape MT, the outline of data recorded on the magnetic tape MT, items of data, a recording format of data, and the like.

The cartridge memory 19 performs noncontact communication with a noncontact reading and writing device. Examples of the noncontact reading and writing device include a noncontact reading and writing device that is used in a manufacturing process of the magnetic tape cartridge 10 and a noncontact reading and writing device (for example, a noncontact reading and writing device 50 shown in FIGS. 5 to 7) that is used in the magnetic tape drive (for example, the magnetic tape drive 30 shown in FIG. 5).

The noncontact reading and writing device performs reading and writing of various types of information with respect to the cartridge memory 19 in a noncontact manner. Although details will be described later, the cartridge memory 19 generates electric power with electromagnetic action on a magnetic field MF (see FIG. 6 and the like) applied from the noncontact reading and writing device. Then, the cartridge memory 19 operates using the generated electric power, and transmits and receives various types of information to and from the noncontact reading and writing device by performing communication with the noncontact reading and writing device via the magnetic field MF. The communication method may be, for example, a method conforming to a known standard, such as ISO14443 or ISO18092, or a method conforming to the LTO specification of ECMA319.

As shown in FIG. 3 as an example, a support member 20 is provided on an inner surface of a bottom plate 16A of the rear right end part of the lower case 16. The support member 20 is a pair of inclined mounts that support the cartridge memory 19 from below in an inclined state. The pair of inclined mounts are a first inclined mount 20A and a second inclined mount 20B. The first inclined mount 20A and the second inclined mount 20B are disposed at an interval in a right-left direction of the case 12 and are integrated with an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. Further, the second inclined mount 20B has an inclined surface 20B1, and the inclined surface 20B1 is also inclined downward from the inner surface of the rear wall 16B toward the inner surface of the bottom plate 16A.

In front of the support member 20, a pair of position restricting ribs 22 are disposed at an interval in the right-left direction. The pair of position restricting ribs 22 are provided upright on the inner surface of the bottom plate 16A and restrict a position of a lower end part of the cartridge memory 19 in a state in which the cartridge memory 19 is disposed on the support member 20.

Figure 4:
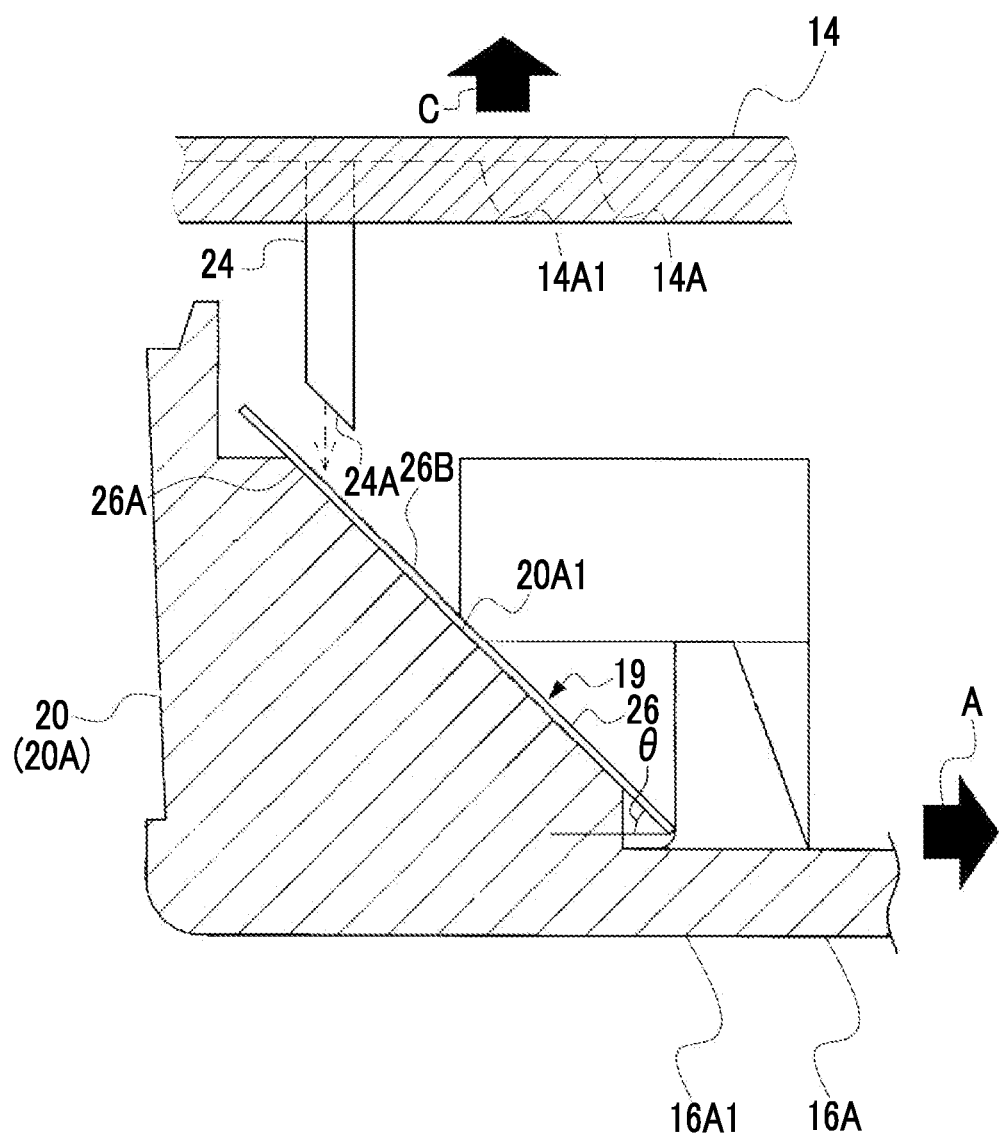
FIG. 4 is a side cross-sectional view showing an example of a support member provided on an inner surface of the lower case of the magnetic tape cartridge.

As shown in FIG. 4 as an example, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane with the bottom plate 16A facing the lower side. Here, "parallel" indicates parallel in a meaning including an error that is generally allowed in the technical field to which the technology of the present disclosure belongs, and an error to such an extent not contrary to the gist of the technology of the present disclosure, in addition to completely parallel. An inclined angle θ of the support member 20, that is, an inclined angle of each of the inclined surface 20A1 and the inclined surface 20B1 (see FIG. 3) is 45 degrees with respect to the reference surface 16A1. The inclined angle of 45 degrees is merely an example, and may be in a range of "0 degrees<inclined angle θ<45 degrees" or may be 45 degrees or more.

The cartridge memory 19 comprises a substrate 26. The substrate 26 is placed on the support member 20 with a back surface 26A of the substrate 26 facing the lower side, and the support member 20 supports the back surface 26A of the substrate 26 from below. A part of the back surface 26A of the substrate 26 is in contact with the inclined surface of the support member 20, that is, the inclined surfaces 20A1 and 20B1 (see FIG. 3), and a front surface 26B of the substrate 26 is exposed to an inner surface 14A1 side of a top plate 14A of the upper case 14.

The upper case 14 comprises a plurality of ribs 24. The plurality of ribs 24 are disposed at intervals in the right-left direction of the case 12. The plurality of ribs 24 are provided to protrude to the lower side from the inner surface 14A1 of the top plate 14A of the upper case 14, and a distal end surface 24A of each rib 24 has an inclined surface corresponding to the inclined surfaces 20A1 and 20B1 (see FIG. 3). That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26B side, and the substrate 26 is pinched by the distal end surface 24A of each rib 24 and the inclined surfaces 20A1 and 20B1 (see FIG. 3) of the support member 20. With this, a position in an up-down direction of the cartridge memory 19 is restricted by the ribs 24.

Figure 5:
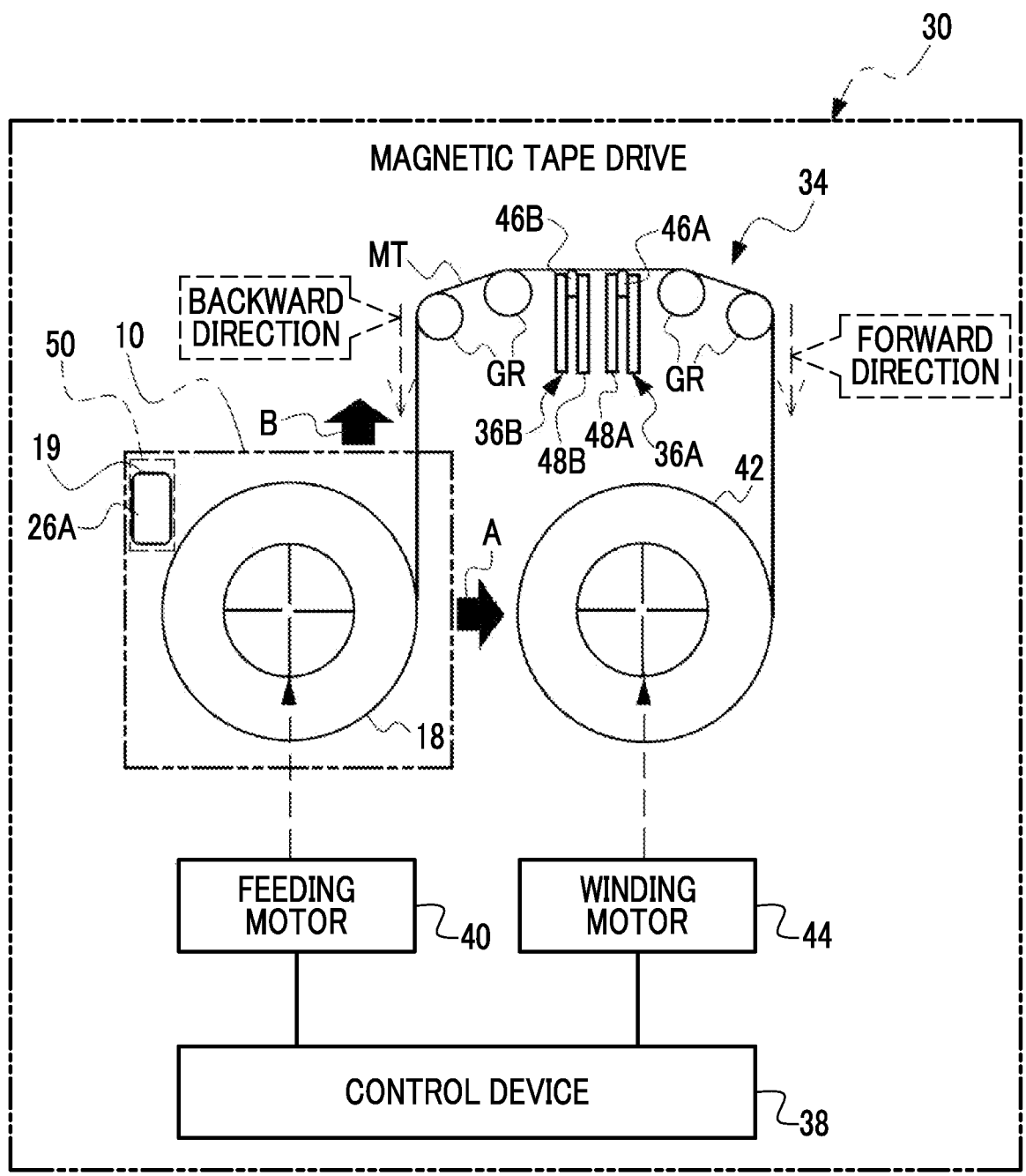
FIG. 5 is a schematic configuration diagram showing an example of a hardware configuration of a magnetic tape drive.

As shown in FIG. 5 as an example, the magnetic tape drive 30 comprises a transport device 34, a recording head 36A, a reading head 36B, and a control device 38. The magnetic tape cartridge 10 is loaded into the magnetic tape drive 30. The magnetic tape drive 30 is a device that pulls out the magnetic tape MT from the magnetic tape cartridge 10, records data on the pulled-out magnetic tape MT using a plurality of recording elements DW (see FIG. 13) of the recording head 36A, and reads data from the pulled-out magnetic tape MT using a plurality of reading elements DR (see FIG. 13) of the reading head 36B in a linear serpentine method. Further, although details will be described later, both the recording head 36A and the reading head 36B are skew heads that skew on the magnetic tape MT. In the present embodiment, reading of data indicates, in other words, reproduction of data. Hereinafter, for convenience of description, the recording head 36A and the reading head 36B are denoted by a magnetic head 36 in a case where a particular distinction is not necessary for description.

The control device 38 controls the operation of the entire magnetic tape drive 30. In the present embodiment, although the control device 38 is realized by an ASIC 120 (see FIG. 12), the technology of the present disclosure is not limited thereto. For example, the control device 38 may be realized by an FPGA. Alternatively, the control device 38 may be realized by a computer including a CPU, a ROM, and a RAM. Alternatively, the control device 38 may be realized by a combination of two or more of the ASIC 120, the FPGA, and the computer. That is, the control device 38 may be realized by a combination of a hardware configuration and a software configuration.

The transport device 34 is a device that selectively transports the magnetic tape MT in a forward direction and a backward direction, and comprises a feeding motor 40, a winding reel 42, a winding motor 44, a plurality of guide rollers GR, and the control device 38. Here, the forward direction indicates a feeding direction of the magnetic tape MT, and the backward direction indicates a rewinding direction of the magnetic tape MT.

The feeding motor 40 rotates the cartridge reel 18 provided in the magnetic tape cartridge 10 under the control of the control device 38. The control device 38 controls the feeding motor 40 to control a rotation direction, a rotation speed, rotation torque, and the like of the cartridge reel 18.

In a case where the magnetic tape MT is wound on (loaded into) the winding reel 42, the control device 38 rotates the feeding motor 40 such that the magnetic tape MT runs in the forward direction. A rotation speed, rotation torque, and the like of the feeding motor 40 are adjusted according to a speed of the magnetic tape MT to be wound on the winding reel 42.

The winding motor 44 rotates the winding reel 42 under the control of the control device 38. The control device 38 controls the winding motor 44 to control a rotation direction, a rotation speed, rotation torque, and the like of the winding reel 42.

In a case where the magnetic tape MT is wound on the winding reel 42, the control device 38 rotates the winding motor 44 such that the magnetic tape MT runs in the forward direction. A rotation speed, rotation torque, and the like of the winding motor 44 are adjusted according to the speed of the magnetic tape MT to be wound on the winding reel 42. The rotation speed, the rotation torque, and the like of each of the feeding motor 40 and the winding motor 44 are adjusted in this manner by the control device 38, whereby tension is applied to the magnetic tape MT. The feeding motor 40 and the winding motor 44 are an example of a "tension applying mechanism" according to the technology of the present disclosure.

In a case of rewinding (unloading) the magnetic tape MT onto the cartridge reel 18, the control device 38 rotates the feeding motor 40 and the winding motor 44 such that the magnetic tape MT runs in the backward direction.

In the present embodiment, the tension applied to the magnetic tape MT is controlled by controlling the rotation speed, the rotation torque, and the like of the feeding motor 40 and the winding motor 44, but the technology of the present disclosure is not limited thereto. For example, the tension applied to the magnetic tape MT may be controlled by using a dancer roller or may be controlled by drawing the magnetic tape MT into a vacuum chamber.

Each of the plurality of guide rollers GR is a roller that guides the magnetic tape MT. A running path of the magnetic tape MT is determined by separately disposing the plurality of guide rollers GR at positions straddling the magnetic head 36 between the magnetic tape cartridge 10 and the winding reel 42.

The recording head 36A comprises a magnetic element unit 46A and a holder 48A. The magnetic element unit 46A is held by the holder 48A so as to come into contact with the running magnetic tape MT. The magnetic element unit 46A has servo reading elements WSR1 and WSR2, which will be described later, and recording elements DW1, DW2, DW3, DW4, DW5, DW6, DW7, and DW8, which will be described later. The magnetic element unit 46A records data on the magnetic tape MT transported by the transport device 34, or reads a servo pattern 51 (see FIG. 13) from the magnetic tape MT transported by the transport device 34.

The reading head 36B comprises a magnetic element unit 46B and a holder 48B. The magnetic element unit 46B is held by the holder 48B so as to come into contact with the running magnetic tape MT. The magnetic element unit 46B has servo reading elements RSR1 and RSR2, which will be described later, and reading elements DR1, DR2, DR3, DR4, DR5, DR6, DR7, and DR8, which will be described later. The magnetic element unit 46B records data from the magnetic tape MT transported by the transport device 34, or reads the servo pattern 51 (see FIG. 13) from the magnetic tape MT transported by the transport device 34.

The magnetic tape drive 30 comprises a noncontact reading and writing device 50. The noncontact reading and writing device 50 is disposed below the magnetic tape cartridge 10 so as to directly face the back surface 26A of the cartridge memory 19 in a state in which the magnetic tape cartridge 10 is loaded. The state in which the magnetic tape cartridge 10 is loaded in the magnetic tape drive 30 indicates, for example, a state in which the magnetic tape cartridge 10 has reached a position determined in advance as a position where data reading of the magnetic head 36 with respect to the magnetic tape MT starts.

Figure 6:
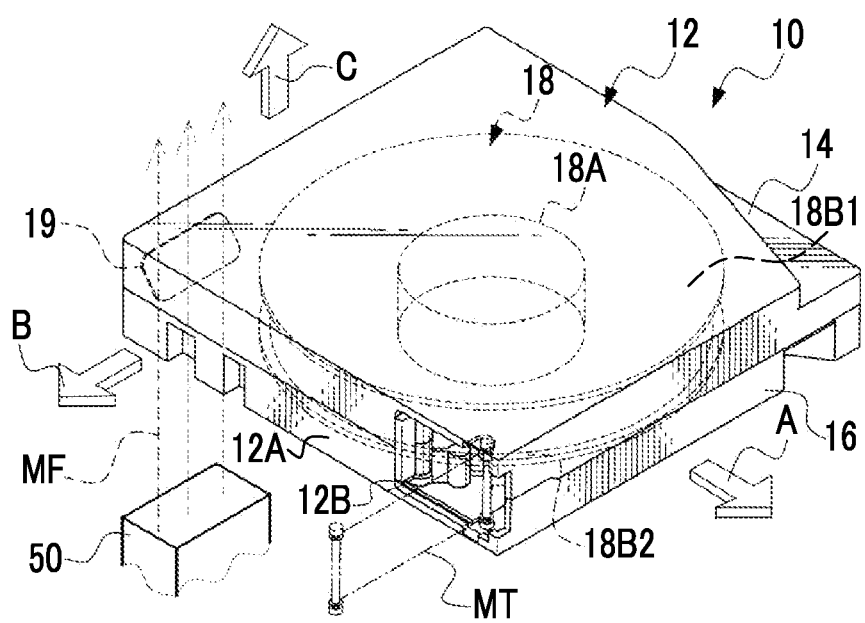
FIG. 6 is a schematic perspective view showing an example of an aspect in which a magnetic field is emitted from below the magnetic tape cartridge by a noncontact reading and writing device.

As shown in FIG. 6 as an example, the noncontact reading and writing device 50 emits a magnetic field MF from below the magnetic tape cartridge 10 toward the cartridge memory 19. The magnetic field MF passes through the cartridge memory 19.

Figure 7:
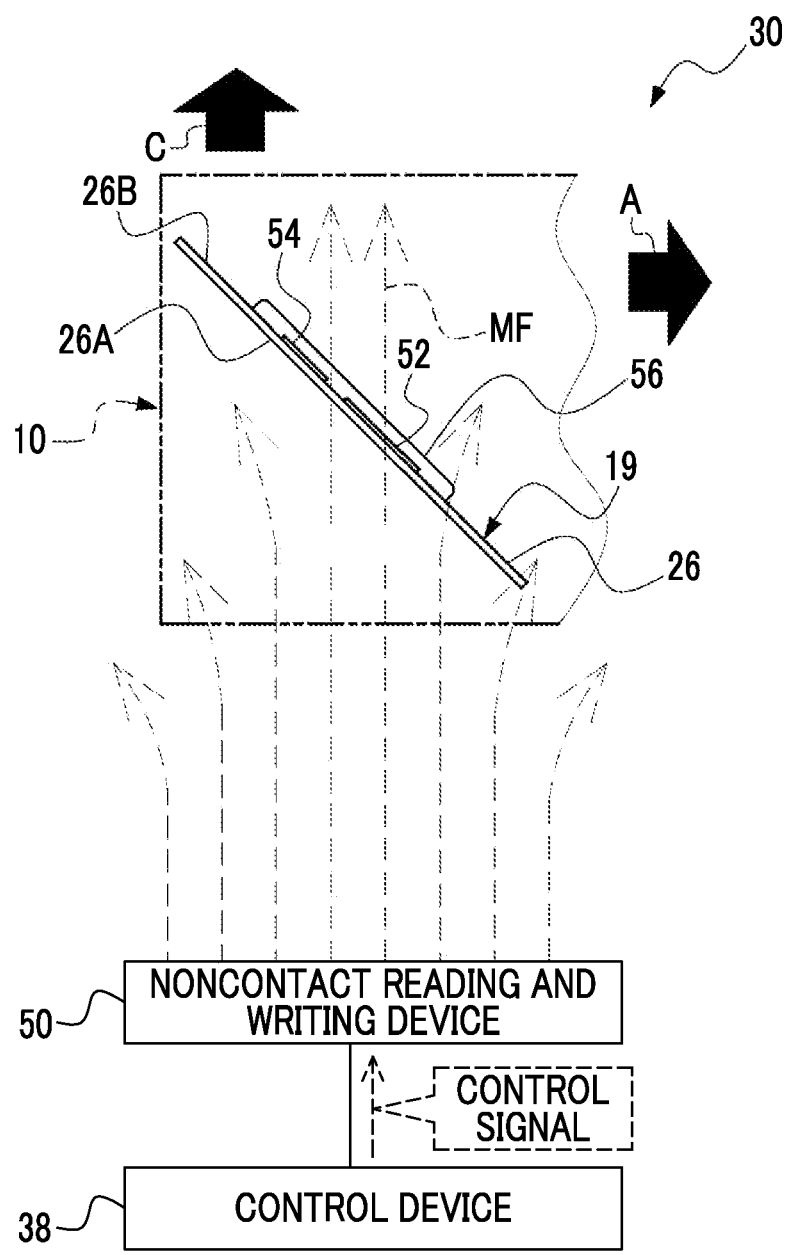
FIG. 7 is a conceptual diagram showing an example of an aspect in which a magnetic field is applied from the non-contact reading and writing device to a cartridge memory provided in the magnetic tape cartridge.

As shown in FIG. 7 as an example, the noncontact reading and writing device 50 is connected to the control device 38. The control device 38 outputs a control signal to the noncontact reading and writing device 50. The control signal is a signal for controlling the cartridge memory 19. The noncontact reading and writing device 50 emits the magnetic field MF toward the cartridge memory 19 in accordance with the control signal input from the control device 38. The magnetic field MF passes through the cartridge memory 19 from the back surface 26A side to the front surface 26B side.

The noncontact reading and writing device 50 gives a command signal corresponding to the control signal to the cartridge memory 19 by performing noncontact communication with the cartridge memory 19. In more detail, the noncontact reading and writing device 50 spatially transmits the command signal to the cartridge memory 19 under the control of the control device 38. Although details will be described later, the command signal is a signal indicating a command with respect to the cartridge memory 19.

In a case where the command signal is spatially transmitted from the noncontact reading and writing device 50 to the cartridge memory 19, the command signal corresponding to an instruction from the control device 38 is included in the magnetic field MF by the noncontact reading and writing device 50. In other words, the command signal is superimposed on the magnetic field MF by the noncontact reading and writing device 50. That is, the noncontact reading and writing device 50 transmits the command signal to the cartridge memory 19 via the magnetic field MF under the control of the control device 38.

An IC chip 52 and a capacitor 54 are mounted on the front surface 26B of the cartridge memory 19. The IC chip 52 and the capacitor 54 adhere to the front surface 26B. Further, the IC chip 52 and the capacitor 54 are sealed by a sealing material 56 on the front surface 26B of the cartridge memory 19. Here, as the sealing material 56, an ultraviolet curable resin that is cured by reacting with ultraviolet rays is employed. The ultraviolet curable resin is merely an example, and a photocurable resin that is cured by reacting with light in a wavelength range other than ultraviolet rays may be used as the sealing material 56, a thermosetting resin may be used as the sealing material 56, or other adhesives may be used as the sealing material 56.

Figure 8:
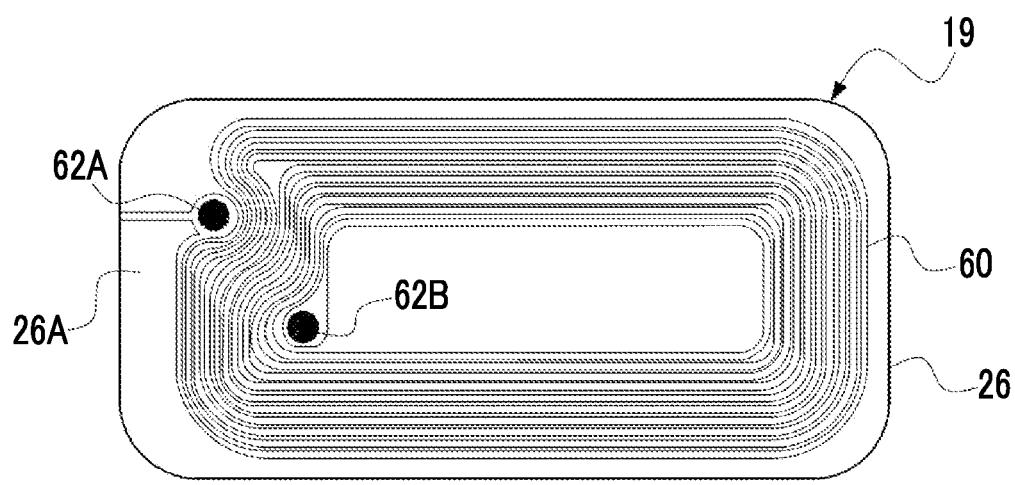
FIG. 8 is a schematic bottom view showing an example of a structure of a back surface of a substrate of the cartridge memory provided in the magnetic tape cartridge.

As shown in FIG. 8 as an example, a coil 60 is formed in a loop shape on the back surface 26A of the cartridge memory 19. Here, copper foil is employed as a material of the coil 60. The copper foil is merely an example, and, for example, other types of conductive materials, such as aluminum foil, may be used. The coil 60 induces an induced current with application of the magnetic field MF (see FIGS. 6 and 7) from the noncontact reading and writing device 50.

A first conduction portion 62A and a second conduction portion 62B are provided on the back surface 26A of the cartridge memory 19. The first conduction portion 62A and the second conduction portion 62B have solder and electrically connect both end parts of the coil 60 to the IC chip 52 (see FIGS. 7 and 9) and the capacitor 54 (see FIGS. 7 and 9) of the front surface 26B.

Figure 9:
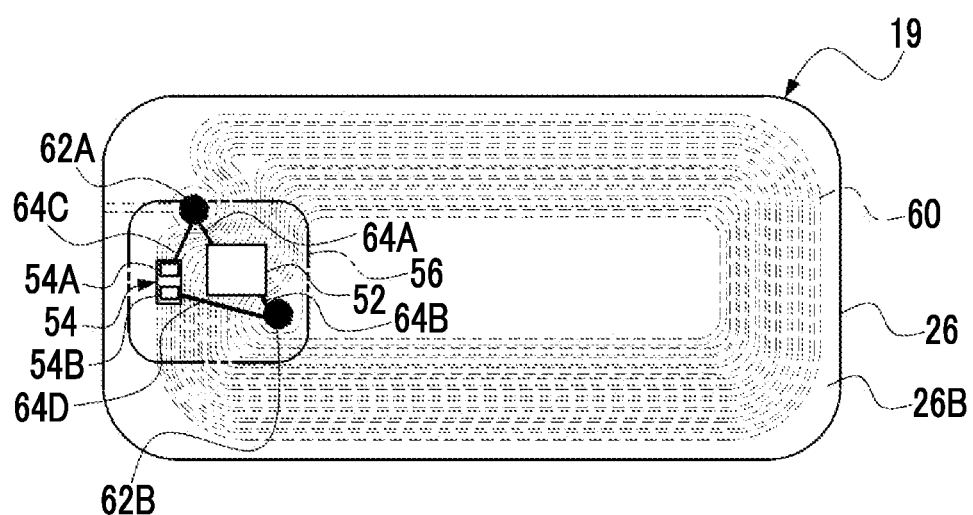
FIG. 9 is a schematic plan view showing an example of a structure of a front surface of the substrate of the cartridge memory provided in the magnetic tape cartridge.

As shown in FIG. 9 as an example, on the front surface 26B of the cartridge memory 19, the IC chip 52 and the capacitor 54 are electrically connected to each other using a wire connection method. Specifically, one terminal of a positive electrode terminal and a negative electrode terminal of the IC chip 52 is connected to the first conduction portion 62A via a wiring line 64A, and the other terminal is connected to the second conduction portion 62B via a wiring line 64B. Further, the capacitor 54 has a pair of electrodes. In the example shown in FIG. 9, the pair of electrodes are electrodes 54A and 54B. The electrode 54A is connected to the first conduction portion 62A via a wiring line 64C, and the electrode 54B is connected to the second conduction portion 62B via a wiring line 64D. With this, the IC chip 52 and the capacitor 54 are connected in parallel with the coil 60.

Figure 10:
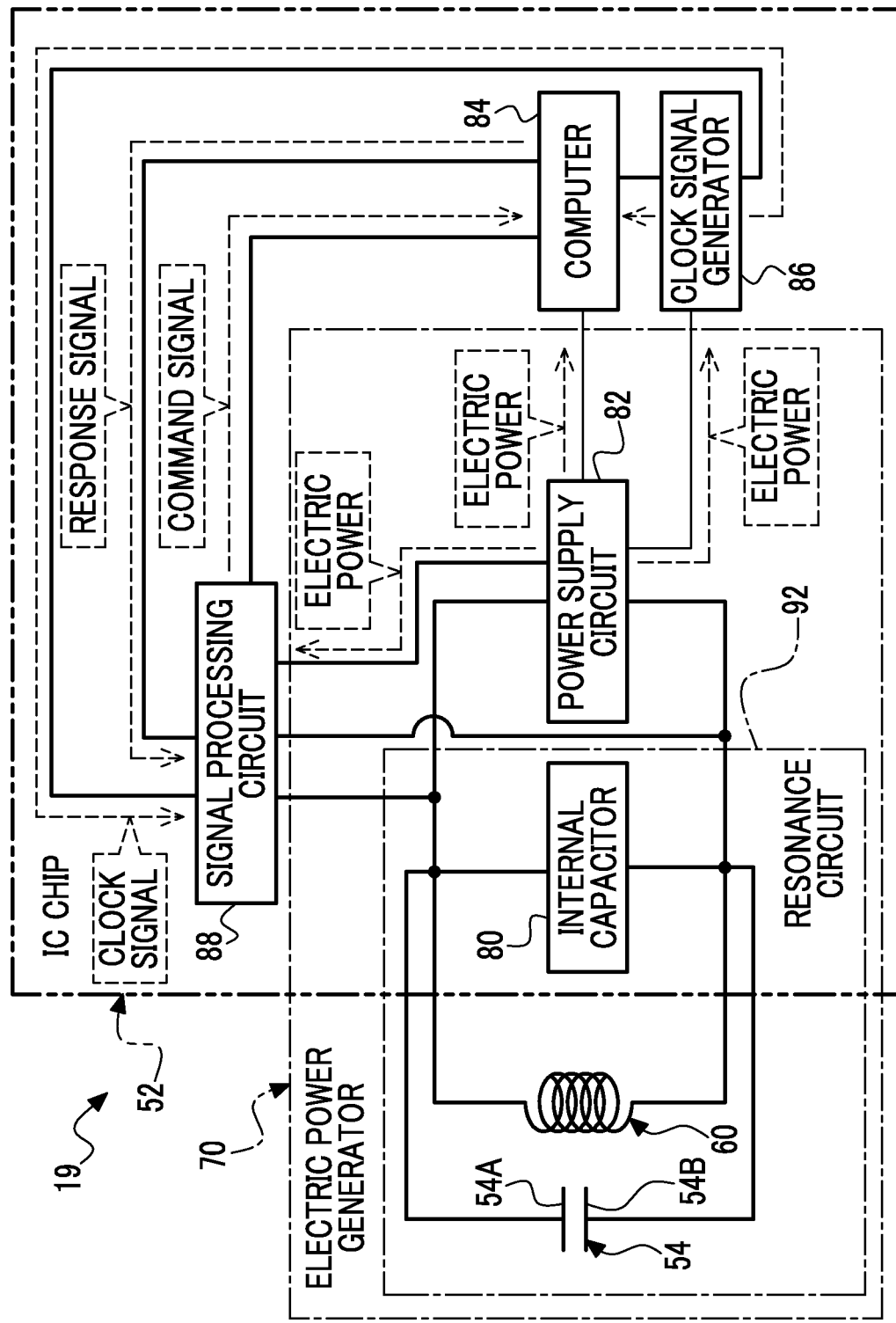
FIG. 10 is a schematic circuit diagram showing an example of a circuit configuration of the cartridge memory provided in the magnetic tape cartridge.

As shown in FIG. 10 as an example, the IC chip 52 comprises an internal capacitor 80, a power supply circuit 82, a computer 84, a clock signal generator 86, and a signal processing circuit 88. The IC chip 52 is a general-purpose IC chip that is usable for applications other than the magnetic tape cartridge 10.

The cartridge memory 19 comprises an electric power generator 70. The electric power generator 70 generates electric power with the application of the magnetic field Alf from the noncontact reading and writing device 50 to the coil 60. Specifically, the electric power generator 70 generates alternating-current power using a resonance circuit 92, and converts the generated alternating-current power into direct-current power to output the direct-current power.

The electric power generator 70 has the resonance circuit 92 and the power supply circuit 82. The resonance circuit 92 comprises the capacitor 54, the coil 60, and the internal capacitor 80. The internal capacitor 80 is a capacitor incorporated in the IC chip 52, and the power supply circuit 82 is also a circuit incorporated in the IC chip 52. The internal capacitor 80 is connected in parallel with the coil 60.

The capacitor 54 is a capacitor externally attached to the IC chip 52. The IC chip 52 is a general-purpose IC chip that is intrinsically usable for applications different from the magnetic tape cartridge 10. For this reason, the capacitance of the internal capacitor 80 may not be enough to realize a resonance frequency required for the cartridge memory 19 used in the magnetic tape cartridge 10. In that respect, in the cartridge memory 19, the capacitor 54 is post-attached to the IC chip 52, as a capacitor having a capacitance value necessary in causing the resonance circuit 92 to resonate at a predetermined resonance frequency with the application of the magnetic field MF. The predetermined resonance frequency is a frequency (for example, 13.56 MHz) corresponding to a frequency of the magnetic field MF, and need only be appropriately decided on the basis of the specification or the like of the cartridge memory 19 and/or the noncontact reading and writing device 50. Further, the capacitance of the capacitor 54 is determined on the basis of a measured value of the capacitance of the internal capacitor 80. Further, here, although an aspect example in which the capacitor 54 is externally attached has been described, the technology of the present disclosure is not limited thereto, and the capacitor 54 may be incorporated in advance into the IC chip 52.

The resonance circuit 92 generates alternating-current power by generating a resonance phenomenon at the predetermined resonance frequency using the induced current induced by the coil 60 with the magnetic field MF passing through the coil 60 and outputs the generated alternating-current power to the power supply circuit 82.

The power supply circuit 82 has a rectifier circuit, a smoothing circuit, and the like. The rectifier circuit is a full-wave rectifier circuit having a plurality of diodes. The full-wave rectifier circuit is merely an example, and a half-wave rectifier circuit may be used. The smoothing circuit includes a capacitor and a resistor. The power supply circuit 82 converts the alternating-current power input from the resonance circuit 92 into direct-current power and supplies various drive elements provided in the IC chip 52 with the direct-current power (hereinafter, also simply referred to as "electric power") obtained by the conversion. Examples of the various drive elements include the computer 84, the clock signal generator 86, and the signal processing circuit 88. In this way, electric power is supplied to various drive elements provided in the IC chip 52 by the electric power generator 70, whereby the IC chip 52 operates using the electric power generated by the electric power generator 70.

The computer 84 controls the operation of the entire cartridge memory 19. The clock signal generator 86 generates a clock signal and outputs the clock signal to the signal processing circuit 88 and the like. The signal processing circuit 88 and the like operate in accordance with the clock signal input from the clock signal generator 86. The clock signal generator 86 changes a frequency of the clock signal in accordance with an instruction of the computer 84.

The signal processing circuit 88 is connected to the resonance circuit 92. The signal processing circuit 88 has a decoding circuit (not shown) and an encoding circuit (not shown). The decoding circuit of the signal processing circuit 88 extracts and decodes the command signal from the magnetic field MF received by the coil 60 and outputs the command signal to the computer 84. The computer 84 outputs a response signal to the command signal to the signal processing circuit 88. That is, the computer 84 executes processing corresponding to the command signal input from the signal processing circuit 88 and outputs a processing result as the response signal to the signal processing circuit 88. In a case where the response signal is input from the computer 84, the encoding circuit of the signal processing circuit 88 encodes the response signal to modulate the response signal and outputs the response signal to the resonance circuit 92. The resonance circuit 92 transmits the response signal input from the encoding circuit of the signal processing circuit 88 to the noncontact reading and writing device 50 via the magnetic field MF.

Figure 11:
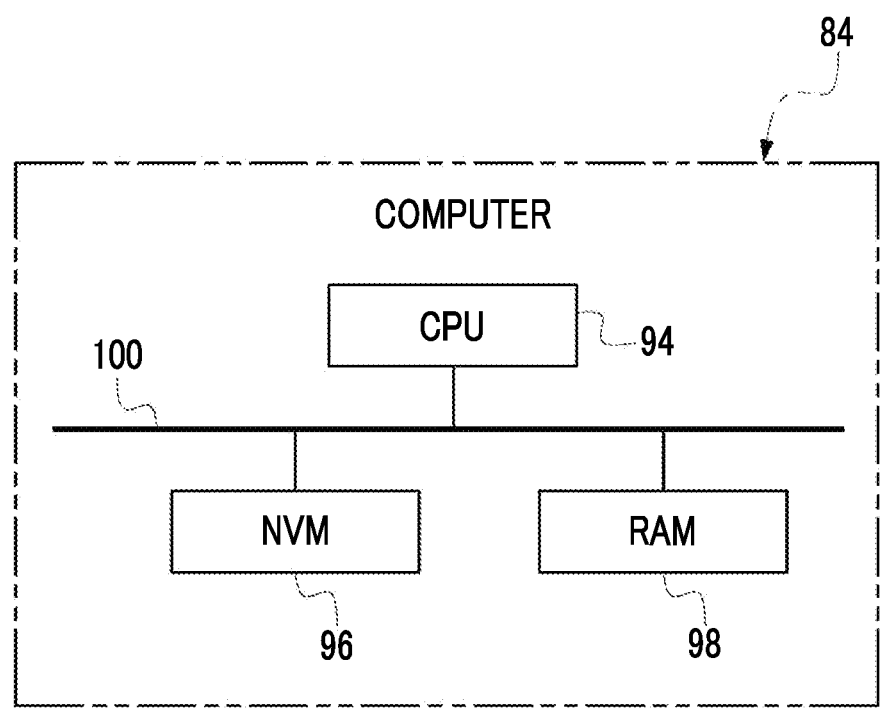
FIG. 11 is a block diagram showing an example of a hardware configuration of an electrical system of a computer of an IC chip mounted on the cartridge memory provided in the magnetic tape cartridge.

As shown in FIG. 11 as an example, the computer 84 comprises a CPU 94, an NVM 96, and a RAM 98. The CPU 94, the NVM 96, and the RAM 98 are connected to a bus 100.

The CPU 94 controls the operation of the computer 84. The NVM 96 is an example of a "storage medium" and an "internal memory" according to the technology of the present disclosure. An example of the NVM 96 includes an EEPROM. The EEPROM is merely an example, and, for example, a ferroelectric memory may be used instead of the EEPROM or any memory may be used as long as the memory is a non-volatile memory that can be mounted on the IC chip 52. The management information and the like are stored in the NVM 96. The RAM 98 temporarily stores various types of information and is used as a work memory. An example of the RAM 98 includes a DRAM or an SRAM.

The CPU 94 selectively performs polling processing, read-out processing, write-in processing, and the like in response to the command signal input from the signal processing circuit 88. The polling processing is processing of establishing communication with the noncontact reading and writing device 50, and is performed, for example, as preparation processing in a pre-stage of the read-out processing and the write-in processing. The read-out processing is processing of reading out the management information and the like from the NVM 96. The write-in processing is processing of writing the management information and the like into the NVM 96.

Figure 12:
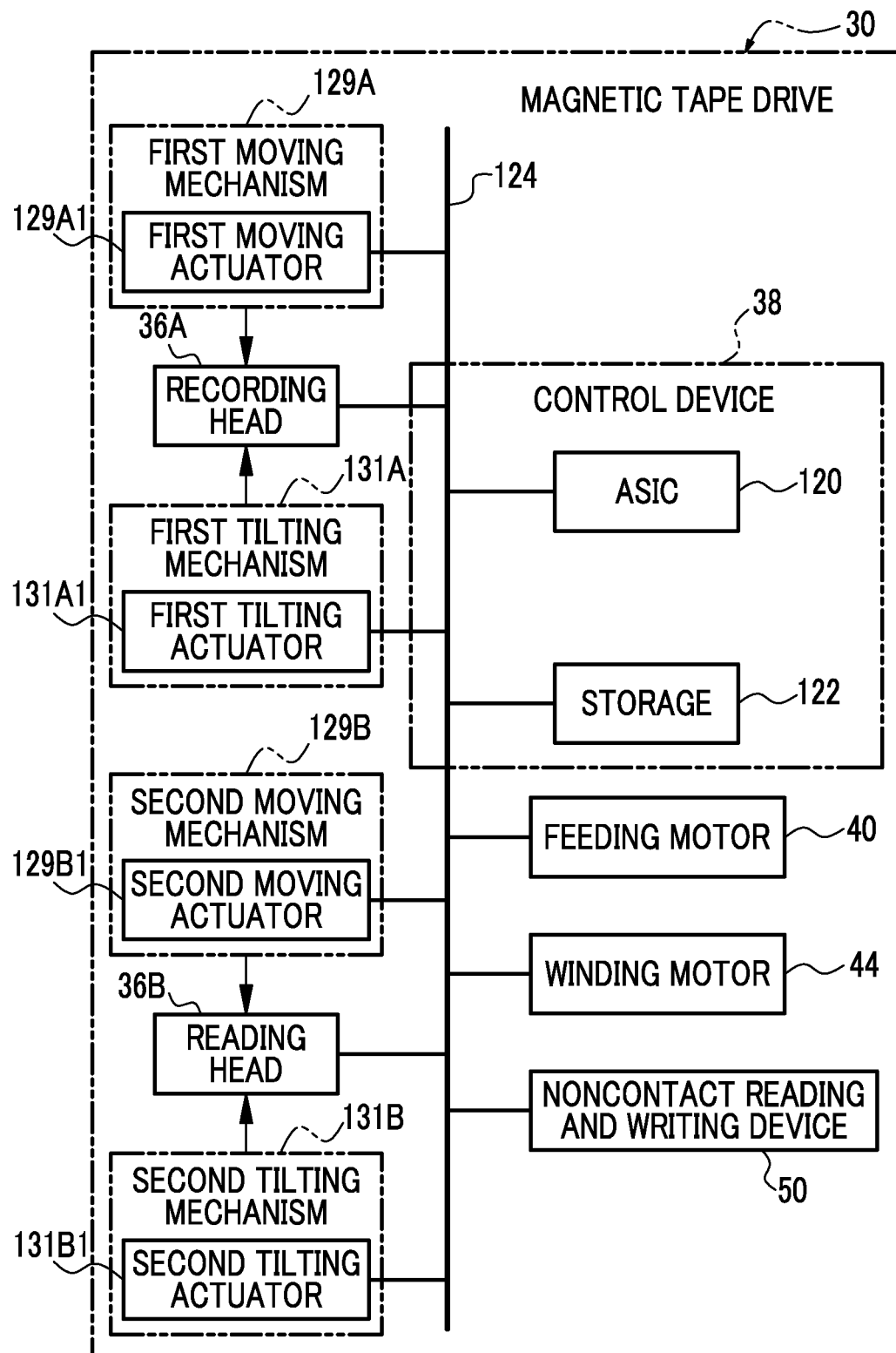
FIG. 12 is a block diagram showing an example of a hardware configuration of an electrical system of the magnetic tape drive.

As shown in FIG. 12 as an example, the control device 38 comprises the ASIC 120 and a storage 122. The ASIC 120 and the storage 122 are connected to a bus 124. This connection method is merely an example, and various devices, such as the storage 122, may be individually and directly connected to the ASIC 120. In addition, the feeding motor 40, the winding motor 44, and the noncontact reading and writing device 50 are also connected to the bus 124. The ASIC 120 controls the feeding motor 40 and the winding motor 44. The feeding motor 40 and the winding motor 44 selectively transport the magnetic tape MT in the forward direction and the backward direction under the control of the ASIC 120. Further, the feeding motor 40 and the winding motor 44 apply tension within an allowable range to the magnetic tape MT and adjust the tension applied to the magnetic tape MT within the allowable range, under the control of the ASIC 120.

Here, the allowable range indicates a range obtained in advance by, for example, a computer simulation and/or a test with a real machine, as a range of tension at which recording and/or reading of data through the magnetic head 36 can be performed without problems. The allowable range is defined in, for example, a table format, and may be updated each time a new product of the magnetic tape cartridge 10 is released, may be changed according to an instruction given from the outside, a predetermined conditions, or the like, or may be fixed.

The ASIC 120 controls the noncontact reading and writing device 50. The noncontact reading and writing device 50 transmits the command signal to the cartridge memory 19 under the control of the ASIC 120. Further, the noncontact reading and writing device 50 receives the response signal which is transmitted from the cartridge memory 19 in response to the command signal transmitted to the cartridge memory 19.

The recording head 36A and the reading head 36B are also connected to the bus 124, and the ASIC 120 controls the recording head 36A and the reading head 36B. The recording head 36A performs a data recording operation of recording data on the magnetic tape MT, a servo reading operation of reading the servo pattern 51 (see FIG. 14) from the magnetic tape MT, and the like, under the control of the ASIC 120. The reading head 36B performs a data reading operation of reading data from the magnetic tape MT, a servo reading operation, and the like, under the control of the ASIC 120.

The magnetic tape drive 30 comprises a first moving mechanism 129A. The first moving mechanism 129A has a first moving actuator 129A1. Examples of the first moving actuator 129A1 include a voice coil motor and/or a piezoelectric actuator. The first moving actuator 129A1 is connected to the bus 124, and the ASIC 120 controls the first moving actuator 129A1. The first moving actuator 129A1 generates power under the control of the ASIC 120. The first moving mechanism 129A operates by receiving the power generated by the first moving actuator 129A1. The ASIC 120 performs a servo control using the first moving mechanism 129A. Here, the servo control using the first moving mechanism 129A indicates a control to move the recording head 36A in the width direction of the magnetic tape MT by operating the first moving mechanism 129A in accordance with the servo pattern 51 read from the magnetic tape MT through the servo reading operation performed by the recording head 36A.

The magnetic tape drive 30 comprises a second moving mechanism 129B. The second moving mechanism 129B has a second moving actuator 129B1. Examples of the second moving actuator 129B1 include a voice coil motor and/or a piezoelectric actuator. The second moving actuator 129B1 is connected to the bus 124, and the ASIC 120 controls the second moving actuator 129B1. The second moving actuator 129B1 generates power under the control of the ASIC 120. The second moving mechanism 129B operates by receiving the power generated by the second moving actuator 129B1. The ASIC 120 performs the servo control using the second moving mechanism 129B. Here, the servo control using the second moving mechanism 129B indicates a control to move the reading head 36B in the width direction of the magnetic tape MT by operating the second moving mechanism 129B in accordance with the servo pattern 51 read from the magnetic tape MT through the servo reading operation performed by the reading head 36B.

The magnetic tape drive 30 comprises a first tilting mechanism 131A. The first tilting mechanism 131A is an example of a "tilting mechanism" according to the technology of the present disclosure. The first tilting mechanism 131A has a first tilting actuator 131A1. Examples of the first tilting actuator 131A1 include a voice coil motor and/or a piezoelectric actuator. The first tilting actuator 131A1 is connected to the bus 124, and the ASIC 120 controls the first tilting actuator 131A1. The first tilting actuator 131A1 generates power under the control of the ASIC 120. The first tilting mechanism 131A tilts the recording head 36A toward an entire length direction side of the magnetic tape MT with respect to a width direction WD (see FIG. 13) of the magnetic tape MT by receiving the power generated by the first tilting actuator 131A1.

The magnetic tape drive 30 comprises a second tilting mechanism 131B. The second tilting mechanism 131B is an example of a "tilting mechanism" according to the technology of the present disclosure. The second tilting mechanism 131B has a second tilting actuator 131B1. Examples of the second tilting actuator 131B1 include a voice coil motor and/or a piezoelectric actuator. The second tilting actuator 131B1 is connected to the bus 124, and the ASIC 120 controls the second tilting actuator 131B1. The second tilting actuator 131B1 generates power under the control of the ASIC 120. The second tilting mechanism 131B tilts the reading head 36B toward the entire length direction side of the magnetic tape MT with respect to the width direction WD (see FIG. 13) of the magnetic tape MT by receiving the power generated by the second tilting actuator 131B1. Hereinafter, the first tilting mechanism 131A and the second tilting mechanism 131B are denoted by a tilting mechanism 131 in a case where a particular distinction is not necessary for description.

Figure 13:
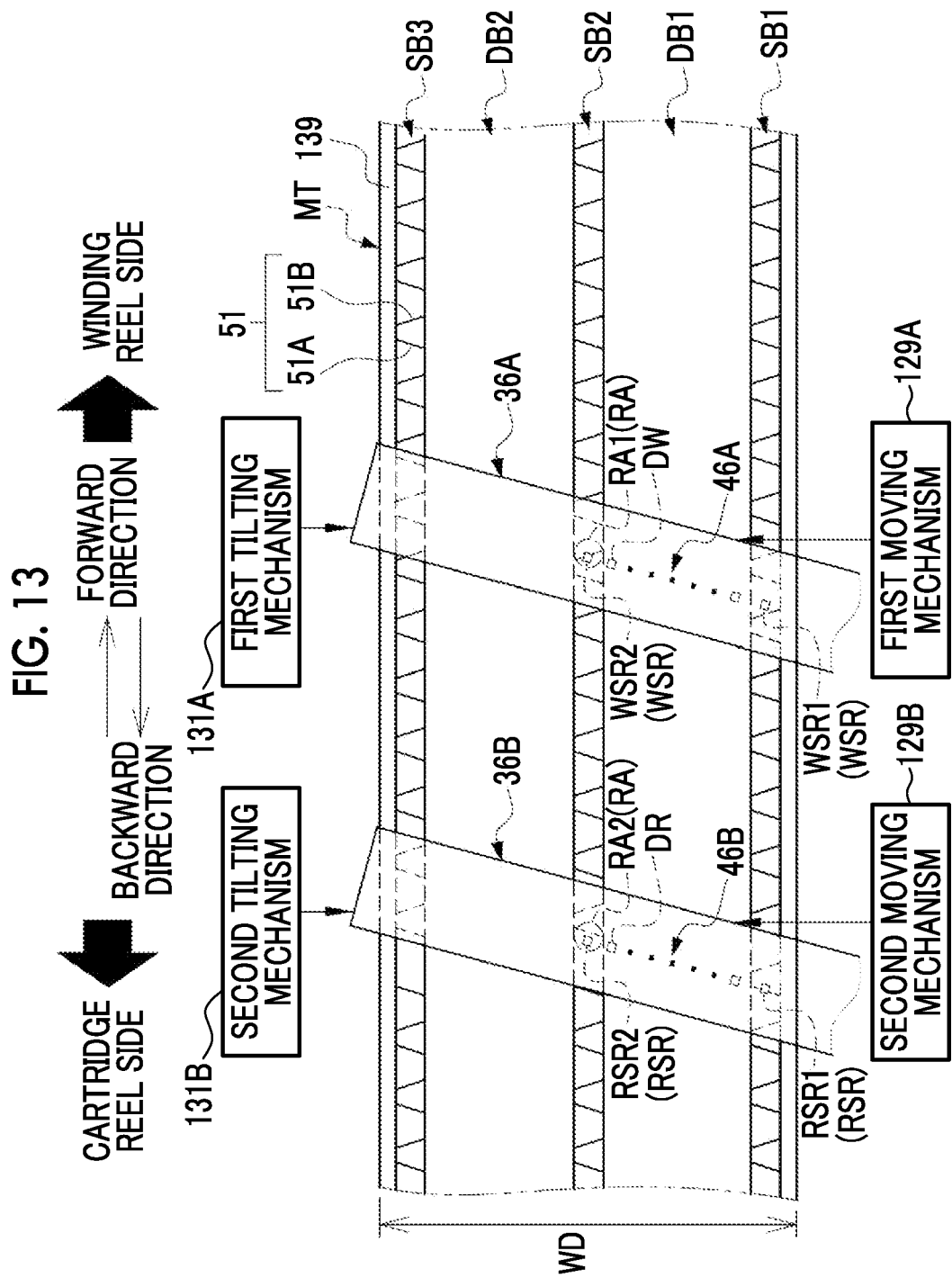
FIG. 13 is a conceptual diagram showing an example of a positional relationship between a recording head, a reading head, and a magnetic tape.

As shown in FIG. 13 as an example, servo bands SB1, SB2, and SB3 and data bands DB1 and DB2 are formed on a front surface 139 of the magnetic tape MT. Hereinafter, in a case where a particular distinction is not necessary, for convenience of description, the servo bands SB1 to SB3 are referred to as a servo band SB, and the data bands DB1 and DB2 are referred to as a data band DB.

The servo bands SB1 to SB3 and the data bands DB1 and DB2 are formed along the entire length direction of the magnetic tape MT. Here, the entire length direction of the magnetic tape MT indicates, in other words, a longitudinal direction (the forward direction and the backward direction) of the magnetic tape MT.

The servo bands SB1 to SB3 are arranged at positions spaced apart from each other in the width direction WD of the magnetic tape MT. For example, the servo bands SB1 to SB3 are arranged at equal intervals along the width direction WD. In the present embodiment, "equal interval" indicates an equal interval in a meaning including an error that is generally allowed in the technical field to which the technology of the present disclosure belongs, and an error to such an extent not contrary to the gist of the technology of the present disclosure, in addition to the perfect equal interval.

The data band DB1 is disposed between the servo band SB1 and the servo band SB2, and the data band DB2 is disposed between the servo band SB2 and the servo band SB3. That is, the servo band SB and the data band DB are alternately arranged along the width direction WD of the magnetic tape MT.

In the servo band SB, the servo patterns 51 are formed at preset intervals along the entire length direction of the magnetic tape MT. The servo pattern 51 has magnetization regions 51A and 51B. The magnetization regions 51A and 51B are a pair of linear magnetization regions tilted line-symmetrically with respect to a virtual straight line along the width direction WD. The magnetization regions 51A and 51B are formed so as to be non-parallel to each other and be tilted by a preset angle in directions opposite to each other on the entire length direction side of the magnetic tape MT.

In the example shown in FIG. 13, although three servo bands SB and two data bands DB are shown, this is merely an example, and two servo bands SB and one data band DB may be used, or the technology of the present disclosure is established even with four or more servo bands SB and three or more data bands DB.

The recording head 36A is disposed on the winding reel 42 side with respect to the reading head 36B in the entire length direction of the magnetic tape MT. The recording head 36A comprises a plurality of magnetic elements. The recording head 36A has a plurality of servo reading elements WSR and a plurality of recording elements DW, as the plurality of magnetic elements.

The recording head 36A is formed so as to be wider than the magnetic tape MT along a lengthwise direction. For example, a length in the lengthwise direction of the recording head 36A is a length enough to cover at least the magnetic tape MT along the width direction WD in a case where writing (recording) of data is performed with respect to any data band DB of the magnetic tape MT by the magnetic element unit 46A in a state in which the recording head 36A is tilted at an angle predetermined as a maximum tilt angle. The plurality of servo reading elements WSR and the plurality of recording elements DW are provided at a central portion in plan view of the recording head 36A, and are linearly disposed at intervals along the lengthwise direction of the recording head 36A.

In the example shown in FIG. 13, the servo reading elements WSR1 and WSR2 are illustrated as the plurality of servo reading elements WSR. Hereinafter, for convenience of description, the servo reading elements WSR1 and WSR2 are denoted by a servo reading element WSR in a case where a particular distinction is not necessary for description. Further, hereinafter, for convenience of description, the servo reading element WSR and the recording element DW are denoted by a "recording head side magnetic element" without reference numerals, in a case where a particular distinction is not necessary for description.

The servo reading element WSR is provided at a position corresponding to the servo band SB. In the example shown in FIG. 13, the servo reading element WSR1 is provided at a position corresponding to the servo band SB1, and the servo reading element WSR2 is provided at a position corresponding to the servo band SB2. The first moving mechanism 129A moves the recording head 36A in the width direction WD in accordance with the servo pattern 51 read by the servo reading element WSR, under the control of the ASIC 120 (see FIG. 12).

Further, in a case where the data band DB on which writing-in of data is to be performed by the magnetic element unit 46A is changed (in the example shown in FIG. 13, in a case where the data band DB on which writing-in of data is to be performed by the magnetic element unit 46A is changed from one to the other of the data bands DB1 and DB2), the first moving mechanism 129A changes a position of the servo reading element WSR by moving the recording head 36A in the width direction WD under the control of the ASIC 120 (see FIG. 12). That is, the first moving mechanism 129A moves the recording head 36A in the width direction WD to move the servo reading element WSR1 from one to the other of a position corresponding to the servo band SB1 and a position corresponding to the servo band SB2 and to move the servo reading element WSR2 from one to the other of a position corresponding to the servo band SB2 and a position corresponding to the servo band SB3. Then, a tracking control is performed, whereby writing-in of data with respect to a designated location in the data band DB is performed by at least one recording element DW.

The plurality of recording elements DW are provided between the servo reading element WSR1 and the servo reading element WSR2. That is, the plurality of recording elements DW are provided between adjacent servo reading elements WSR. The plurality of recording elements DW are disposed at intervals along a longitudinal direction of the recording head 36A (for example, at equal intervals along the longitudinal direction of the recording head 36A). Data recording is performed by the plurality of recording elements DW on the data band DB between adjacent servo bands SB. For example, as shown in FIG. 13, in a case where the position of the servo reading element WSR1 corresponds to the position of the servo band SB1 and the position of the servo reading element WSR2 corresponds to the position of the servo band SB2, the plurality of recording elements DW record data on the data band DB1.

The reading head 36B comprises a plurality of magnetic elements. The reading head 36B has a plurality of servo reading elements RSR and a plurality of reading elements DR, as the plurality of magnetic elements. The reading head 36B is formed so as to be wider than the magnetic tape MT along a lengthwise direction, as in the recording head 36A. For example, a length in the lengthwise direction of the reading head 36B is a length enough to cover at least the magnetic tape MT along the width direction WD in a case where reading of data is performed with respect to any data band DB of the magnetic tape MT by the magnetic element unit 46B in a state in which the reading head 36B is tilted at an angle (for example, the same angle as the angle of the recording head 36A) predetermined as a maximum tilt angle. The plurality of servo reading elements RSR and the plurality of reading elements DR are provided at a central portion in plan view of the reading head 36B, and are linearly disposed at intervals along the lengthwise direction of the reading head 36B.

In the example shown in FIG. 13, the servo reading elements RSR1 and RSR2 are illustrated as the plurality of servo reading elements RSR. Hereinafter, for convenience of description, the servo reading elements RSR1 and RSR2 are denoted by a servo reading element RSR in a case where a particular distinction is not necessary for description. Further, hereinafter, for convenience of description, the servo reading element WSR and the servo reading element RSR are denoted by a servo reading element SR in a case where a particular distinction is not necessary for description. Further, hereinafter, for convenience of description, the servo reading element RSR and the reading element DR are denoted by a "reading head side magnetic element" without reference numerals, in a case where a particular distinction is not necessary for description.

The servo reading element RSR is provided at a position corresponding to the servo band SB. In the example shown in FIG. 13, the servo reading element RSR1 is provided at a position corresponding to the servo band SB1, and the servo reading element RSR2 is provided at a position corresponding to the servo band SB2. The second moving mechanism 129B moves the reading head 36B in the width direction WD in accordance with the servo pattern 51 read by the servo reading element RSR under the control of the ASIC 120 (see FIG. 12).

Further, in a case where the data band DB from which reading of data is to be performed by the magnetic element unit 46B is changed (in the example shown in FIG. 13, in a case where the data band DB from which reading of data is to be performed by the magnetic element unit 46B is changed from one to the other of the data bands DB1 and DB2), the second moving mechanism 129B changes a position of the servo reading element RSR by moving the reading head 36B in the width direction WD under the control of the ASIC 120 (see FIG. 12). That is, the second moving mechanism 129B moves the reading head 36B in the width direction WD to move the servo reading element RSR1 from one to the other of a position corresponding to the servo band SB1 and a position corresponding to the servo band SB2 and to move the servo reading element RSR2 from one to the other of a position corresponding to the servo band SB2 and a position corresponding to the servo band SB3. Then, the tracking control is performed, whereby reading of data with respect to a designated location in the data band DB is performed by at least one reading element DR.

The plurality of reading elements DR are provided between the servo reading element RSR1 and the servo reading element RSR2. That is, the plurality of reading elements DR are provided between adjacent servo reading elements RSR. The plurality of reading elements DR are disposed at intervals along a longitudinal direction of the reading head 36B (for example, at equal intervals along the longitudinal direction of the reading head 36B). Data reading is performed by the plurality of reading elements DR from the data band DB between adjacent servo bands SB. For example, as shown in FIG. 13, in a case where the position of the servo reading element RSR1 corresponds to the position of the servo band SB1 and the position of the servo reading element RSR2 corresponds to the position of the servo band SB2, the plurality of reading elements DR read data from the data band DB1.

The recording head 36A comprises a rotation shaft RA1. The rotation shaft RA1 is provided at the central portion in plan view of the recording head 36A. The recording head 36A is rotatably held by the first tilting mechanism 131A via the rotation shaft RA1. The recording head 36A is held by the first tilting mechanism 131A in a state in which the disposition direction of a plurality of the recording head side magnetic elements is tilted toward the entire length direction side of the magnetic tape MT with respect to the width direction WD of the magnetic tape MT. In the example shown in FIG. 13, the disposition direction of the plurality of recording head side magnetic elements is tilted toward the winding reel 42 side with respect to the width direction WD of the magnetic tape MT.

The first tilting mechanism 131A receives power from the first tilting actuator 131A1 (see FIG. 12) to rotate the recording head 36A about the rotation shaft RA1 on the front surface 139 of the magnetic tape MT. The first tilting mechanism 131A changes a direction (azimuth) of the tilt and an angle of the tilt of the disposition direction of the plurality of recording head side magnetic elements with respect to the width direction WD by rotating the recording head 36A about the rotation shaft RA1 on the front surface 139 of the magnetic tape MT under the control of the ASIC 120 (see FIG. 12).

The reading head 36B comprises a rotation shaft RA2. The rotation shaft RA2 is provided at the central portion in plan view of the reading head 36B. The reading head 36B is rotatably held by the second tilting mechanism 131B via the rotation shaft RA2. The reading head 36B is held by the second tilting mechanism 131B in a state in which the disposition direction of a plurality of the reading head side magnetic elements is tilted toward the entire length direction side of the magnetic tape MT with respect to the width direction WD of the magnetic tape MT. In the example shown in FIG. 13, the disposition direction of the plurality of reading head side magnetic elements is tilted toward the winding reel 42 side with respect to the width direction WD of the magnetic tape MT.

The second tilting mechanism 131B receives power from the second tilting actuator 131B1 (see FIG. 12) to rotate the reading head 36B about the rotation shaft RA2 on the front surface 139 of the magnetic tape MT. The second tilting mechanism 131B changes a direction (azimuth) of the tilt and an angle of the tilt of the disposition direction of the plurality of reading head side magnetic elements with respect to the width direction WD by rotating the reading head 36B about the rotation shaft RA2 on the front surface 139 of the magnetic tape MT under the control of the ASIC 120 (see FIG. 12). Hereinafter, for convenience of description, the rotation shafts RA1 and RA2 are denoted by a rotation shaft RA in a case where a distinction is not necessary for description.

In the example shown in FIG. 13, three servo bands SB are formed on the magnetic tape MT, but this is merely an example. For example, only two servo bands SB may be formed on the magnetic tape MT, or four or more servo bands SB may be formed on the magnetic tape MT. Further, the servo reading element RSR may be provided on the reading head 36B at a position corresponding to the servo band SB by the number of the servo band SB, and the servo reading element WSR may be provided on the recording head 36A at a position corresponding to the servo band SB by the number of the servo band SB.

Figure 14:
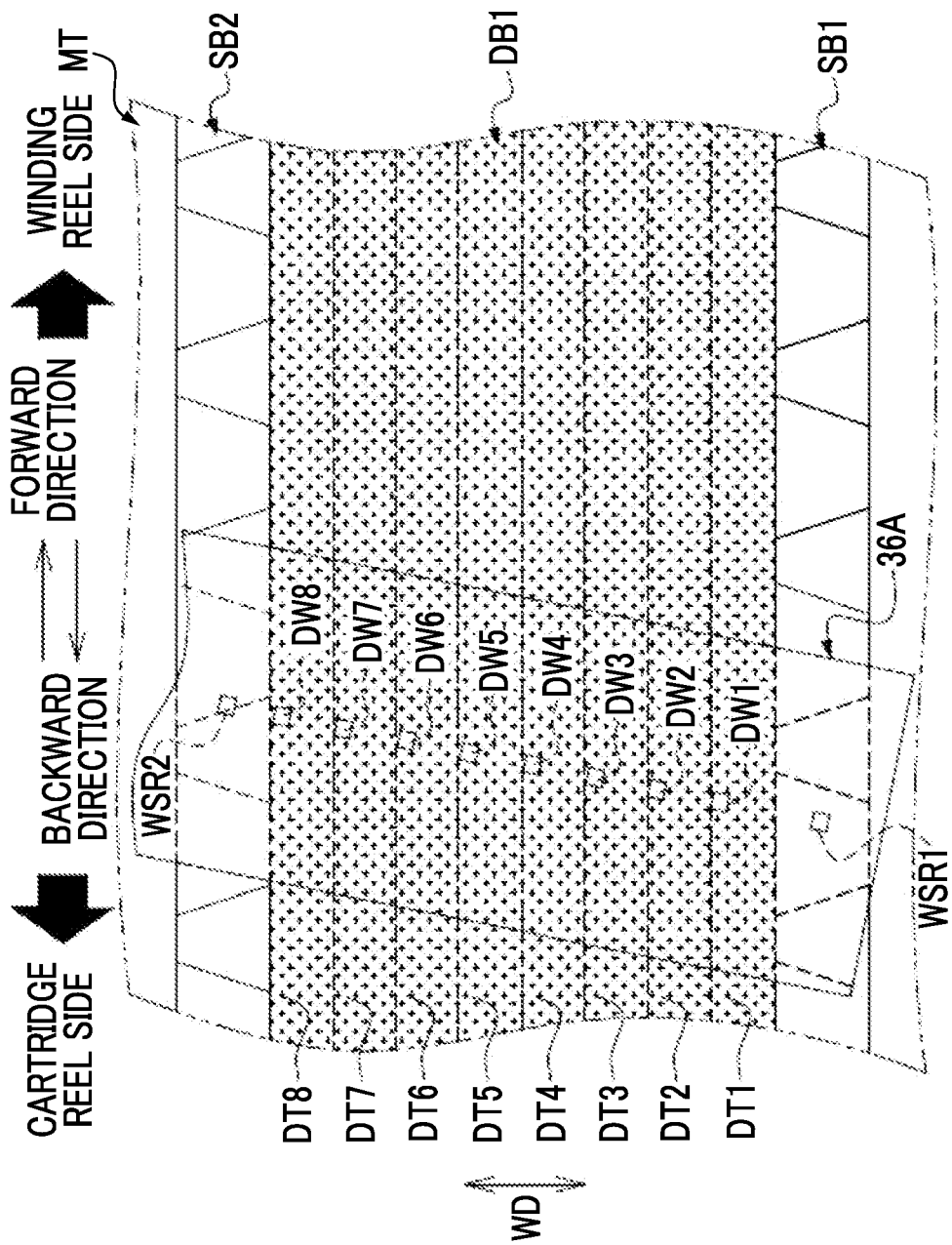
FIG. 14 is a conceptual diagram showing an example of a positional relationship between a data band and a recording head side magnetic element.

As shown in FIG. 14 as an example, data tracks DT1, DT2, DT3, DT4, DT5, DT6, DT7, and DT8 are formed in the data band DB1. The data tracks DT1, DT2, DT3, DT4, DT5, DT6, DT7, and DT8 are an example of a "plurality of tracks" according to the technology of the present disclosure.

The recording head 36A has, as the plurality of recording elements DW, the recording elements DW1, DW2, DW3, DW4, DW5, DW6, DW7, and DW8 provided between the servo reading element WSR1 and the servo reading element WSR2 along the width direction WD. The recording elements DW1 to DW8 correspond to the data tracks DT1 to DT8 on a one-to-one basis.

In the example shown in FIG. 14, the disposition direction of the plurality of recording head side magnetic elements is tilted toward the winding reel 42 side with respect to the width direction WD of the magnetic tape MT. The degree to which the disposition direction of the plurality of recording head side magnetic elements is tilted with respect to the width direction WD of the magnetic tape MT is specified by the ASIC 120 from, for example, a phase difference between a signal obtained by reading the servo pattern 51 of the servo band SB2 through the servo reading element WSR2 and a signal obtained by reading the servo pattern 51 of the servo band SB1 through the servo reading element WSR1. In addition to this, there is also a method in which the degree of tilt is specified by the ASIC 120 from, for example, a time difference between a time at which the magnetization region 51A of the servo band SB2 is read by the servo reading element WSR2 and a time at which the magnetization region 51A of the servo band SB1 is read by the servo reading element WSR1, and/or a time difference between a time at which the magnetization region 51B of the servo band SB2 is read by the servo reading element WSR2 and a time at which the magnetization region 51B of the servo band SB1 is read by the servo reading element WSR1.

As shown in FIG. 14 as an example, the magnetic tape MT runs along the forward direction in a state in which the disposition direction of the plurality of recording head side magnetic elements is tilted toward the winding reel 42 side with respect to the width direction WD of the magnetic tape MT. Then, data recording is performed by the recording elements DW1 to DW8 while the magnetic tape MT runs along the forward direction.

Although not shown, a plurality of data tracks DT corresponding to the data tracks DT1, DT2, DT3, DT4, DT5, DT6, DT7, and DT8 are also formed in the data band DB2.

Further, hereinafter, the data tracks DT1, DT2, DT3, DT4, DT5, DT6, DT7, and DT8 are denoted by a data track DT, and the recording elements DW1, DW2, DW3, DW4, DW5, and DW6, DW7, and DW8 are denoted by a recording element DW, in a case where a particular distinction is not necessary. Further, hereinafter, the reading elements DR1, DR2, DR3, DR4, DR5, DR6, DR7, and DR8 are denoted by a reading element DR in a case where a particular distinction is not necessary.

Figure 15:
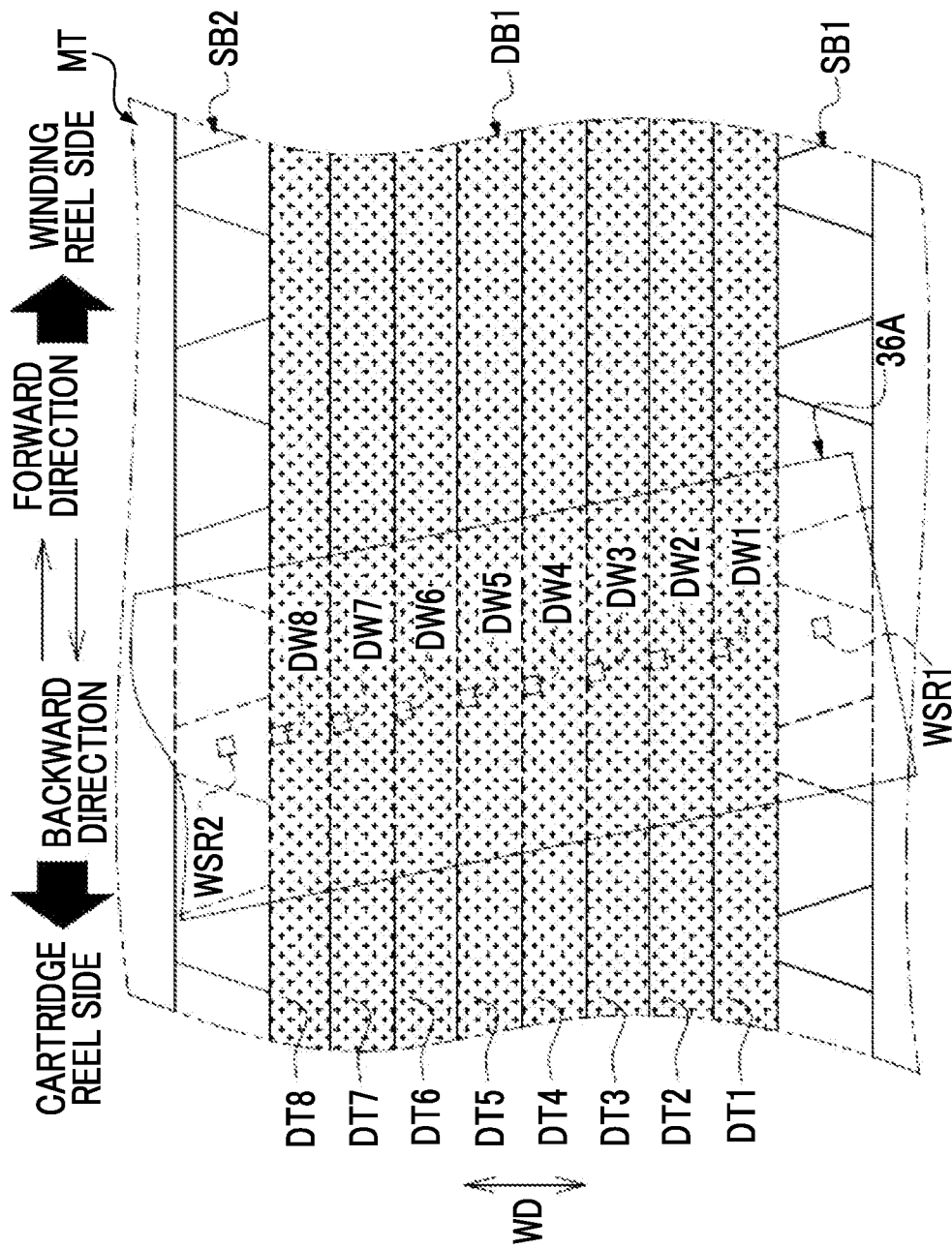
FIG. 15 is a conceptual diagram showing an example of the positional relationship between the data band and the recording head side magnetic element.

As shown in FIG. 15 as an example, the magnetic tape MT runs along the backward direction in a state in which the disposition direction of the plurality of recording head side magnetic elements is tilted toward the cartridge reel 18 side with respect to the width direction WD of the magnetic tape MT. Then, data recording is performed by the recording elements DW1 to DW8 while the magnetic tape MT runs along the backward direction.

Here, a state in which the disposition direction of the plurality of recording head side magnetic elements is tilted toward the cartridge reel 18 side with respect to the width direction WD of the magnetic tape MT indicates a state in which the recording head 36A shown in FIG. 14 is tilted toward a line-symmetrical position with a virtual straight line passing through the rotation shaft RA1 (see FIG. 13) along the width direction WD, as an axis. That is, in the entire length direction of the magnetic tape MT, the direction of the tilt of the disposition direction of the plurality of recording head side magnetic elements in the recording head 36A shown in FIG. 15 with respect to the width direction WD is a direction opposite to the direction of the tilt of the disposition direction of the plurality of the recording head side magnetic elements in the recording head 36A shown in FIG. 14 with respect to the width direction WD.

Figure 16:
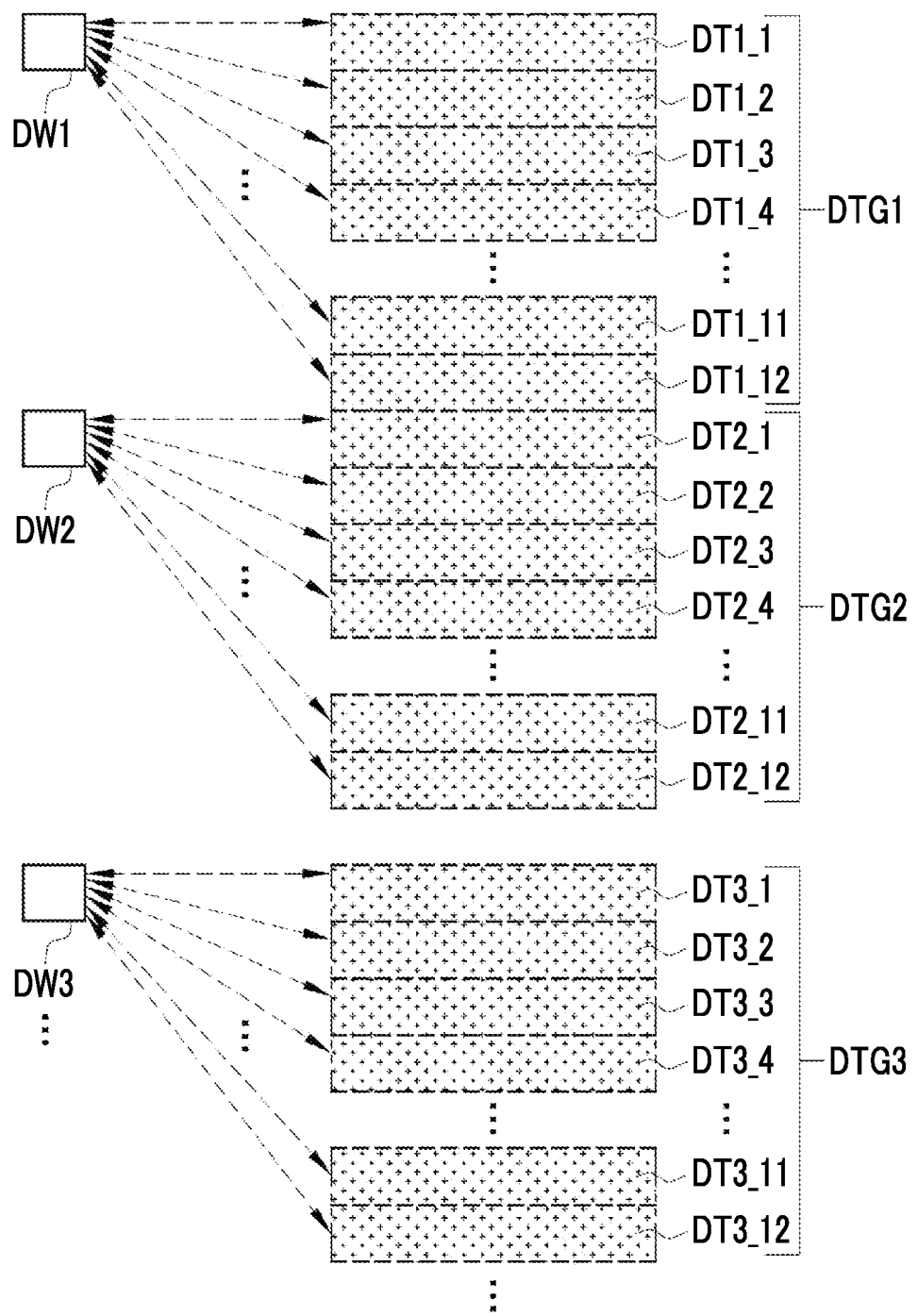
FIG. 16 is a conceptual diagram showing an example of a correspondence relationship between a recording element and data tracks included in a data track group.

As shown in FIG. 16 as an example, each of the data tracks DT has one data track group DTG. That is, the data tracks DT1, DT2, DT3, DT4, DT5, DT6, DT7, and DT8 correspond to data track groups DTG1, DTG2, DTG3, DTG4, DTG5, DTG6, DTG7, and DTG8.

The data track group DTG1 includes data tracks DT1_1, DT1_2, DT1_3, DT1_4, ..., and DT1_12. The recording element DW1 is in charge of recording data on the data track group DTG1, that is, recording data on the data tracks DT1_1, DT1_2, DT1_3, DT1_4, ..., and DT1_12.

Specifically, in a case of performing data recording with respect to the data track DT1_1, the first moving mechanism 129A moves the recording head 36A in the width direction WD of the magnetic tape MT to move the recording element DW1 to a position on the data track DT_1 (for example, a position directly facing the data track DT_1 of the magnetic tape MT). Further, in a case of performing data recording with respect to the data track DT1_2, the first moving mechanism 129A moves the recording head 36A in the width direction WD of the magnetic tape MT to move the recording element DW1 to a position on the data track DT1_2. The same applies to the data track groups DTG2 to DTG8 and the recording elements DW2 to DW8.

Hereinafter, for convenience of description, reference numerals at the end of the data tracks DT1, DT2, DT3, DT4, DT5, DT6, DT7, and DT8 are denoted by "n" in a case where a particular distinction is not necessary for description. In addition, hereinafter, for convenience of description, reference numerals at the end of the data tracks DTn_1, DTn_2, DTn_3, DTn_4, ..., and DTn_12 are denoted by "m", and are referred to as a data track DTn_m, in a case where a particular distinction is not necessary for description. Further, hereinafter, for convenience of description, among reference numerals at the end of the data tracks DTn_1, DTn_2, DTn_3, DTn_4, ..., and DTn_12, a reference numeral having an even number is denoted by "mE" and is referred to as an even-numbered data track DTn_mE, in a case where a particular distinction is not necessary for description. Further, hereinafter, for convenience of description, among reference numerals at the end of the data tracks DTn_1, DTn_2, DTn_3, DTn_4, ..., and DTn_12, a reference numeral having an odd number is denoted by "mO" and is referred to as an odd-numbered data track DTn_mO, in a case where a particular distinction is not necessary for description.

Here, in a case where the magnetic tape MT runs along the forward direction in a state in which the disposition direction of the plurality of recording head side magnetic elements is tilted toward the winding reel 42 side with respect to the width direction WD of the magnetic tape MT, data recording is performed with respect to the odd-numbered data tracks DTn_mO by the recording elements DW1 to DW8. Further, in a case where the magnetic tape MT runs along the backward direction in a state in which the disposition direction of the plurality of recording head side magnetic elements is tilted toward the cartridge reel 18 side with respect to the width direction WD of the magnetic tape MT, data recording is performed with respect to the even-numbered data tracks DTn_mE by the recording elements DW1 to DW8.

Such a data recording method is merely an example, and data recording may be performed with respect to the even-numbered data tracks DTn_mE by the recording elements DW1 to DW8 in a case where the magnetic tape MT runs along the forward direction in a state in which the disposition direction of the plurality of recording head side magnetic elements is tilted toward the winding reel 42 side with respect to the width direction WD of the magnetic tape MT, and data recording may be performed with respect to the odd-numbered data tracks DTn_mO in a case where the magnetic tape MT runs along the backward direction in a state in which the disposition direction of the plurality of recording head side magnetic elements is tilted toward the cartridge reel 18 side with respect to the width direction WD of the magnetic tape MT.

Further, an aspect in which the disposition direction of the plurality of recording head side magnetic elements is tilted toward the winding reel 42 side with respect to the width direction WD of the magnetic tape MT and an aspect in which the disposition direction of the plurality of recording head side magnetic elements is tilted toward the cartridge reel 18 side with respect to the width direction WD of the magnetic tape MT need only be switched between a case where data recording is performed with respect to the even-numbered data tracks DTn_mE and a case where data recording is performed with respect to the odd-numbered data tracks DTn_mO, in a case where data recording is performed with respect to the data tracks DTn_1 to DTn_6 among the data tracks DTn_1, DTn_2, DTn_3, DTn_4, ..., and DTn_12 in a state in which the magnetic tape MT runs along the forward direction and data recording is performed with respect to the data tracks DTn_7 to DTn_12 among the data tracks DTn_1, DTn_2, DTn_3, DTn_4, ..., and DTn_12 in a state in which the magnetic tape MT runs along the backward direction.

As shown in FIGS. 14 to 16, the disposition direction of the plurality of recording head side magnetic elements is brought into a state of being tilted toward the winding reel 42 side with respect to the width direction WD of the magnetic tape MT in a case where data recording is performed with respect to the odd-numbered data tracks DTn_mO (see FIG. 14), whereas the disposition direction of the plurality of recording head side magnetic elements is brought into a state of being tilted toward the cartridge reel 18 side with respect to the width direction WD of the magnetic tape MT in a case where data recording is performed with respect to the even-numbered data tracks DTn_mE (see FIG. 15). This means that adjacent tracks among the plurality of data tracks DT, that is, the odd-numbered data track DTn_mO and the even-numbered data track DTn_mE, are assigned directions opposite to each other as the directions of the tilt of the disposition direction of the plurality of recording head side magnetic elements with respect to the width direction WD.

Figure 17:
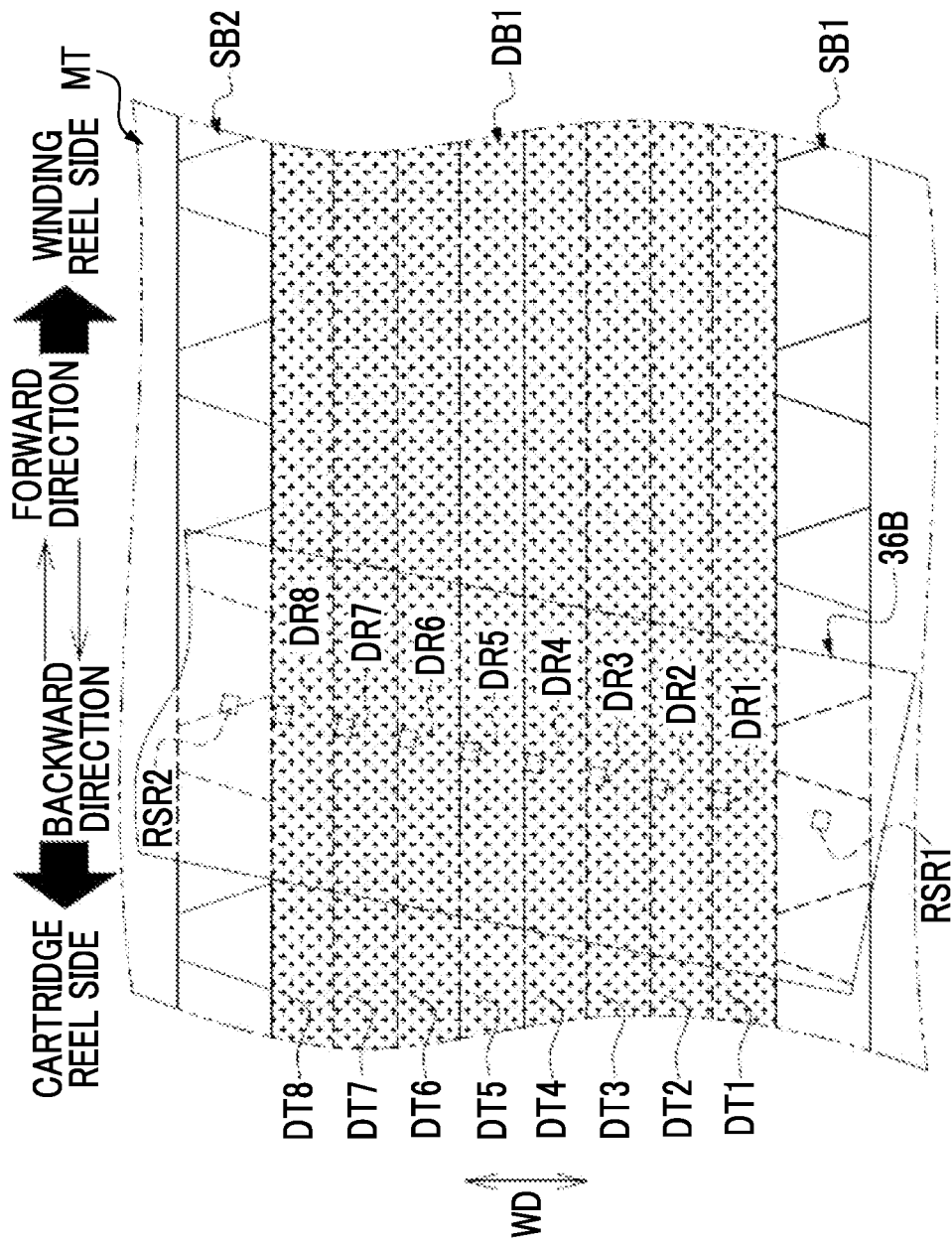
FIG. 17 is a conceptual diagram showing an example of a positional relationship between the data band and a reading head side magnetic element.

As shown in FIG. 17 as an example, the reading head 36B has, as the plurality of reading elements DR, the reading elements DR1, DR2, DR3, DR4, DR5, DR6, DR7, and DR8 provided between the servo reading elements RSR1 and the servo reading elements RSR2 along the width direction WD. The reading elements DR1 to DR8 correspond to the data tracks DT1 to DT8 on a one-to-one basis.

In the example shown in FIG. 17, the disposition direction of the plurality of reading head side magnetic elements is tilted toward the winding reel 42 side with respect to the width direction WD of the magnetic tape MT. The degree to which the disposition direction of the plurality of reading head side magnetic elements is tilted with respect to the width direction WD of the magnetic tape MT is specified by the ASIC 120 from, for example, a phase difference between a signal obtained by reading the servo pattern 51 of the servo band SB2 through the servo reading element RSR2 and a signal obtained by reading the servo pattern 51 of the servo band SB1 through the servo reading element RSR1. In addition to this, there is also a method in which the degree of tilt is specified by the ASIC 120 from, for example, a time difference between a time at which the magnetization region 51A of the servo band SB2 is read by the servo reading element RSR2 and a time at which the magnetization region 51A of the servo band SB1 is read by the servo reading element RSR1, and/or a time difference between a time at which the magnetization region 51B of the servo band SB2 is read by the servo reading element RSR2 and a time at which the magnetization region 51B of the servo band SB1 is read by the servo reading element RSR1.

As shown in FIG. 17 as an example, the magnetic tape MT runs along the forward direction in a state in which the disposition direction of the plurality of reading head side magnetic elements is tilted toward the winding reel 42 side with respect to the width direction WD of the magnetic tape MT. Then, data reading is performed by the reading elements DR1 to DR8 while the magnetic tape MT runs along the forward direction.

Figure 18:
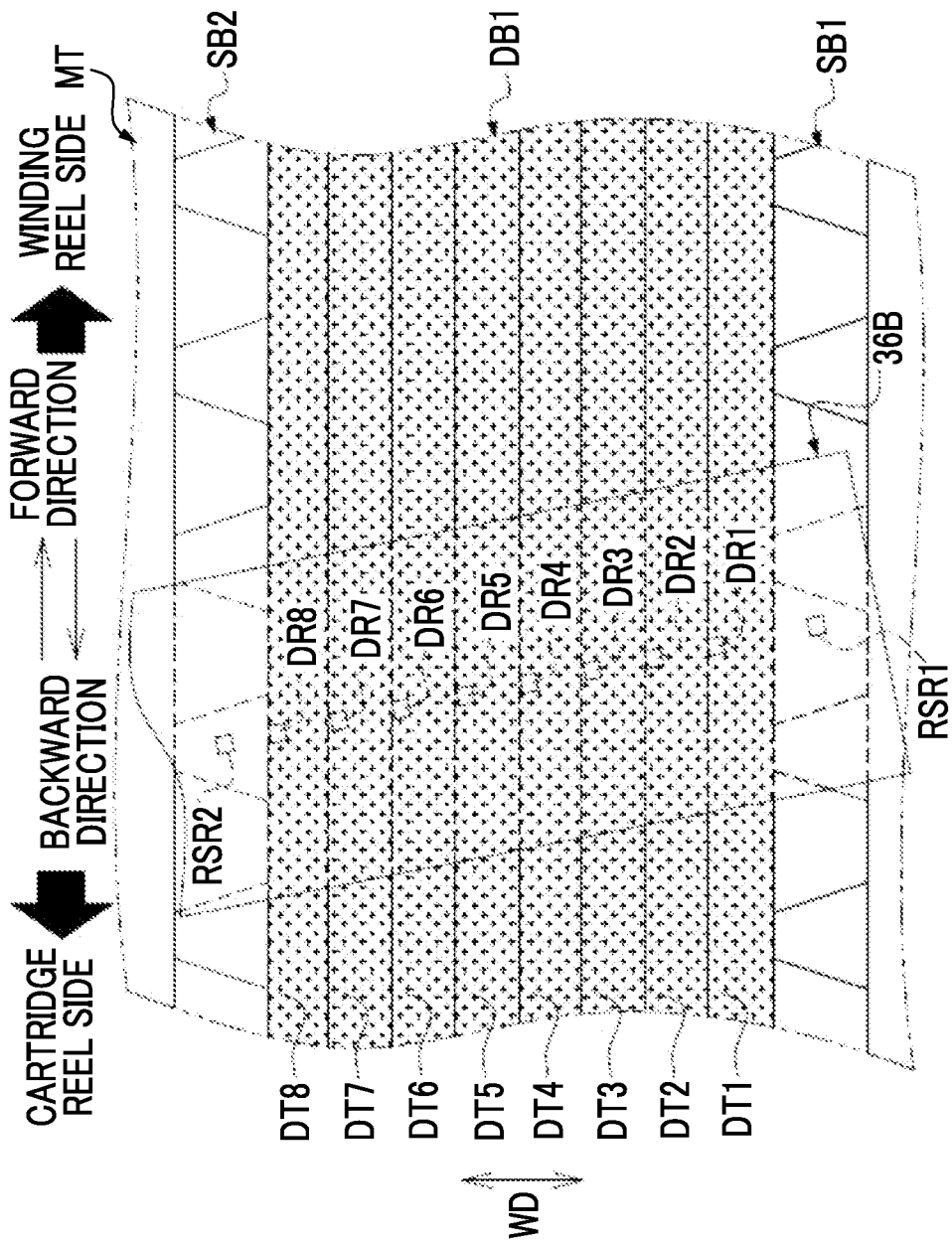
FIG. 18 is a conceptual diagram showing an example of the positional relationship between the data band and the reading head side magnetic element.

As shown in FIG. 18 as an example, the magnetic tape MT runs along the backward direction in a state in which the disposition direction of the plurality of reading head side magnetic elements is tilted toward the cartridge reel 18 side with respect to the width direction WD of the magnetic tape MT. Then, data reading is performed by the reading elements DR1 to DR8 while the magnetic tape MT runs along the backward direction.

The reading element DR1 is in charge of reading data from the data track group DTG1, that is, reading data from the data tracks DT1_1, DT1_2, DT1_3, DT1_4, . . . , DT1_11, and DT1_12. Specifically, in a case of performing data recording with respect to the data track DT1_$m$, the second moving mechanism 129B moves the reading head 36B in the width direction WD of the magnetic tape MT to move the reading element DR1 to a position on the data track DT1_$m$ (for example, a position directly facing the data track DT1_1 on a thickness direction side of the magnetic tape MT). The same applies to the data track groups DTG2 to DTG8 and the reading elements DR2 to DR8.

Here, in a case where the magnetic tape MT runs along the forward direction in a state in which the disposition direction of the plurality of reading head side magnetic elements is tilted toward the winding reel 42 side with respect to the width direction WD of the magnetic tape MT, data reading is performed from the odd-numbered data tracks DTn_mO by the reading elements DR1 to DR8. Further, in a case where the magnetic tape MT runs along the backward direction in a state in which the disposition direction of the plurality of reading head side magnetic elements is tilted toward the cartridge reel 18 side with respect to the width direction WD of the magnetic tape MT, data reading is performed from the even-numbered data tracks DTn_mE by the reading elements DR1 to DR8.

Such a data reading method is merely an example, and data reading may be performed from the even-numbered data tracks DTn_mE by the reading elements DR1 to DR8 in a case where the magnetic tape MT runs along the forward direction in a state in which the disposition direction of the plurality of reading head side magnetic elements is tilted toward the winding reel 42 side with respect to the width direction WD of the magnetic tape MT, and data reading may be performed from the odd-numbered data tracks DTn_mO in a case where the magnetic tape MT runs along the backward direction in a state in which the disposition direction of the plurality of reading head side magnetic elements is tilted toward the cartridge reel 18 side with respect to the width direction WD of the magnetic tape MT.

Further, an aspect in which the disposition direction of the plurality of reading head side magnetic elements is tilted toward the winding reel 42 side with respect to the width direction WD of the magnetic tape MT and an aspect in which the disposition direction of the plurality of reading head side magnetic elements is tilted toward the cartridge reel 18 side with respect to the width direction WD of the magnetic tape MT need only be switched between a case where data reading is performed from the even-numbered data tracks DTn_mE and a case where data reading is performed from the odd-numbered data tracks DTn_mO, in a case where data reading is performed from the data tracks DTn_1 to DTn_6 among the data tracks DTn_1, DTn_2, DTn_3, DTn_4, . . . , and DTn_12 in a state in which the magnetic tape MT runs along the forward direction and data reading is performed from the data tracks DTn_7 to DTn_12 among the data tracks DTn_1, DTn_2, DTn_3, DTn_4, . . . , and DTn_12 in a state in which the magnetic tape MT runs along the backward direction.

Figure 19:
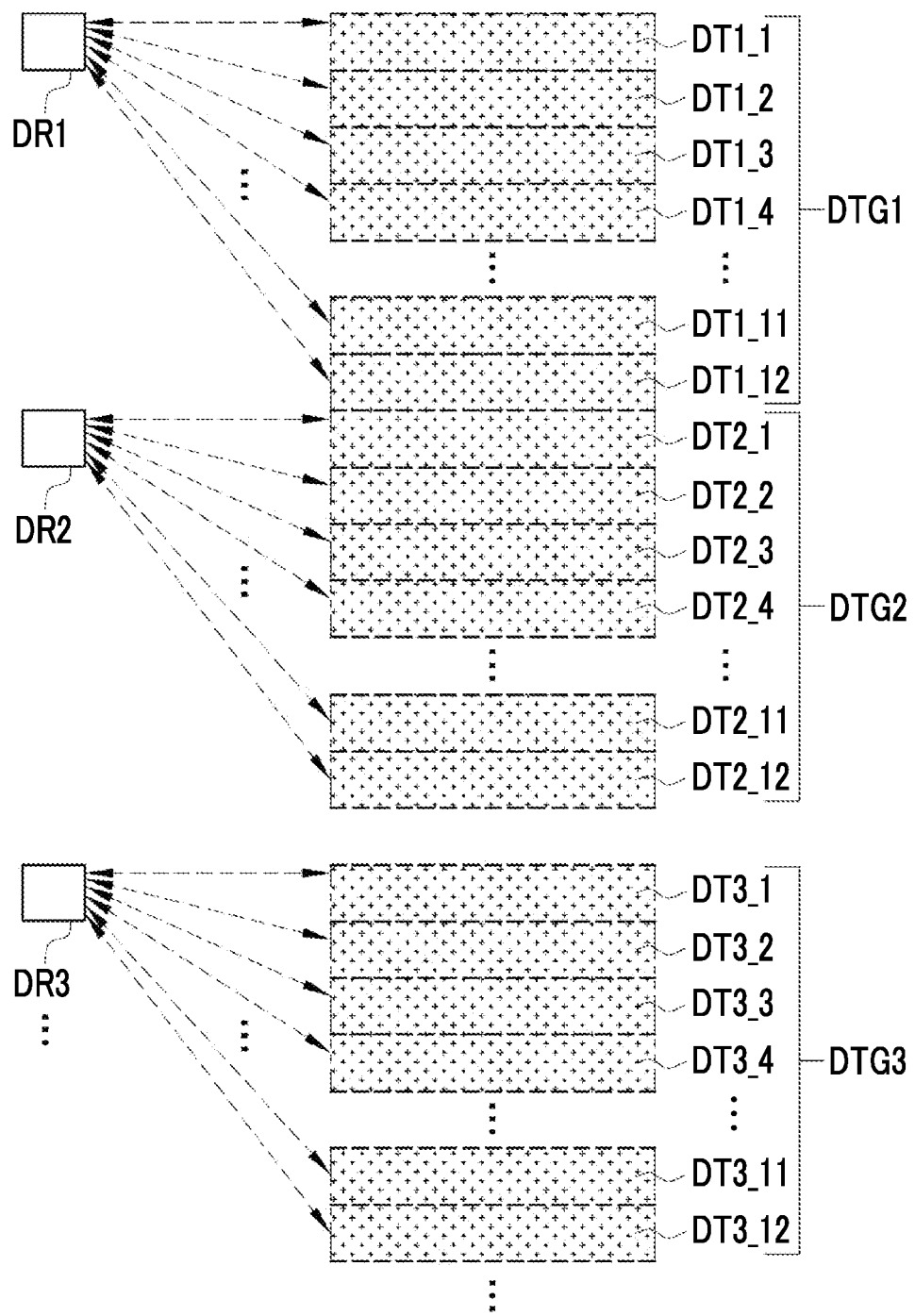
FIG. 19 is a conceptual diagram showing an example of a correspondence relationship between a reading element and data tracks included in a data track group.

As shown in FIGS. 17 to 19, the disposition direction of the plurality of reading head side magnetic elements is brought into a state of being tilted toward the winding reel 42 side with respect to the width direction WD of the magnetic tape MT in a case where data reading is performed from the odd-numbered data tracks DTn_mO (see FIG. 17), whereas the disposition direction of the plurality of reading head side magnetic elements is brought into a state of being tilted toward the cartridge reel 18 side with respect to the width direction WD of the magnetic tape MT in a case where data reading is performed from the even-numbered data tracks DTn_mE (see FIG. 18). This means that adjacent tracks among the plurality of data tracks DT, that is, the odd-numbered data track DTn_mO and the even-numbered data track DTn_mE, are assigned directions opposite to each other as the directions of the tilt of the disposition direction of the plurality of reading head side magnetic elements with respect to the width direction WD.

Figure 20:
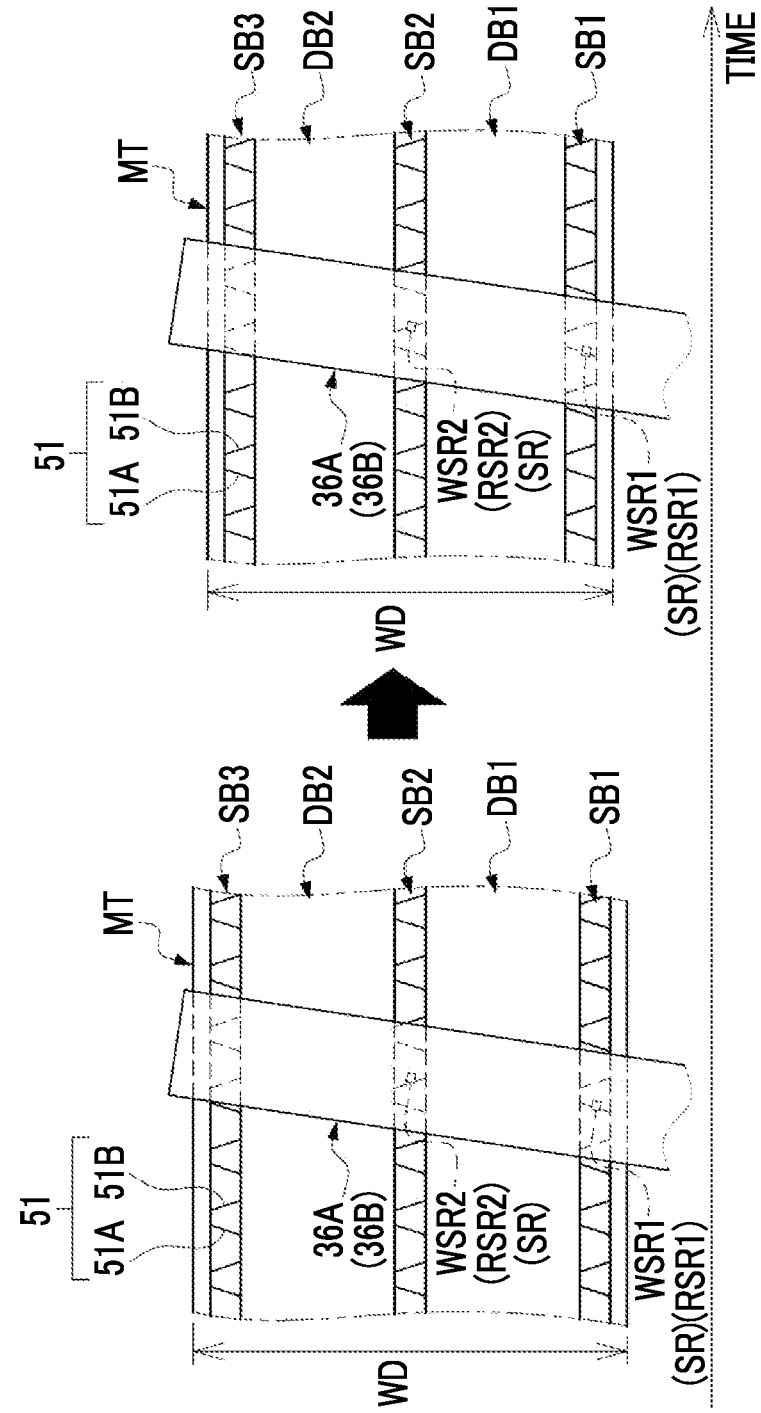
FIG. 20 is a conceptual diagram showing an example of an aspect in which a width of the magnetic tape contracts with passage of time.

Meanwhile, as shown in FIG. 20 as an example, the width of the magnetic tape MT on which the plurality of servo bands SB are formed contracts with the passage of time. In the example shown in FIG. 20, an aspect in which the width of the magnetic tape MT in the width direction WD contracts is shown, but conversely, the width of the magnetic tape MT in the width direction WD may expand. As factors that cause the width of the magnetic tape MT to contract or expand, a storage environment of the magnetic tape MT, a stress applied to the magnetic tape MT loaded in the magnetic tape cartridge 10, and the like are considered.

For example, in a case where the width of the magnetic tape MT in the width direction WD contracts with the passage of time, the position of the servo reading element SR with respect to the servo pattern 51 may deviate from a preset position (for example, a central position of the magnetization region 51A and the magnetization region 51B) determined by design. In a case where the position of the servo reading element SR with respect to the servo pattern 51 deviates from the preset position determined by design, the accuracy of the servo control may be lowered, the positions of the recording element DW and the data track DT may deviate from each other, and the positions of the reading element DR and the data track DT may also deviate from each other.

Figure 21:
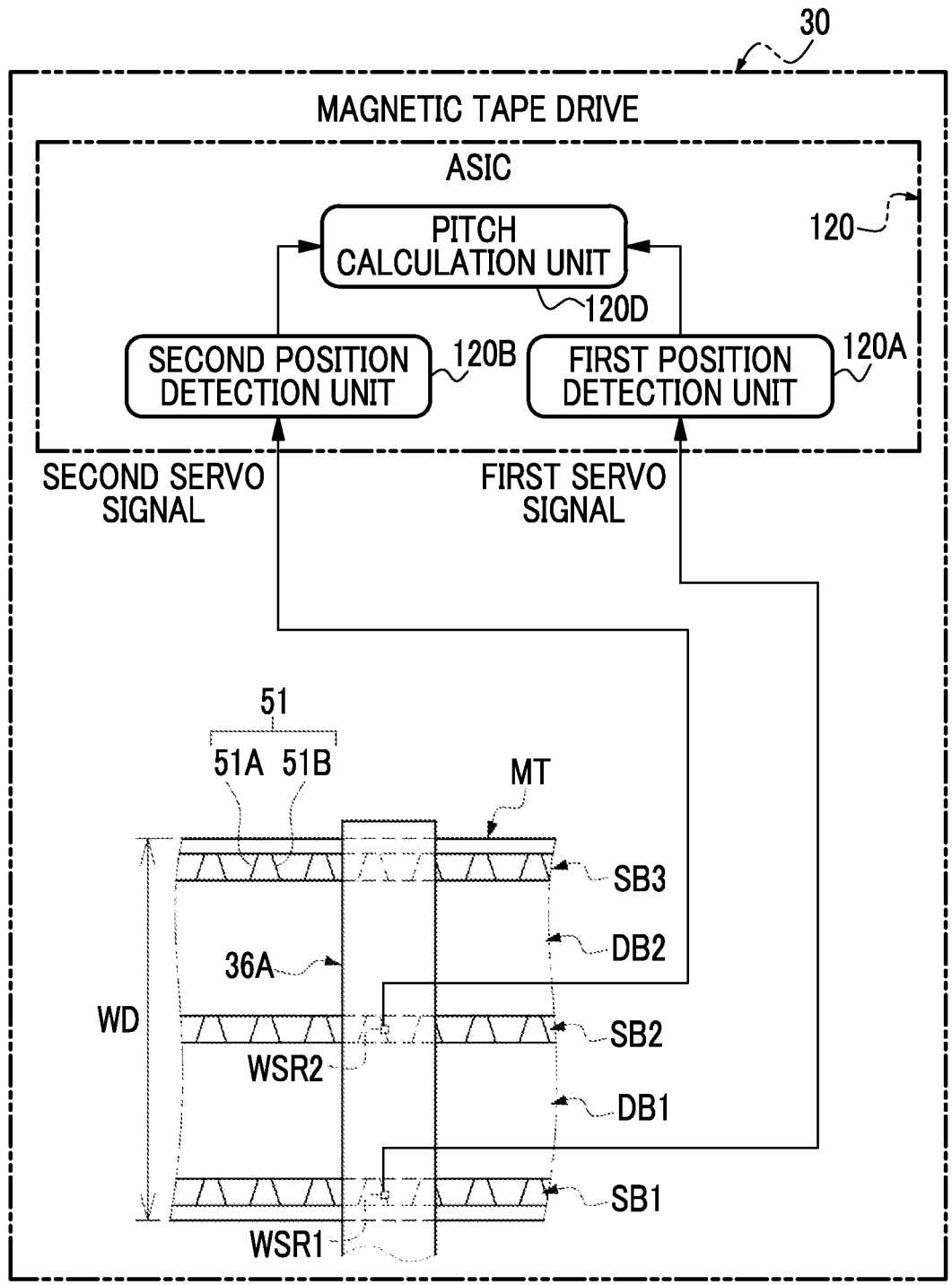
FIG. 21 is a conceptual diagram showing an example of a relationship between two servo reading elements in the recording head and a function of an ASIC of the magnetic tape drive.

In view of such circumstances, in the magnetic tape system 2, processing shown in FIG. 21 and subsequent drawings is performed. As shown in FIG. 21 as an example, the ASIC 120 of the magnetic tape drive 30 has a first position detection unit 120A, a second position detection unit 120B, and a pitch calculation unit 120D.

A first servo signal based on the servo pattern 51 of the servo band SB1 read by the servo reading element WSR1 is input to the first position detection unit 120A in a stage before data is recorded on the data band DB. The first servo signal is intermittent pulses corresponding to the magnetization regions 51A and 51B of the servo band SB1. The first position detection unit 120A detects, on the basis of the pulse intervals of the first servo signal input from the servo reading element WSR1, the positions of the servo reading element WSR1 in the width direction WD in the servo band SB1 at a plurality of locations (for example, a plurality of locations spaced apart from each other at constant intervals of several meters to several tens of meters) spaced apart from each other over the entire length of the magnetic tape MT, and outputs a detection result to the pitch calculation unit 120D.

A second servo signal based on the servo pattern 51 of the servo band SB2 read by the servo reading element WSR2 is input to the second position detection unit 120B in a stage before data is recorded on the data band DB. The second servo signal is intermittent pulses corresponding to the magnetization regions 51A and 51B of the servo band SB2. The second position detection unit 120B detects, on the basis of the pulse intervals of the second servo signal input from the servo reading element WSR2, the positions of the servo reading element WSR2 in the width direction WD in the servo band SB2 at a plurality of locations spaced apart from each other over the entire length of the magnetic tape MT, and outputs a detection result to the pitch calculation unit 120D.

Here, a specific method for detecting the position of the servo reading element WSR in the width direction WD in the servo band SB will be described.

Figure 22:
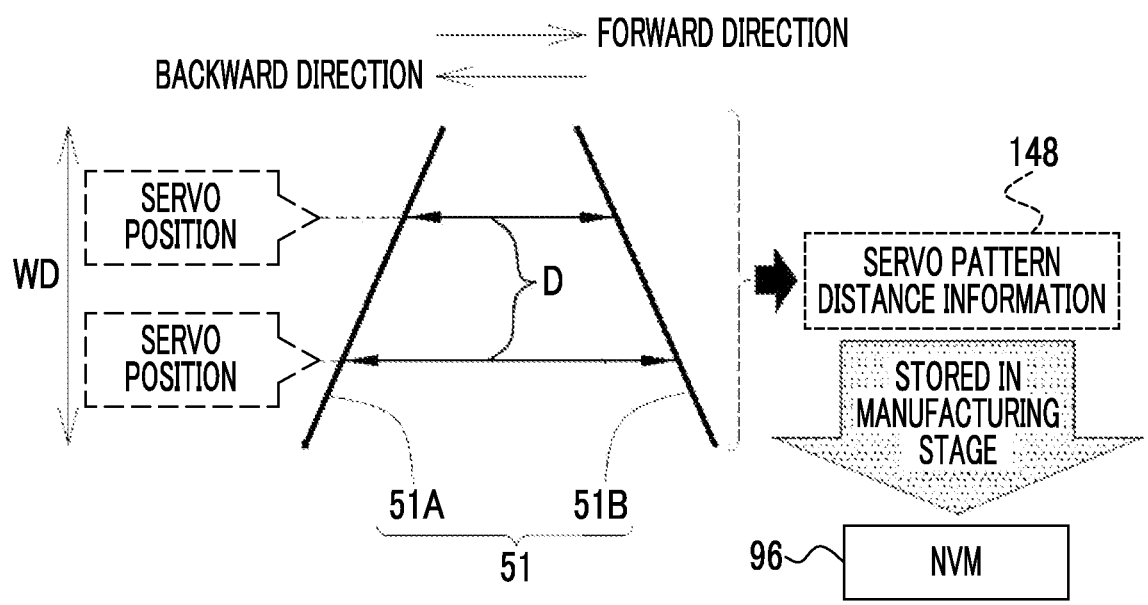
FIG. 22 is a conceptual diagram showing an example of a servo pattern.

FIG. 22 as an example shows one of the servo patterns 51 shown in FIG. 13. The magnetization regions 51A and 51B of the servo pattern 51 are a pair of linear magnetization regions tilted line-symmetrically with respect to a virtual straight line along the width direction WD. Upon reading the magnetization regions 51A and 51B, the servo reading element WSR generates respective pulses corresponding to the magnetization regions 51A and 51B. Therefore, in a case where the servo reading element WSR reads the servo pattern 51 in a state in which the magnetic tape MT runs in the forward direction or the backward direction, a time difference occurs between the pulse intervals generated by the magnetization regions 51A and 51B because of the position along the width direction WD of the servo reading element WSR. The servo pattern 51 does not necessarily have to be a pair of linear shapes tilted line-symmetrically with respect to a virtual straight line along the width direction WD. The servo pattern 51 need only be a pair of non-parallel linear magnetization regions, and, for example, the magnetization region 51A may be parallel with the virtual straight line along the width direction WD, and the magnetization region 51B may be tilted with respect to the virtual straight line along the width direction WD.

Meanwhile, since the rotation speed and the rotation torque of each of the feeding motor 40 and the winding motor 44 are controlled by the ASIC 120, the speed of the magnetic tape MT can be calculated by the ASIC 120. Therefore, a distance D from the magnetization region 51A to the magnetization region 51B at a position along the width direction WD of the servo reading element SR can be obtained from the pulse interval corresponding to the magnetization regions 51A and 51B and the speed of the magnetic tape MT. The distance D is a distance along the entire length direction of the magnetic tape MT from the magnetization region 51A to the magnetization region 51B.

In the present embodiment, the distance D is defined in advance for each of a plurality of servo positions. The plurality of servo positions indicate, for example, a plurality of positions along the width direction WD in each of the servo bands SB. For example, the servo position is represented by a number arranged in ascending order from "1" for each servo band SB from one end side to the other end side in the width direction WD. The position along the width direction WD of the servo reading element WSR in each of the servo bands SB is specified on the basis of the distance D. In the present embodiment, servo pattern distance information 148 is used as information including the distance D defined in advance for each servo position. The servo pattern distance information 148 is stored in the NVM 96 of the magnetic tape cartridge 10 in a stage in which the magnetic tape cartridge 10 is manufactured. The distance D is an example of "distances in an entire length direction of a magnetic tape at a plurality of positions between a pair of magnetization regions constituting a servo pattern formed in each of a plurality of servo bands" according to the technology of the present disclosure. In addition, the servo position is an example of a "plurality of positions in a width direction in a plurality of servo bands" according to the technology of the present disclosure.

Figure 23:
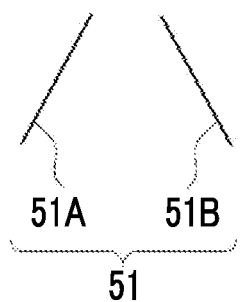
FIG. 23 is a conceptual diagram showing an example of an ideal servo pattern and an actual servo pattern.
Figure 23:
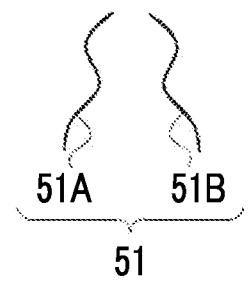
Figure 23:
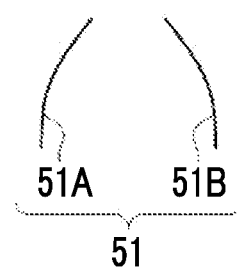

Meanwhile, the servo pattern 51 is recorded in the servo band SB by a servo writer (not shown). The servo writer has a servo signal writing head (not shown), and the magnetization regions 51A and 51B are formed in the servo band SB by the servo signal writing head. As shown in FIG. 23 as an example, it is ideal that the servo pattern 51 on the servo band SB is recorded in a linear shape. However, in practice, because of a processing error of the servo signal writing head, the magnetization regions 51A and 51B of the servo pattern 51 may be curved instead of being linear, as shown in FIG. 23 as an example. For convenience of description, the example of the servo pattern 51 shown in FIG. 23 schematically shows the distortions of the magnetization regions 51A and 51B in an easy-to-understand manner, and emphasizes the distortions more than the actual distortions of the magnetization regions 51A and 51B.

A gap pattern of the servo signal writing head that records the servo pattern 51 in the servo band SB is formed in the servo signal writing head. The gap pattern is a pair of linear patterns as in the servo pattern 51. The pair of patterns of the gap pattern are non-parallel to each other as in the servo pattern 51 and are formed in the servo signal writing head so as to be tilted by a preset angle in directions opposite to each other on the entire length direction side of the magnetic tape MT. That is, a leakage magnetic flux from the gap pattern magnetizes each of the servo bands SB of the magnetic tape MT, whereby the servo pattern 51 having the same shape as the gap pattern is recorded on each of the servo bands SB. Therefore, in a case where the gap pattern is curved because of the processing error of the servo signal writing head, the servo pattern 51 recorded on the magnetic tape MT is also curved. A distance between the pair of patterns along the entire length direction of the magnetic tape MT in the gap pattern of the servo signal writing head is measured, whereby the distance D for each of the plurality of servo positions along the width direction WD in each of the servo bands SB is measured.

Figure 24:
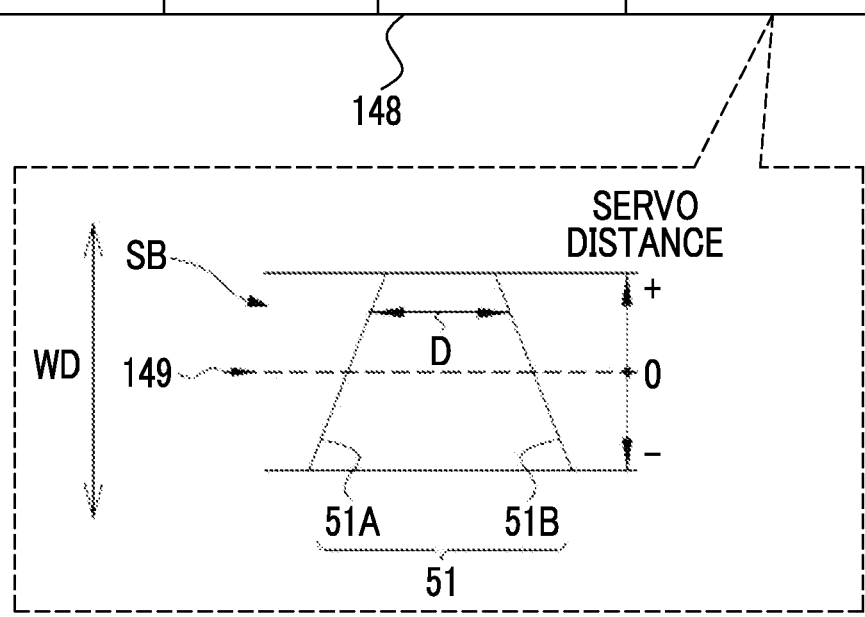
FIG. 24 is a conceptual diagram showing an example of servo pattern distance information.

FIG. 24 as an example shows the servo pattern distance information 148. In the example shown in FIG. 24, as an example of the servo pattern distance information 148, information in which the servo positions, the distances D, and servo distances are determined for each servo band SB is shown. In the example of the servo pattern distance information 148 shown in FIG. 24, the servo positions, the distances D, and the servo distances are associated with each other for each identification number that identifies the servo band SB. In other words, in the servo pattern distance information 148, the plurality of servo positions are associated with each servo band SB, and the distance D and the servo distance are associated with each servo position. That is, the servo pattern distance information 148 includes the distance D for each combination of the servo band SB and the servo position, and the servo distance corresponding to each of the servo positions. The servo distance is a distance in the width direction WD corresponding to each servo position with, as a reference, a position of a midpoint 149 in the width direction WD in the servo band SB.

In the example of the servo pattern distance information 148 shown in FIG. 24, although 19 servo positions are set on each of the servo bands SB, there is no limitation on the number of servo positions set on the servo band SB, and the plurality of servo positions need only be set. Further, in the example of the servo pattern distance information 148 shown in FIG. 24, for example, the servo distance of the servo position corresponding to the midpoint 149 in the width direction WD in the servo band SB is set to 0 µm. In addition, the farther the servo position along the width direction WD is from the midpoint 149, the longer the servo distance at each servo position is. In the example of the servo pattern distance information 148 shown in FIG. 24, the servo distance at the servo position where the distance D is shorter than the distance D at the servo position corresponding to the midpoint 149 is represented by a positive value (+), and the servo distance at the servo position where the distance D is longer than the distance D at the servo position corresponding to the midpoint is represented by a negative value (−).

The first position detection unit 120A (see FIG. 21) calculates the distance D from the pulse interval of the first servo signal, and detects the servo position of the servo reading element WSR1 corresponding to the calculated distance D by referring to the servo pattern distance information 148.

The second position detection unit 120B (see FIG. 21) calculates the distance D from the pulse interval of the second servo signal, and detects the servo position of the servo reading element WSR2 corresponding to the calculated distance D by referring to the servo pattern distance information 148.

The pitch calculation unit 120D calculates pitches between the servo patterns 51 in the width direction WD at the plurality of locations spaced apart from each other over the entire length of the magnetic tape MT, on the basis of the detection result input from each of the first position detection unit 120A and the second position detection unit 120B. The pitch between the servo patterns 51 in the width direction WD indicates a pitch between the servo pattern 51 of the servo band SB1 and the servo pattern 51 of the servo band SB2, and the pitch between the servo pattern 51 of the servo band SB2 and the servo pattern 51 of the servo band SB3.

In the example shown in FIG. 21, an aspect in which the pitch between the servo pattern 51 of the servo band SB1 and the servo pattern 51 of the servo band SB2 is calculated by the pitch calculation unit 120D is shown, but this is merely an example. For example, in a case where the servo reading element WSR1 is located on the servo band SB2 and the servo reading element WSR2 is located on the servo band SB3 by moving the magnetic head 36 along the width direction WD, the pitch between the servo pattern 51 of the servo band SB2 and the servo pattern 51 of the servo band SB3 can be calculated by the pitch calculation unit 120D on the basis of the first servo signal and the second servo signal.

Further, although, in the example shown in FIG. 21, an aspect example in which the first and second servo signals based on the results of reading the servo patterns 51 through the servo reading elements WSR1 and WSR2 are input to the first position detection unit 120A and the second position detection unit 120B and the first position detection unit 120A and the second position detection unit 120B detect the positions of the servo reading elements WSR1 and WSR2 in the width direction WD in the servo bands SB on the basis of the first and second servo signals has been described, the same processing is performed by the first position detection unit 120A and the second position detection unit 120B even in a case where the servo patterns 51 are read by the servo reading elements RSR1 and RSR2. That is, the positions of the servo reading elements RSR1 and RSR2 in the width direction WD in the servo bands SB are detected.

Hereinafter, in a case where a particular distinction is not necessary for description, the first position detection unit 120A and the second position detection unit 120B are denoted by a position detection unit 121, and the first servo signal and the second servo signal are denoted by a servo signal.

Figure 25:
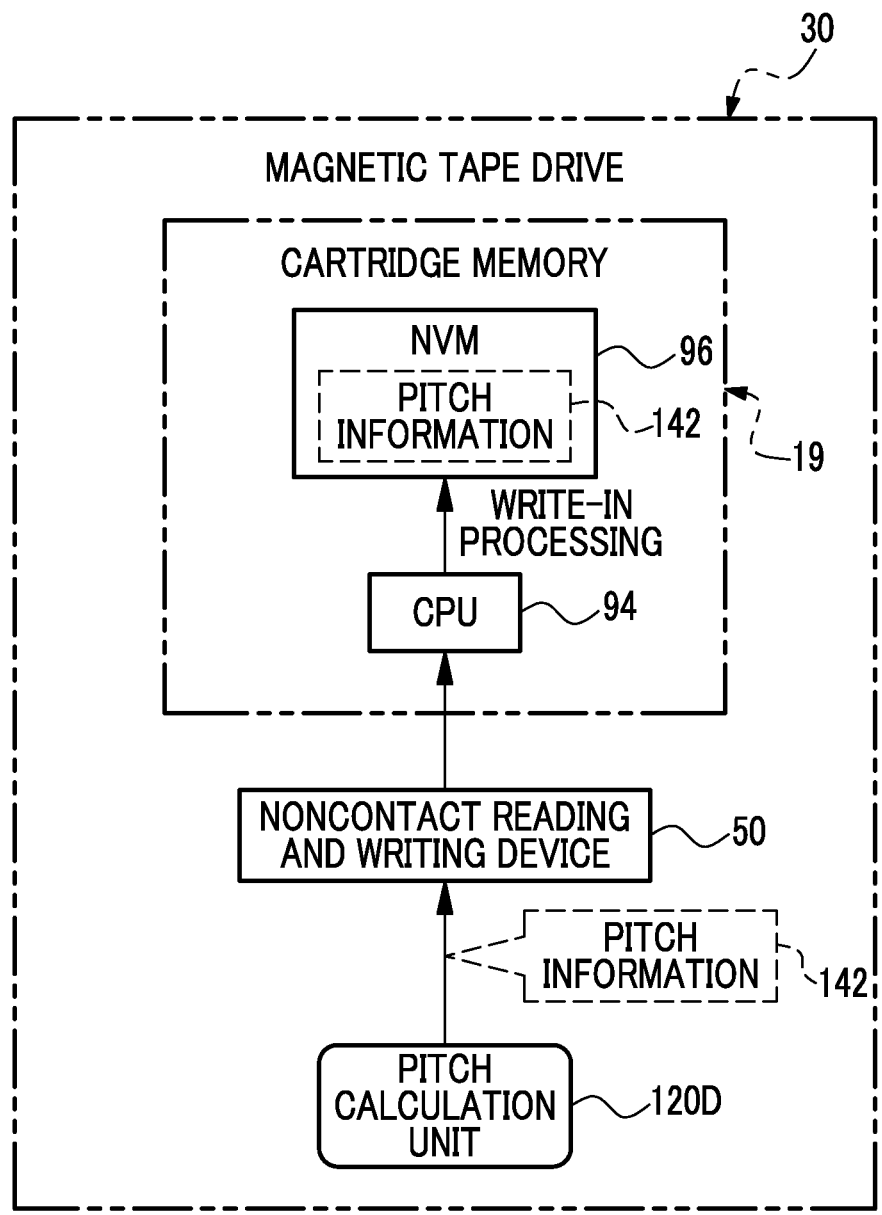
FIG. 25 is a block diagram showing an example of an aspect in which pitch information is stored in an NVM of a cartridge memory.

As shown in FIG. 25 as an example, the pitch calculation unit 120D outputs, to the noncontact reading and writing device 50, pitch information 142 (for example, information indicating a pitch itself between the servo bands SB) capable of specifying pitches between the servo bands SB in the width direction WD at the plurality of locations spaced apart from each other over the entire length of the magnetic tape MT. The noncontact reading and writing device 50 spatially transmits a write-in command of the pitch information 142 to the cartridge memory 19 as the command signal in a stage before data is recorded on the data band DB. The CPU 94 performs write-in processing of writing the pitch information 142 into the NVM 96 in response to the command signal from the noncontact reading and writing device 50. As a result, the pitch information 142 at the plurality of locations spaced apart from each other over the entire length of the magnetic tape MT is stored in the NVM 96.

Here, although examples of the stage before data is recorded on the data band DB include a stage in which the magnetic tape cartridge 10 is manufactured, the technology of the present disclosure is not limited thereto, and the stage before data is recorded on the data band DB may be immediately after a user first loads the magnetic tape cartridge 10 into the magnetic tape drive 30 and performs initialization or may be each time the magnetic tape cartridge 10 is loaded into the magnetic tape drive 30, or the pitch information 142 may be acquired while the magnetic tape MT is reciprocated once before data recording is performed after the magnetic tape cartridge 10 is loaded into the magnetic tape drive 30, and the acquired pitch information 142 may be stored in the NVM 96.

FIG. 26 is a diagram showing an example of the pitch information 142. The pitch information 142 is information in which the servo positions and the pitches are determined for each servo band SB. In the example shown in FIG. 26, the servo positions and the pitches are associated with each other for each identification number that identifies the servo band SB. In other words, in the pitch information 142, the plurality of servo positions are associated with each servo band SB, and the pitch is associated with each servo position. That is, the pitch information 142 includes the pitch for each combination of the servo band SB and the servo position. The pitch information 142 is measured at each of the plurality of locations spaced apart from each other over the entire length of the magnetic tape MT and is stored in the NVM 96.

The pitch information 142 stored in the NVM 96 is information obtained from a reference magnetic tape drive 30 (hereinafter, also referred to as a "reference drive") among the plurality of magnetic tape drives 30. The term "reference drive" as used herein does not mean a standard magnetic tape drive 30 in the world. Any magnetic tape drive 30 can be the "reference drive" for which the pitch can be measured as long as the magnetic tape drive 30 is used for the first time for the magnetic tape cartridge 10.

The magnetic tape drive 30 may generate the pitch information 142 by using the pitch calculated on the basis of the result of reading the plurality of servo bands SB through the plurality of servo reading elements SR and the distance between the plurality of servo reading elements SR in a stage before data recording is performed by the magnetic tape drive 30.

Specifically, the first moving mechanism 129A and the second moving mechanism 129B move the servo reading element WSR1 and the servo reading element WSR2, and the servo reading element RSR1 and the servo reading element RSR2 to positions on the servo bands SB, at the plurality of locations spaced apart from each other over the entire length of the magnetic tape MT, respectively. The position detection unit 121 calculates the distance D at each position of the servo reading elements SR along the width direction WD in each servo band SB at the plurality of locations, and detects the servo position corresponding to the distance D. The ASIC 120 generates the pitch information 142 for each servo position at the plurality of locations spaced apart from each other over the entire length of the magnetic tape MT by using the servo distances at the servo positions of the servo reading elements SR and the distance between the servo reading elements. The servo position corresponding to the distance D is an example of a "result of reading a plurality of servo bands through a plurality of servo reading elements" according to the technology of the present disclosure.

For example, it is assumed that the distance between the servo reading elements is 2858.6 μm and the servo distances of the servo reading element WSR1 and the servo reading element WSR2 are 23.555 μm and 23.455 μm, respectively. In this case, the pitch at the servo positions of the servo reading elements WSR is 2858.5 μm (2858.5=2858.6−(23.555−23.455)).

In this way, the ASIC 120 may generate the pitch information 142 shown in FIG. 26 by using the servo distance of the servo reading element SR at each servo position defined by the servo pattern distance information 148 and the distance between the servo reading elements stored in the storage 122 of the magnetic tape drive 30.

Figure 27:
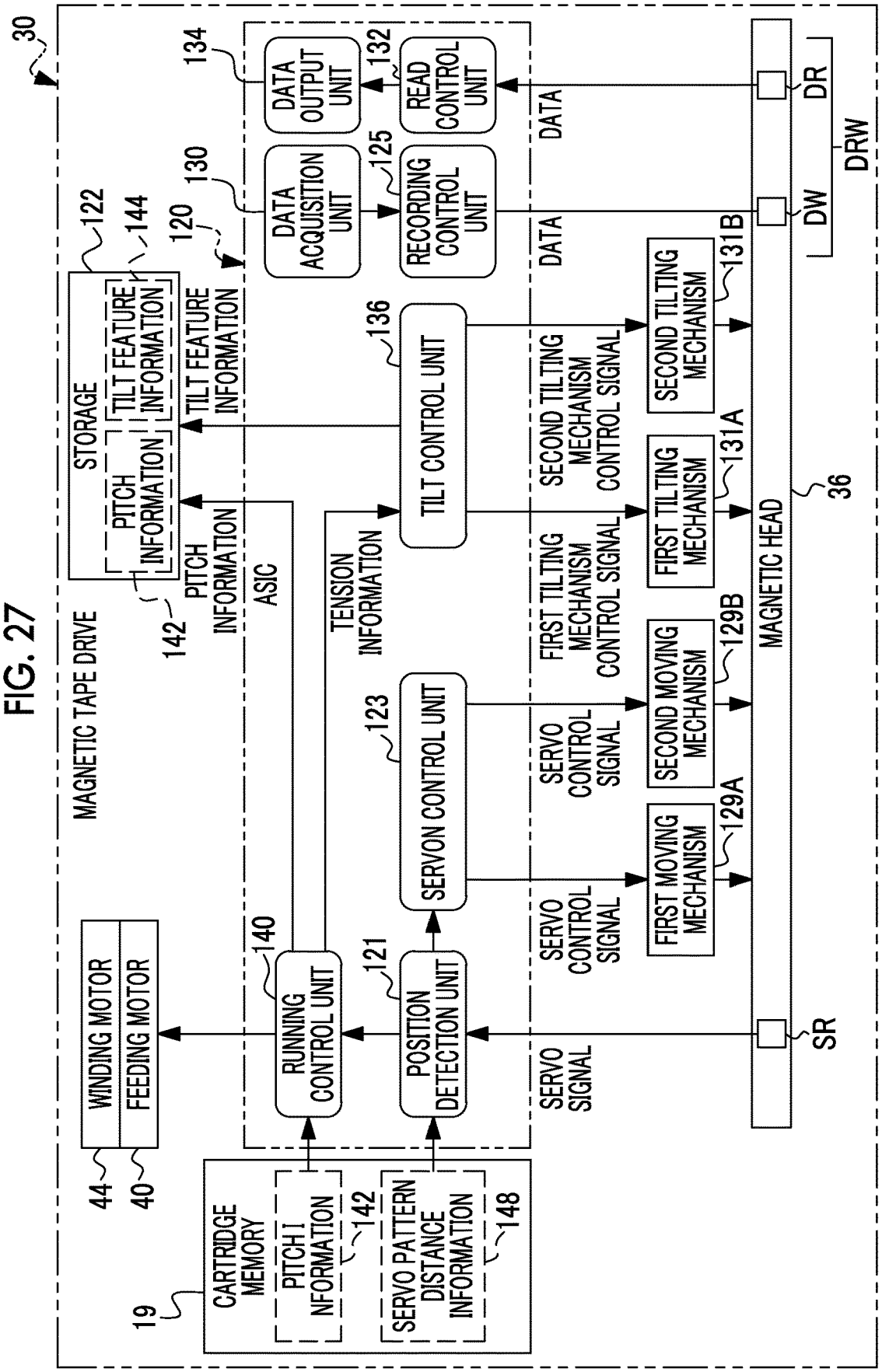
FIG. 27 is a block diagram showing an example of the function of the ASIC of the magnetic tape drive.

In the control device 38 (see FIG. 12) of the magnetic tape drive 30, as shown in FIG. 27 as an example, the ASIC 120 has the position detection unit 121, a servo control unit 123, a recording control unit 125, a data acquisition unit 130, a read control unit 132, a data output unit 134, a tilt control unit 136, and a running control unit 140.

The running control unit 140 controls the drive of each of the feeding motor 40 and the winding motor 44 to cause the magnetic tape MT to selectively run in the forward direction and the backward direction. The drive of the feeding motor 40 is controlled in accordance with a feeding motor control signal (not shown), and the drive of the winding motor 44 is controlled in accordance with a winding motor control signal (not shown). The feeding motor control signal and the winding motor control signal are generated by the running control unit 140. The feeding motor control signal is supplied to the feeding motor 40 by the running control unit 140, and the winding motor control signal is supplied to the winding motor 44 by the running control unit 140. Hereinafter, in a case where a particular distinction is not necessary, the feeding motor control signal and the winding motor control signal are referred to as a motor control signal.

The running control unit 140 acquires the pitch information 142 from the cartridge memory 19 and stores the acquired pitch information 142 in the storage 122. Although details will be described later, the running control unit 140 adjusts the running speed and the tension of the magnetic tape MT to appropriate values by adjusting the rotation speed and the rotation torque of each of the feeding motor 40 and the winding motor 44 in accordance with the pitch at a position of the magnetic head 36 in the width direction WD, which is specified by the pitch information 142 stored in the storage 122. The adjustment of the running speed and the tension of the magnetic tape MT is performed for each of the plurality of locations spaced apart from each other over the entire length of the magnetic tape MT. The tension of the magnetic tape MT is adjusted in this way, whereby the width of the magnetic tape MT is adjusted. The adjustment of the rotation speed and the rotation torque of each of the feeding motor 40 and the winding motor 44 is realized by correcting the feeding motor control signal and the winding motor control signal in accordance with the pitch information 142 through the running control unit 140.

The running control unit 140 calculates the tension applied to the magnetic tape MT (hereinafter, also simply referred to as "tension") on the basis of the motor control signal corrected in accordance with the pitch at the position of the magnetic head 36 in the width direction WD, which is specified by the pitch information 142. The tension is calculated by the running control unit 140, for example, for each of the plurality of locations spaced apart from each other over the entire length of the magnetic tape MT. In this case, for example, the running control unit 140 calculates the tension by using an arithmetic expression where the motor control signal is set as an independent variable and the tension is set as a dependent variable. The arithmetic expression used here is an arithmetic expression obtained in advance by a test with a real machine and/or a computer simulation.

The running control unit 140 outputs, to the tilt control unit 136, tension information indicating the tension calculated on the basis of the motor control signal for each of the plurality of locations spaced apart from each other over the entire length of the magnetic tape MT.

Two types of servo signals based on the servo patterns 51 read by the servo reading elements WSR1 and WSR2 (hereinafter, also referred to as "recording head side servo signals") and two types of servo signals based on the servo patterns 51 read by the servo reading elements RSR1 and RSR2 (hereinafter, also referred to as "reading head side servo signals") are input to the position detection unit 121. The position detection unit 121 detects a position of the servo reading element WSR1 in the servo band SB and a position of the servo reading element WSR2 in the servo band SB, and calculates an average value of the detected positions. Then, the position detection unit 121 detects the position of the recording head 36A in the width direction WD on the basis of the calculated average value.

The servo pattern distance information 148 may be input to the position detection unit 121 from the cartridge memory 19. In this case, the position detection unit 121 uses the recording head side servo signals to calculate the distance D of the servo pattern 51 in each of the servo bands SB read by the servo reading elements WSR1 and WSR2. The position detection unit 121 detects the servo positions corresponding to the respective calculated distances D as the position of the servo reading element WSR1 in the servo band SB and the position of the servo reading element WSR2 in the servo band SB by referring to the servo pattern distance information 148, and calculates the average value of the detected positions. Then, the position detection unit 121 may detect the position of the recording head 36A in the width direction WD on the basis of the calculated average value.

For example, in a case where the servo position of the servo reading element WSR1 in the servo band SB1 is "1" and the servo position of the servo reading element WSR2 in the servo band SB2 is "3", the servo position represented by "2" is the position of the recording head 36A in the width direction WD. Although 19 servo positions are set in the example of the servo pattern distance information 148 in FIG. 24, an intermediate value of the servo positions set in the servo pattern distance information 148 may be used by performing an arithmetic operation on the servo positions on the basis of the distance D and the servo pattern distance information 148 in the detection of the servo position.

Further, the position detection unit 121 detects the position of the servo reading element RSR1 in the servo band SB and the position of the servo reading element RSR2 in the servo band SB, and calculates an average value of the detected positions. Then, the position detection unit 121 detects the position of the reading head 36B in the width direction WD on the basis of the calculated average value.

The position detection unit 121 may use the reading head side servo signals to calculate the distance D of the servo pattern 51 in each of the servo bands SB read by the servo reading elements RSR1 and RSR2. In this case, the position detection unit 121 detects the servo positions corresponding to the respective calculated distances D as the position of the servo reading element RSR1 in the servo band SB and the position of the servo reading element RSR2 in the servo band SB by referring to the servo pattern distance information 148, and calculates the average value of the detected positions. Then, the position detection unit 121 may detect the position of the reading head 36B in the width direction WD on the basis of the calculated average value.

For example, in a case where the servo position of the servo reading element RSR1 in the servo band SB1 is "1" and the servo position of the servo reading element RSR2 in the servo band SB2 is "2", the servo position represented by "1.5" is the position of the reading head 36B in the width direction WD. The servo position="1.5" is an example of an intermediate value of the servo positions set in the example of the servo pattern distance information 148 shown in FIG. 24.

The position detection unit 121 outputs the detected position of the recording head 36A in the width direction WD and the detected position of the reading head 36B in the width direction WD to each of the servo control unit 123 and the running control unit 140.

Hereinafter, the detection result of the position of the magnetic head 36 in the width direction WD is simply referred to as a "widthwise position of the magnetic head 36".

The servo control unit 123 compares the detection result of the position of the recording head 36A in the width direction WD (hereinafter, also referred to as a "recording head side detection result") output from the position detection unit 121 and a target position of the recording head 36A in the width direction WD (hereinafter, also referred to as a "recording head side target position") with each other. Further, the servo control unit 123 compares the detection result of the position of the reading head 36B in the width direction WD (hereinafter, also referred to as a "reading head side detection result") from the position detection unit 121 and a target position of the reading head 36B in the width direction WD (hereinafter, also referred to as a "reading head side target position") with each other. The recording head side target position and the reading head side target position are designated by the ASIC 120 using the servo positions, for example, each time recording and/or reading of data is performed with respect to the magnetic tape cartridge 10 in the magnetic tape drive 30.

The servo control unit 123 does nothing for the first moving mechanism 129A in a case where the recording head side detection result is the same as the recording head side target position. The servo control unit 123 outputs the servo control signal to the first moving mechanism 129A in a case where the recording head side detection result deviates from the recording head side target position. The first moving mechanism 129A operates in accordance with the servo control signal input from the servo control unit 123 to match the position of the recording head 36A in the width direction WD with the recording head side target position.

The servo control unit 123 does nothing for the second moving mechanism 129B in a case where the reading head side detection result is the same as the reading head side target position. The servo control unit 123 outputs the servo control signal to the second moving mechanism 129B in a case where the reading head side detection result deviates from the reading head side target position. The second moving mechanism 129B operates in accordance with the servo control signal input from the servo control unit 123 to match the position of the reading head 36B in the width direction WD with the reading head side target position.

The data acquisition unit 130 acquires data to be recorded on the data band DB by the recording head 36A, from an external device (not shown). Examples of the external device include a host computer that manages the plurality of magnetic tape drives 30, or a personal computer that is communicably connected to the magnetic tape drive 30. The data acquisition unit 130 outputs the data acquired from the external device to the recording control unit 125.

The recording control unit 125 encodes the data input from the data acquisition unit 130 into a digital signal for recording. Then, the recording control unit 125 selectively supplies a pulse current corresponding to the digital signal to the plurality of recording elements DW provided in the recording head 36A to cause the plurality of recording elements DW to record data on the designated data tracks DT in the data band DB.

The read control unit 132 controls the operation of the reading element DR of the reading head 36B to cause the reading element DR to read data from the designated data track DT in the data band DB. The data read from the data track DT by the reading element DR is a pulse-shaped digital signal. The read control unit 132 outputs the pulse-shaped digital signal to the data output unit 134.

The data output unit 134 decodes the pulse-shaped digital signal input from the read control unit 132. The data output unit 134 outputs the data obtained by decoding to a preset output destination (for example, the host computer, a personal computer, a display (not shown), and/or a storage device (for example, the storage 122)).

Although details will be described later, the tilt control unit 136 calculates tilt feature information 144 on the basis of the tension information input from the running control unit 140 for each of the plurality of locations spaced apart from each other over the entire length of the magnetic tape MT, and stores the calculated tilt feature information 144 in the storage 122.

The tilt feature information 144 is information indicating the feature of the tilt of the longitudinal direction of the magnetic head with respect to the width direction WD of the magnetic tape MT. The feature of the tilt in the longitudinal direction of the magnetic head with respect to the width direction WD of the magnetic tape MT indicates the feature of the tilt of the longitudinal direction of the recording head 36A with respect to the width direction WD of the magnetic tape MT and the feature of the tilt of the longitudinal direction of the reading head 36B with respect to the width direction WD of the magnetic tape MT. The feature of the tilt of the longitudinal direction of the recording head 36A means the feature of the tilt of an arrangement direction of the plurality of recording head side magnetic elements toward the entire length direction side of the magnetic tape MT with respect to the width direction WD of the magnetic tape MT. Further, the feature of the tilt of the reading head 36B means the feature of the tilt of an arrangement direction of the plurality of reading head side magnetic elements toward the entire length direction side of the magnetic tape MT with respect to the width direction WD of the magnetic tape MT. Here, the feature of the tilt indicates the direction of the tilt and the angle of the tilt.

The tilt feature information 144 includes first tilt feature information and second tilt feature information. The first tilt feature information is calculated by the tilt control unit 136 on the basis of a first tilting mechanism control signal. The second tilt feature information is calculated by the tilt control unit 136 on the basis of a second tilting mechanism control signal.

The first tilt feature information is information indicating the feature of the tilt of the arrangement direction of the plurality of recording head side magnetic elements with respect to the width direction WD of the magnetic tape MT. The first tilt feature information includes first tilt direction information indicating the direction of the tilt of the recording head 36A, that is, the direction of the tilt of the arrangement direction of the plurality of recording head side magnetic elements with respect to the width direction WD of the magnetic tape MT (for example, whether the direction of the tilt is on the cartridge reel 18 side or the winding reel 42 side). In addition, the first tilt feature information includes first tilt angle information indicating the angle of the tilt of the recording head 36A, that is, the angle of the tilt of the arrangement direction of the plurality of recording head side magnetic elements with respect to the width direction WD of the magnetic tape MT.

The second tilt feature information is information indicating the feature of the tilt of the arrangement direction of the plurality of reading head side magnetic elements with respect to the width direction WD of the magnetic tape MT. The second tilt feature information includes second tilt direction information indicating the direction of the tilt of the reading head 36B, that is, the direction of the tilt of the arrangement direction of the plurality of reading head side magnetic elements with respect to the width direction WD of the magnetic tape MT (for example, whether the direction of the tilt is on the cartridge reel 18 side or the winding reel 42 side). In addition, the second tilt feature information includes second tilt angle information indicating the angle of the tilt of the reading head 36B, that is, the angle of the tilt of the arrangement direction of the plurality of reading head side magnetic elements with respect to the width direction WD of the magnetic tape MT.

The tilt control unit 136 generates the first tilting mechanism control signal on the basis of the first tilt feature information and generates the second tilting mechanism control signal on the basis of the second tilt feature information. The tilt control unit 136 outputs the generated first tilting mechanism control signal to the first tilting mechanism 131A and outputs the generated second tilting mechanism control signal to the second tilting mechanism 131B. The first tilting mechanism control signal is a signal for controlling the drive of the first tilting actuator 131A1 (see FIG. 12), and the second tilting mechanism control signal is a signal for controlling the drive of the second tilting actuator 131B1 (see FIG. 12). Hereinafter, the first tilting mechanism control signal and the second tilting mechanism control signal are referred to as a tilting mechanism control signal in a case where a particular distinction is not necessary for description.

The tilt control unit 136 adjusts the direction of the tilt and the angle of the tilt of the recording head 36A by operating the first tilting mechanism 131A on the basis of the first tilting mechanism control signal, for each of the plurality of locations spaced apart from each other over the entire length of the magnetic tape MT. That is, the first tilting mechanism 131A rotates the recording head 36A about the rotation shaft RA1 (see FIG. 13) such that the direction of the tilt and the angle of the tilt of the recording head 36A become the direction of the tilt and the angle of the tilt indicated by the first tilt feature information.

The tilt control unit 136 adjusts the direction of the tilt and the angle of the tilt of the reading head 36B by operating the second tilting mechanism 131B on the basis of the second tilting mechanism control signal, for each of the plurality of locations spaced apart from each other over the entire length of the magnetic tape MT. That is, the second tilting mechanism 131B rotates the reading head 36B about the rotation shaft RA2 (see FIG. 13) such that the direction of the tilt and the angle of the tilt of the reading head 36B become the direction of the tilt and the angle of the tilt indicated by the second tilt feature information.

Figure 28:
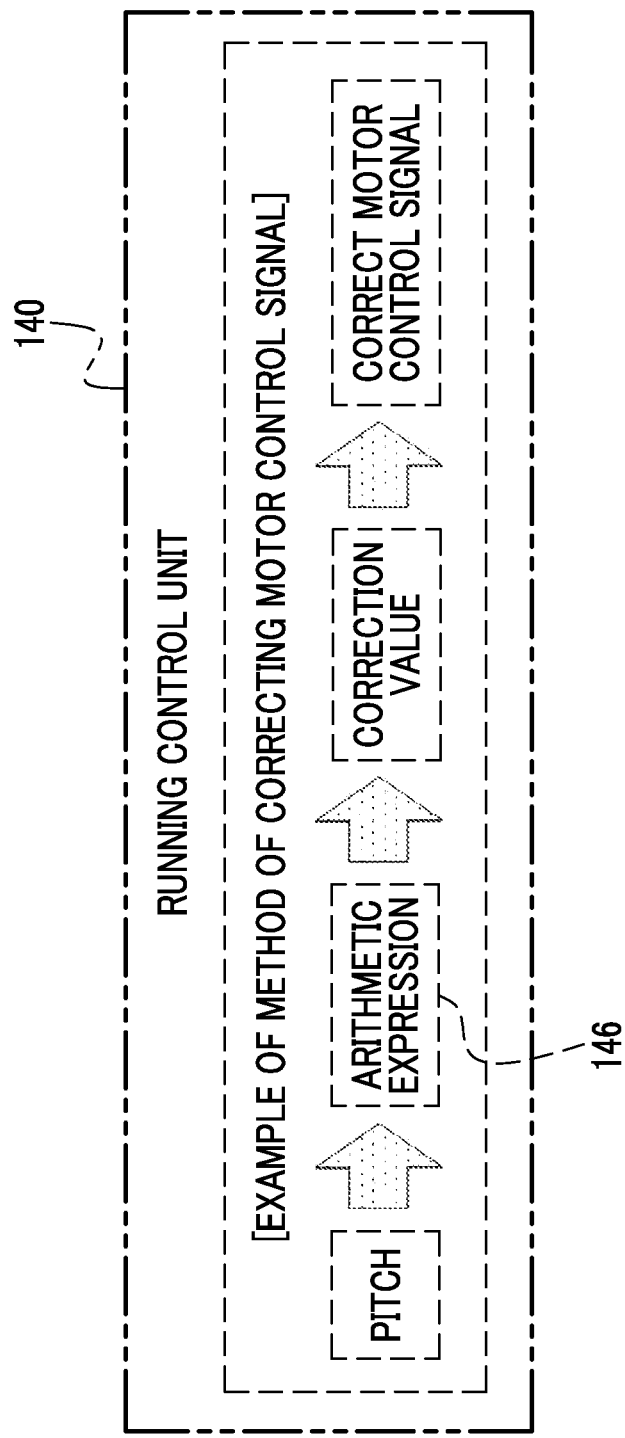
FIG. 28 is a conceptual diagram showing an example of a method in which a motor control signal is corrected by a running control unit.

As shown in FIG. 28 as an example, the running control unit 140 uses an arithmetic expression 146 where the pitch at the widthwise position of the magnetic head 36, which is specified from the pitch information 142 stored in the storage 122, is used as an independent variable and a correction value for correcting the feeding motor control signal (hereinafter, also referred to as a "feeding motor control signal correction value) and a correction value for correcting the winding motor control signal (hereinafter, also referred to as a "winding motor control signal correction value") are used as dependent variables, to calculate the feeding motor control signal correction value and the winding motor control signal correction value.

The feeding motor control signal correction value and the winding motor control signal correction value are correction values used for the feeding motor control signal and the winding motor control signal in order to obtain the feeding motor control signal and the winding motor control signal necessary for realizing the tension within the allowable range applied to the magnetic tape MT such that the width of the magnetic tape MT becomes a target width.

Here, the target width is a width of the magnetic tape MT in a case where tension is applied to the magnetic tape MT such that the recording element DW or the reading element DR of the magnetic head 36 is located on the designated data track DT in the data band DB where recording or reading of data is to be performed. The target width may be a fixed value obtained in advance by, for example, a test with a real machine and/or a computer simulation, or may be a variable value that is changed according to, for example, an instruction given from the outside and/or a predetermined condition.

Further, the arithmetic expression 146 used by the running control unit 140 is an arithmetic expression obtained in advance by, for example, a test with a real machine and/or computer simulation, as an arithmetic expression for calculating the correction values used for the feeding motor control signal and the winding motor control signal in order to obtain the feeding motor control signal and the winding motor control signal necessary for realizing the tension within the allowable range applied to the magnetic tape MT such that the width of the magnetic tape MT becomes the target width.

The running control unit 140 controls the drive of the feeding motor 40 by correcting the feeding motor control signal with the calculated feeding motor control signal correction value and then supplying the corrected feeding motor control signal to the feeding motor 40, and controls the drive of the winding motor 44 by correcting the winding motor control signal with the calculated winding motor control signal correction value and then supplying the corrected winding motor control signal to the winding motor 44. As a result, the tension within the allowable range is applied to the magnetic tape MT, and the width of the magnetic tape MT is adjusted so as to match or approach the target width.

For example, it is assumed that recording and/or reading of data is performed with respect to the data track DT located at the center of each data track group DTG of the data band DB1. In this case, the running control unit 140 performs a control to adjust the tension applied to the magnetic tape MT within the allowable range such that the servo reading element WSR1 (RSR1) is located at the center in the width direction WD in the servo band SB1 of the magnetic tape MT (for example, the center position of the magnetization regions 51A and 51B) and the servo reading element WSR2 (RSR2) is located at the center in the width direction WD in the servo band SB2 of the magnetic tape MT, whereby the width of the magnetic tape MT is adjusted.

Here, an aspect example in which the servo reading element WSR1 (RSR1) is located at the center in the width direction WD in the servo band SB1 of the magnetic tape MT and the servo reading element WSR2 (RSR2) is located at the center in the width direction WD in the servo band SB2 of the magnetic tape MT has been described, but the technology of the present disclosure is not limited thereto. For example, it is assumed that recording and/or reading of data is performed with respect to the data track DT located at the center of each data track group DTG of the data band DB2. In this case, the running control unit 140 performs a control to adjust the tension applied to the magnetic tape MT within the allowable range such that the servo reading element WSR1 (RSR1) is located at the center in the width direction WD in the servo band SB2 of the magnetic tape MT and the servo reading element WSR2 (RSR2) is located at the center in the width direction WD in the servo band SB3 of the magnetic tape MT, whereby the width of the magnetic tape MT may be adjusted.

Figure 29:
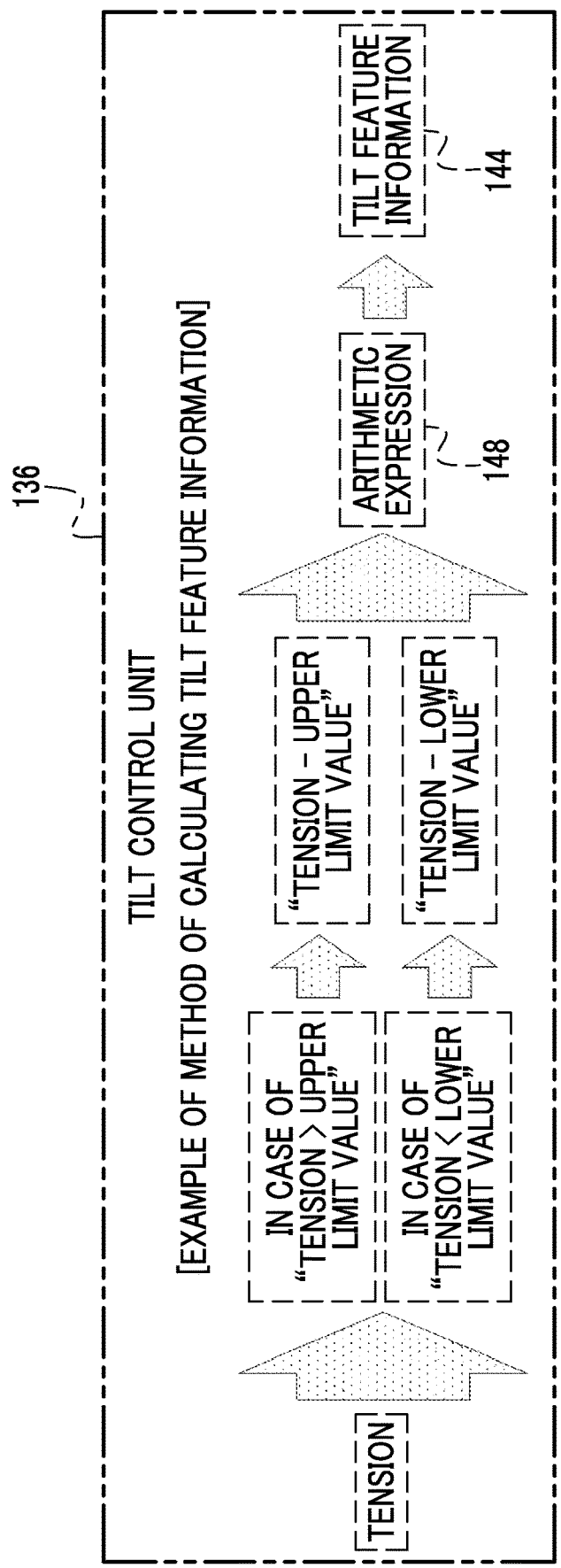
FIG. 29 is a conceptual diagram showing an example of a method in which tilt feature information is calculated by a tilt control unit.

As shown in FIG. 29 as an example, the tilt control unit 136 determines whether or not the tension indicated by the tension information (see FIG. 27) input from the running control unit 140 is within the allowable range. An upper limit value of the allowable range is, for example, a value predetermined as a maximum value of the tension at which irreversible damage, such as plastic deformation, may not be given to the magnetic tape MT, and a lower limit value of the allowable range is a value predetermined as a minimum value of the tension at which the running magnetic tape MT may not be flapped.

The tilt control unit 136 calculates the tilt feature information 144 by using an arithmetic expression 148 in a case where the tension indicated by the tension information is out of the allowable range. The case where the tension indicated by the tension information is out of the allowable range indicates a case where the tension indicated by the tension information is above the upper limit value of the allowable range and a case where the tension indicated by the tension information is below the lower limit value of the allowable range.

The tilt control unit 136 calculates a difference between the tension indicated by the tension information and the upper limit value of the allowable range (here, as an example, a value obtained by subtracting the upper limit value of the allowable range from the tension indicated by the tension information) in a case where the tension indicated by the tension information is above the upper limit value of the allowable range.

On the other hand, the tilt control unit 136 calculates a difference between the tension indicated by the tension information and the lower limit value of the allowable range (here, as an example, a value obtained by subtracting the lower limit value of the allowable range from the tension indicated by the tension information) in a case where the tension indicated by the tension information is below the lower limit value of the allowable range. Hereinafter, for convenience of description, the difference between the tension indicated by the tension information and the upper limit value of the allowable range and the difference between the tension indicated by the tension information and the lower limit value of the allowable range are referred to as a "tension difference" in a case where a distinction is not necessary for description.

The arithmetic expression 148 is an arithmetic expression where the tension difference is used as an independent variable and the tilt feature information 144 is used as a dependent variable. The tilt control unit 136 calculates the tilt feature information 144 by substituting the tension difference into the arithmetic expression 148. The arithmetic expression 148 is, for example, an arithmetic expression obtained in advance by, for example, a test with a real machine and/or a computer simulation, as an arithmetic expression that is used to obtain the tilt feature information 144 necessary for locating the servo reading element WSR1 (RSR1) at a position in the width direction WD in the designated servo band SB1 of the magnetic tape MT by rotating the magnetic head about the rotation shaft RA and for locating the servo reading element WSR2 (RSR2) at a position in the width direction WD in the designated servo band SB2 of the magnetic tape MT.

Figure 30:
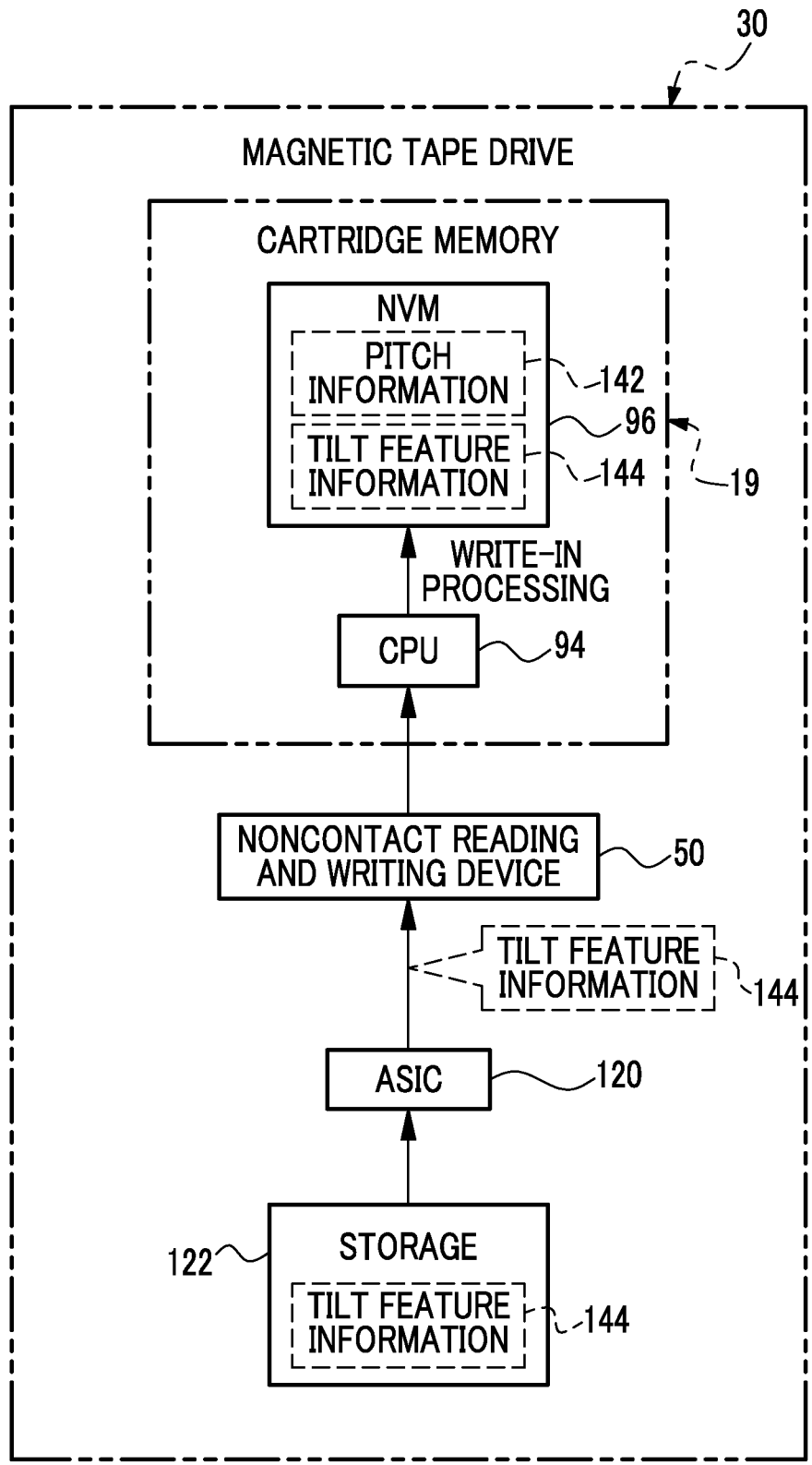
FIG. 30 is a block diagram showing an example of processing contents in a case where the tilt feature information is stored in the cartridge memory.

As shown in FIG. 30 as an example, the ASIC 120 acquires the tilt feature information 144 from the storage 122 and outputs the acquired tilt feature information 144 to the noncontact reading and writing device 50. The noncontact reading and writing device 50 spatially transmits the write-in command of the tilt feature information 144 to the cartridge memory 19 as the command signal, in a stage before data is recorded on the data band DB (for example, a stage in which the magnetic tape cartridge 10 is manufactured). The CPU 94 performs write-in processing of writing the tilt feature information 144 into the NVM 96 in response to the command signal from the noncontact reading and writing device 50. As a result, the tilt feature information 144 at the plurality of locations spaced apart from each other over the entire length of the magnetic tape MT is stored in the NVM 96. The tilt feature information 144 stored in the NVM 96 is information obtained from the reference drive, as in the pitch information 142.

As described above, in a case where the tilt feature information 144 is stored in the NVM 96 of the cartridge memory 19 and the tilt feature information 144 is not stored in the storage 122, the tilt control unit 136 does not need to calculate the tilt feature information 144 by using the arithmetic expression 148, and acquires the tilt feature information 144 from the NVM 96. Then, the tilt control unit 136 stores the tilt feature information 144 acquired from the NVM 96 in the storage 122. The tilt control unit 136 generates the tilting mechanism control signal in accordance with the tilt feature information 144 stored in the storage 122, and operates the tilting mechanism 131 on the basis of the generated tilting mechanism control signal.

Next, the action of the magnetic tape system 2 will be described with reference to FIGS. 31A and 31B.

Figure 31A:
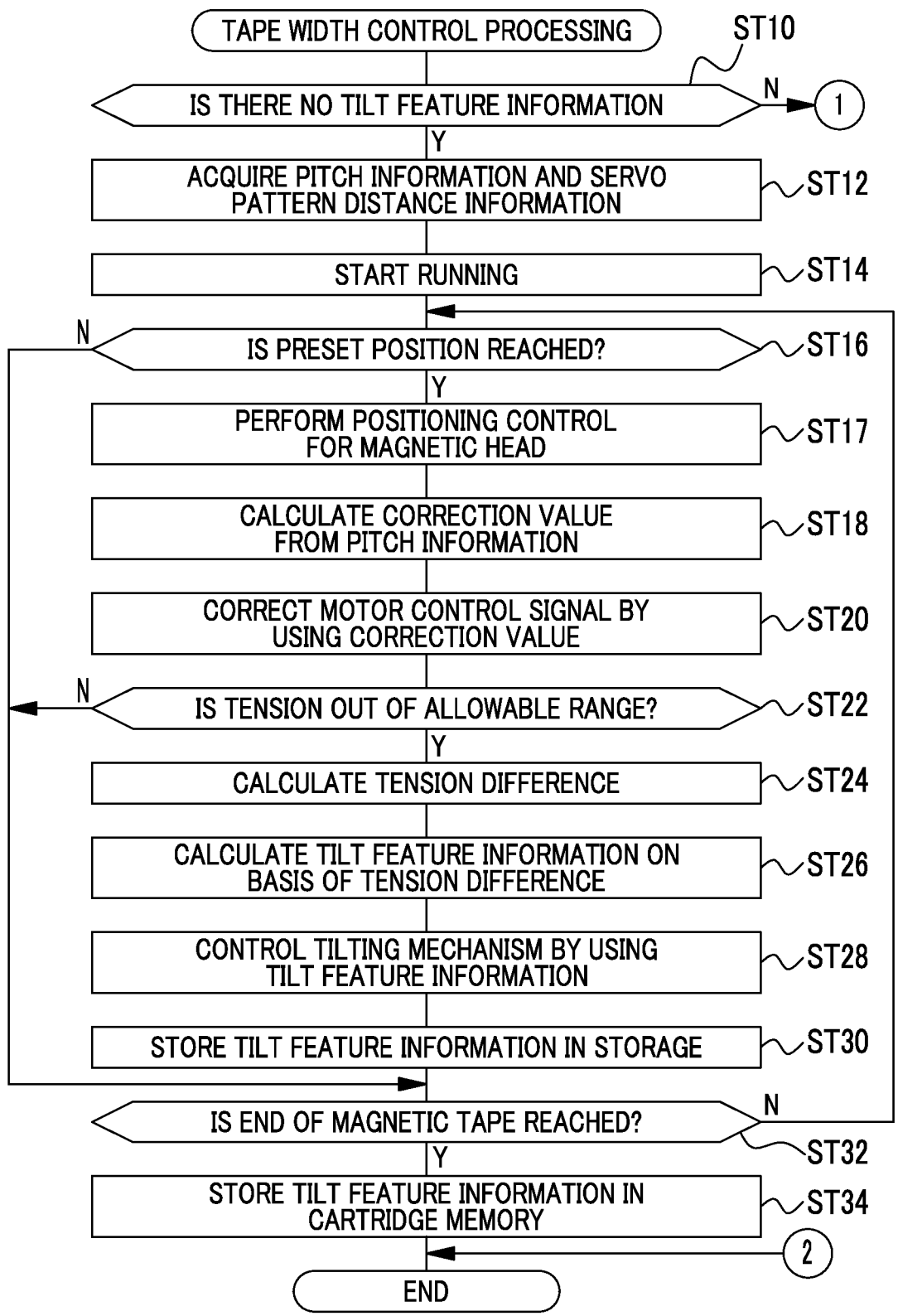
FIG. 31A is a flowchart showing an example of a flow of tape width control processing executed by the ASIC of the magnetic tape drive.
Figure 31B:
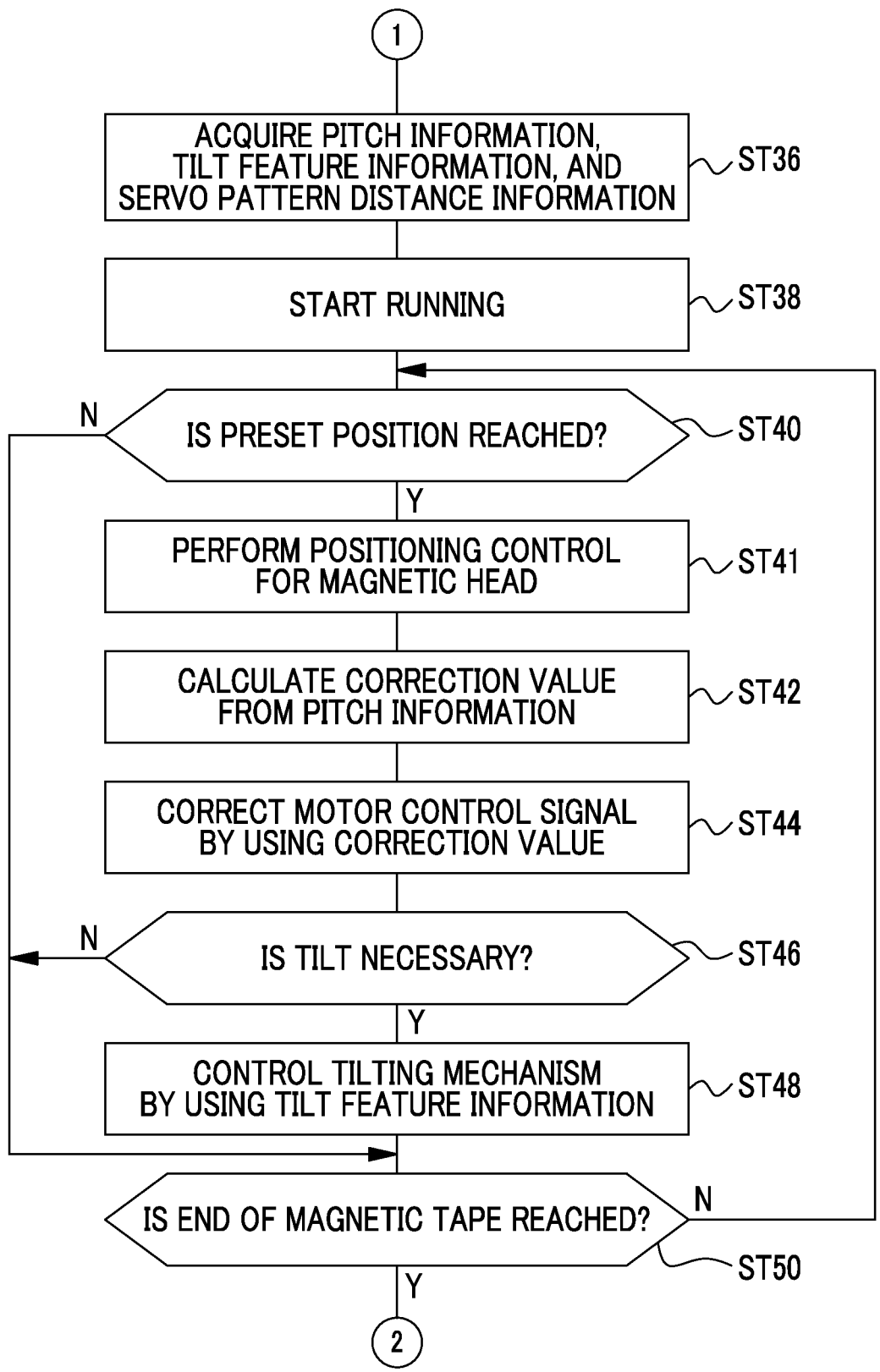
FIG. 31B is a continuation of the flowchart shown in FIG. 31A.

FIGS. 31A and 31B are flowcharts showing an example of a flow of tape width control processing executed by the ASIC 120 of the magnetic tape drive 30.

In the tape width control processing shown in FIG. 31A, first, in Step ST10, the running control unit 140 determines whether or not the tilt feature information 144 is stored in the NVM 96 of the cartridge memory 19. In Step ST10, in a case where the tilt feature information 144 is stored in the NVM 96 of the cartridge memory 19, a negative determination is made, and the process proceeds to Step ST36 shown in FIG. 31B. In Step ST10, in a case where the tilt feature information 144 is not stored in the NVM 96 of the cartridge memory 19, an affirmative determination is made, and the tape width control processing proceeds to Step ST12.

In Step ST12, the running control unit 140 acquires at least one of the pitch information 142 or the servo pattern distance information 148 from the NVM 96 of the cartridge memory 19 via the CPU 94 and the noncontact reading and writing device 50. The running control unit 140 stores the pitch information 142 and the servo pattern distance information 148, which are acquired, in the storage 122. In a case where the pitch information 142 is stored in the storage 122 in this way, the running control unit 140 does not need to acquire the pitch information 142 from the NVM 96 of the cartridge memory 19 again. Further, in a case where the servo pattern distance information 148 is stored in the storage 122, the position detection unit 121 does not need to acquire the servo pattern distance information 148 from the NVM 96 of the cartridge memory 19 again.

In the next Step ST14, the running control unit 140 controls the feeding motor 40 and the winding motor 44 to start running of the magnetic tape MT.

In the next Step ST16, the running control unit 140 determines whether or not the position of the magnetic head 36 with respect to the magnetic tape MT has reached a preset position. The preset position indicates a position of one of the plurality of locations spaced apart from each other over the entire length of the magnetic tape MT. For example, whether or not the preset position is reached may be determined on the basis of the servo signal input from the servo reading element WSR to the position detection unit 121, may be determined on the basis of an elapsed time from the start of running of the magnetic tape MT, or may be determined on the basis of amounts of drive of the feeding motor 40 and of the winding motor 44.

In Step ST16, in a case where the position of the magnetic head 36 with respect to the magnetic tape MT has not reached the preset position, a negative determination is made, and the tape width control processing proceeds to Step ST32. In Step ST16, in a case where the position of the magnetic head 36 with respect to the magnetic tape MT has reached the preset position, an affirmative determination is made, and the tape width control processing proceeds to Step ST17.

In Step ST17, the position detection unit 121 uses the recording head side servo signals to calculate the distance D of the servo pattern 51 in each of the servo bands SB read by the servo reading elements WSR1 and WSR2.

The position detection unit 121 acquires the servo position corresponding to the calculated distance D from the servo pattern distance information 148 acquired in Step ST12. The acquired servo position is the servo position of the servo reading element WSR in each servo band SB. The position detection unit 121 detects an average value of the servo position of the servo reading element WSR1 and the servo position of the servo reading element WSR2 as the widthwise position of the recording head 36A.

In a case where the servo position matching the calculated distance D is not defined in the servo pattern distance information 148, the position detection unit 121 can detect the servo position corresponding to the calculated distance D by performing interpolation of the servo position using the calculated distance D and the distance D of the servo position defined in the servo pattern distance information 148.

For example, in a case where the calculated distance D is "22.001 μm", the calculated distance D is included in a range of the distance D corresponding to the servo positions "1" and "2" in the servo pattern distance information 148 shown in FIG. 24. Therefore, the position detection unit 121 need only obtain the servo position corresponding to the calculated distance D by performing interpolation between the distance D corresponding to the servo position "1" and the distance D corresponding to the servo position "2". A known interpolation method is used for the interpolation of the servo position. Specifically, for example, in addition to linear interpolation, nonlinear interpolation, such as Lagrange interpolation and spline interpolation, is used.

In a case where the servo position matching the calculated distance D is not defined in the servo pattern distance information 148, the position detection unit 121 may set a servo position corresponding to the distance D closest to the calculated distance D as the servo position corresponding to the calculated distance D.

Further, the position detection unit 121 uses the reading head side servo signals to calculate the distance D of the servo pattern 51 in each of the servo bands SB read by the servo reading elements RSR1 and RSR2. Hereinafter, the position detection unit 121 performs the same processing as the processing related to the detection of the widthwise position of the recording head 36A to detect the widthwise position of the reading head 36B.

The servo control unit 123 performs a positioning control for the recording head 36A by controlling the first moving mechanism 129A such that the detected widthwise position of the recording head 36A approaches the recording head side target position. As a result, the widthwise position of the recording head 36A moves to the recording head side target position.

In addition, the servo control unit 123 performs the positioning control for the reading head 36B by controlling the second moving mechanism 129B such that the detected widthwise position of the reading head 36B approaches the reading head side target position. As a result, the widthwise position of the reading head 36B moves to the reading head side target position.

In Step ST18, the running control unit 140 substitutes the pitch specified from the pitch information 142 acquired in Step ST12 into the arithmetic expression 146 to calculate the feeding motor control signal correction value and the winding motor control signal correction value from the arithmetic expression 146.

The pitch specified from the pitch information 142 is a pitch that is obtained by using the pitch information 142 and that corresponds to the servo positions representing the widthwise position of the magnetic head 36 detected in Step ST17. That is, the running control unit 140 acquires the pitch for correctly recording and/or reading data with respect to the designated data track DT in the data band DB, for each widthwise position of the magnetic head 36.

Therefore, the feeding motor control signal correction value and the winding motor control signal correction value for correctly recording and/or reading data with respect to the designated data track DT in the data band DB, at the widthwise position of the magnetic head 36 moved in Step ST17, are calculated by the arithmetic expression 146.

In the next Step ST20, the running control unit 140 corrects the feeding motor control signal with the feeding motor control signal correction value calculated in Step ST18, and corrects the winding motor control signal with the winding motor control signal correction value calculated in Step ST18. The running control unit 140 calculates the tension applied to the magnetic tape MT on the basis of the motor control signal corrected in Step ST18, and outputs the tension information indicating the calculated tension to the tilt control unit 136.

The corrected feeding motor control signal is supplied to the feeding motor 40, and the corrected winding motor control signal is supplied to the winding motor 44. As a result, the drive of the feeding motor 40 and of the winding motor 44 is controlled, and the width of the magnetic tape MT is adjusted.

In the next Step ST22, the tilt control unit 136 determines whether or not the tension indicated by the tension information input from the running control unit 140 is out of the allowable range. In Step ST22, in a case where the tension indicated by the tension information input from the running control unit 140 is within the allowable range, a negative determination is made, and the tape width control processing proceeds to Step ST32. In Step ST22, in a case where the tension indicated by the tension information input from the running control unit 140 is out of the allowable range, an affirmative determination is made, and the tape width control processing proceeds to Step ST24.

In Step ST24, the tilt control unit 136 calculates the tension difference. That is, in a case where the tension indicated by the tension information is above the upper limit value of the allowable range, a difference between the tension indicated by the tension information and the upper limit value of the allowable range is calculated as the tension difference. In addition, in a case where the tension indicated by the tension information is below the lower limit value of the allowable range, a difference between the tension indicated by the tension information and the lower limit value of the allowable range is calculated as the tension difference.

In the next Step ST26, the tilt control unit 136 calculates the tilt feature information 144 on the basis of the tension difference. That is, the tilt feature information 144 is calculated by substituting the tension difference into the arithmetic expression 148.

In the next Step ST28, the tilt control unit 136 controls the tilting mechanism 131 by using the tilt feature information 144 calculated in Step ST26. That is, the tilt control unit 136 generates the tilting mechanism control signal corresponding to the tilt feature information 144 and supplies the generated tilting mechanism control signal to the tilting mechanism 131 to operate the tilting mechanism 131 to tilt the magnetic head 36 (to adjust the direction of the tilt and the angle of the tilt of the magnetic head 36).

In the next Step ST30, the tilt control unit 136 stores the tilt feature information 144 calculated in Step ST26 in the storage.

In the next Step ST32, the running control unit 140 determines whether or not a reference position of the magnetic head 36 (for example, the servo reading element RSR1 in the reading head 36B) has reached the end of the magnetic tape MT. In Step ST32, in a case where the reference position of the magnetic head 36 has not reached the end of the magnetic tape MT, a negative determination is made, and the tape width control processing proceeds to Step ST16. In Step ST32, in a case where the reference position of the magnetic head 36 has reached the end of the magnetic tape MT, an affirmative determination is made, and the tape width control processing proceeds to Step ST34.

In Step ST34, the ASIC 120 acquires the tilt feature information 144 from the storage 122 and outputs the acquired tilt feature information 144 to the noncontact reading and writing device 50. The noncontact reading and writing device 50 spatially transmits the write-in command of the tilt feature information 144 to the cartridge memory 19 as the command signal. The CPU 94 of the cartridge memory 19 performs write-in processing of writing the tilt feature information 144 into the NVM 96 in response to the command signal from the noncontact reading and writing device 50. As a result, the tilt feature information 144 is stored in the NVM 96. After the processing of Step ST34 is executed, the tape width control processing ends.

In Step ST36 shown in FIG. 31B, the ASIC 120 acquires the pitch information 142, the tilt feature information 144, and the servo pattern distance information 148 from the NVM 96 of the cartridge memory 19 via the CPU 94 and the noncontact reading and writing device 50.

In the next Step ST38, the running control unit 140 controls the feeding motor 40 and the winding motor 44 to start running of the magnetic tape MT.

In the next Step ST40, the running control unit 140 determines whether or not the position of the magnetic head 36 with respect to the magnetic tape MT has reached the preset position. In Step ST40, in a case where the position of the magnetic head 36 with respect to the magnetic tape MT has not reached the preset position, a negative determination is made, and the tape width control processing proceeds to Step ST50. In Step ST40, in a case where the position of the magnetic head 36 with respect to the magnetic tape MT has reached the preset position, an affirmative determination is made, and the tape width control processing proceeds to Step ST41.

In Step ST41, the running control unit 140 detects the widthwise position of the magnetic head 36 by using the servo pattern distance information 148 acquired in Step ST36 and the servo signal. Further, the servo control unit 123 performs the positioning control for the magnetic head 36 by controlling the first moving mechanism 129A and the second moving mechanism 129B such that the widthwise position of the magnetic head 36 approaches the target position.

In Step ST42, the running control unit 140 substitutes the pitch specified from the pitch information 142 acquired in Step ST36 into the arithmetic expression 146 to calculate the feeding motor control signal correction value and the winding motor control signal correction value from the arithmetic expression 146.

In the next Step ST44, the running control unit 140 corrects the feeding motor control signal with the feeding motor control signal correction value calculated in Step ST18, and corrects the winding motor control signal with the winding motor control signal correction value calculated in Step ST18.

In the next Step ST46, the tilt control unit 136 determines whether or not it is necessary to tilt the magnetic head 36 (whether or not it is necessary to adjust the direction of the tilt and the angle of the tilt of the magnetic head 36) by referring to the tilt feature information 144 acquired in Step ST36. In Step ST46, in a case where it is not necessary to tilt the magnetic head 36, a negative determination is made, and the tape width control processing proceeds to Step ST50. In Step ST46, in a case where it is necessary to tilt the magnetic head 36, an affirmative determination is made, and the tape width control processing proceeds to Step ST48.

In Step ST48, the tilt control unit 136 controls the tilting mechanism 131 by using the tilt feature information 144 acquired in Step ST36.

In the next Step ST50, the running control unit 140 determines whether or not the reference position of the magnetic head 36 has reached the end of the magnetic tape MT. In Step ST50, in a case where the reference position of the magnetic head 36 has not reached the end of the magnetic tape MT, a negative determination is made, and the tape width control processing proceeds to Step ST40. In Step ST50, in a case where the reference position of the magnetic head 36 has reached the end of the magnetic tape MT, an affirmative determination is made, and the tape width control processing ends.

As described above, in the present embodiment, the tilt feature information 144 is stored in the NVM 96 of the cartridge memory 19. The magnetic tape cartridge 10 on which the cartridge memory 19 having the NVM 96 that stores the tilt feature information 144 is mounted is also used by being loaded into the magnetic tape drive 30 other than the reference drive.

In a case where the magnetic tape cartridge 10 configured as described above is loaded into the magnetic tape drive 30, the magnetic tape MT in the magnetic tape cartridge 10 is pulled out, and a recording operation or a reading operation is performed by the magnetic head 36, the tilt feature information 144 is acquired from the NVM 96 of the cartridge memory 19 by the tilt control unit 136 of the magnetic tape drive 30. Then, the tilt control unit 136 controls the tilting mechanism 131 such that the tilt of the magnetic head 36 becomes the tilt corresponding to the tilt feature information 144. Accordingly, with the present configuration, it is possible to contribute to the correction of the positional relationship between the magnetic tape MT and the plurality of magnetic elements even in a case where the magnetic tape MT is deformed in the width direction WD.

In addition, in the present embodiment, the tilt feature information 144 includes information indicating the direction of the tilt of the magnetic head 36. Accordingly, with the present configuration, it is possible to contribute to the highly accurate correction of the positional relationship between the magnetic tape MT and the plurality of magnetic elements even in a case where the magnetic tape MT is deformed in the width direction WD, as compared with a case where the tilt feature information 144 does not include the information indicating the direction of the tilt of the magnetic head 36.

In addition, in the present embodiment, the tilt feature information 144 includes information indicating the angle of the tilt of the magnetic head 36. Accordingly, with the present configuration, it is possible to contribute to the highly accurate correction of the positional relationship between the magnetic tape MT and the plurality of magnetic elements even in a case where the magnetic tape MT is deformed in the width direction WD, as compared with a case where the tilt feature information 144 does not include the information indicating the angle of the tilt of the magnetic head 36.

Further, in the present embodiment, adjacent tracks among the plurality of data tracks DT, that is, the odd-numbered data track DTn_mO and the even-numbered data track DTn_mE, are assigned directions opposite to each other as the directions of the tilt of the disposition direction of the plurality of recording head side magnetic elements with respect to the width direction WD. With this, reading and writing are performed while changing the direction (azimuth) of the tilt of the recording head 36A for each data track DT. Further, in the present embodiment, adjacent tracks among the plurality of data tracks DT, that is, the odd-numbered data track Dn_mO and the even-numbered data track Dn_mE, are assigned directions opposite to each other as the directions of the tilt of the disposition direction of the plurality of reading head side magnetic elements with respect to the width direction WD. Therefore, during reading (reproduction), the reading element DR is less likely to exert a magnetic influence on the data track DT adjacent to the data track DT to be originally read (crosstalk is less likely to occur). In other words, the azimuth loss is small (nearly zero) in a case where the reading is performed with respect to the data track DT of which the azimuth matches the reading element DR, and the azimuth loss increases in a case where reading is performed with respect to the data track DT (for example, the adjacent data track DT) of which the azimuth does not match the reading element DR.

Further, in the present embodiment, the cartridge memory 19 has the NVM 96 where data is read and written in a noncontact manner by the noncontact reading and writing device 50. Accordingly, with the present configuration, the pitch information 142 and the tilt feature information 144 can be stored without physically damaging the cartridge memory 19, as compared with a case where data is read and written in contact with some kind of memory or the like.

Further, in the present embodiment, the tension applied to the magnetic tape MT is adjusted on the basis of the pitch information 142. Accordingly, with the present configuration, it is possible to correct the positional relationship between the magnetic tape MT and the plurality of magnetic elements even in a case where the magnetic tape MT is deformed in the width direction WD. Further, since the tilt of the magnetic head 36 is also adjusted on the basis of the tilt feature information 144, the positional relationship between the magnetic tape MT and the plurality of magnetic elements can be corrected with high accuracy as compared with a case where only the tension applied to the magnetic tape MT is adjusted.

In the present embodiment, the pitch information 142 includes the pitch for each servo position in the plurality of servo bands SB. Accordingly, with the present configuration, the positional relationship between the magnetic tape MT and the plurality of magnetic elements can be corrected with high accuracy as compared with a case where the pitch is set to a fixed value regardless of the widthwise position of the magnetic head 36.

Further, in the present embodiment, the servo positions in the servo band SB are specified using the servo pattern distance information 148 in which the plurality of servo positions in each of the servo bands SB and the distances D in the respective servo positions between the pair of magnetization regions 51A and 51B constituting the servo pattern 51 formed on each of the servo bands SB are associated with each other. Accordingly, with the present configuration, the servo position of the servo reading element SR in each of the servo bands SB can be specified by measuring the distance D from the magnetization region 51A to the magnetization region 51B using the change of the pulse read by the servo reading element SR.

Further, in the present embodiment, the pitch between the servo patterns 51 in the width direction WD is calculated on the basis of a result of reading the servo patterns 51 of the adjacent servo bands SB in the width direction WD through the plurality of servo reading elements SR and the distance between the plurality of servo reading elements, in a stage before data recording is performed by the magnetic tape drive 30 with respect to the magnetic tape MT. Accordingly, with the present configuration, in a case where the distance between the servo reading elements is measured in advance, the pitch information 142 can be generated using the distances D at the servo positions at which the plurality of servo reading elements SR are located.

Figure 32:
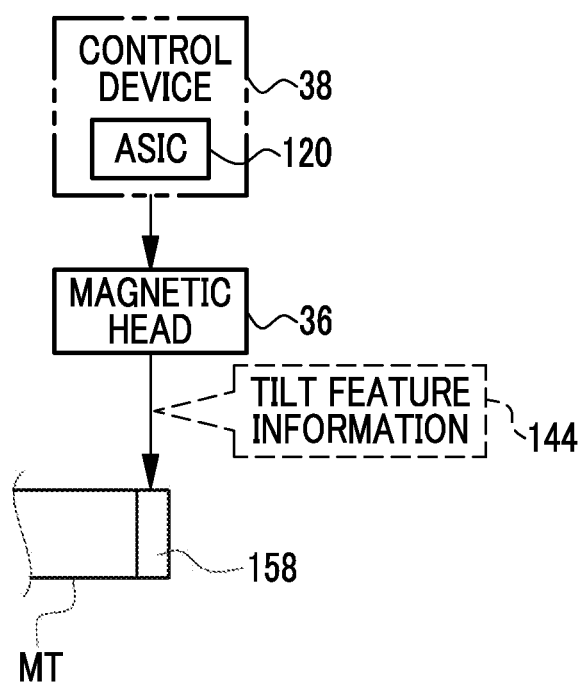
FIG. 32 is a conceptual diagram showing an example of an aspect in which the tilt feature information is written into a BOT region.

In the above-described embodiment, although the NVM 96 of the cartridge memory 19 has been illustrated as the storage medium, the technology of the present disclosure is not limited thereto. For example, as shown in FIG. 32, at a time of any one of a case where the magnetic tape cartridge 10 is initially loaded or a case where the magnetic tape MT is initialized, the ASIC 120 of the control device 38 may control the operation of the magnetic head 36 to write the tilt feature information 144 into a BOT region 158 provided at the head of the magnetic tape MT. In a case where the tilt feature information 144 is written into the BOT region 158, the ASIC 120 reads the tilt feature information 144 from the BOT region 158 by controlling the operation of the magnetic head 36. The BOT region 158 is an example of a "partial region of a magnetic tape" according to the technology of the present disclosure.

In this way, in the example shown in FIG. 32, the BOT region 158 of the magnetic tape MT is used as the storage medium. Accordingly, with the present configuration, it is possible to save labor to prepare the cartridge memory 19 or to store the tilt feature information 144 in the NVM 96 of the cartridge memory 19.

In the example shown in FIG. 32, an aspect example in which the tilt feature information 144 is written into the BOT region 158 is shown, but the technology of the present disclosure is not limited thereto. For example, the pitch information 142, the servo pattern distance information 148, and/or the tilt feature information 144 may be written into the BOT region 158.

The pitch information 142, the servo pattern distance information 148, and/or the tilt feature information 144 may be stored in the BOT region 158 by the magnetic head 36 of the magnetic tape drive 30 disposed in a factory at a time of any one of a stage in which the magnetic tape cartridge 10 is manufactured, a stage in which the magnetic tape cartridge 10 is inspected, or a stage in which the magnetic tape cartridge 10 is shipped.

Figure 33:
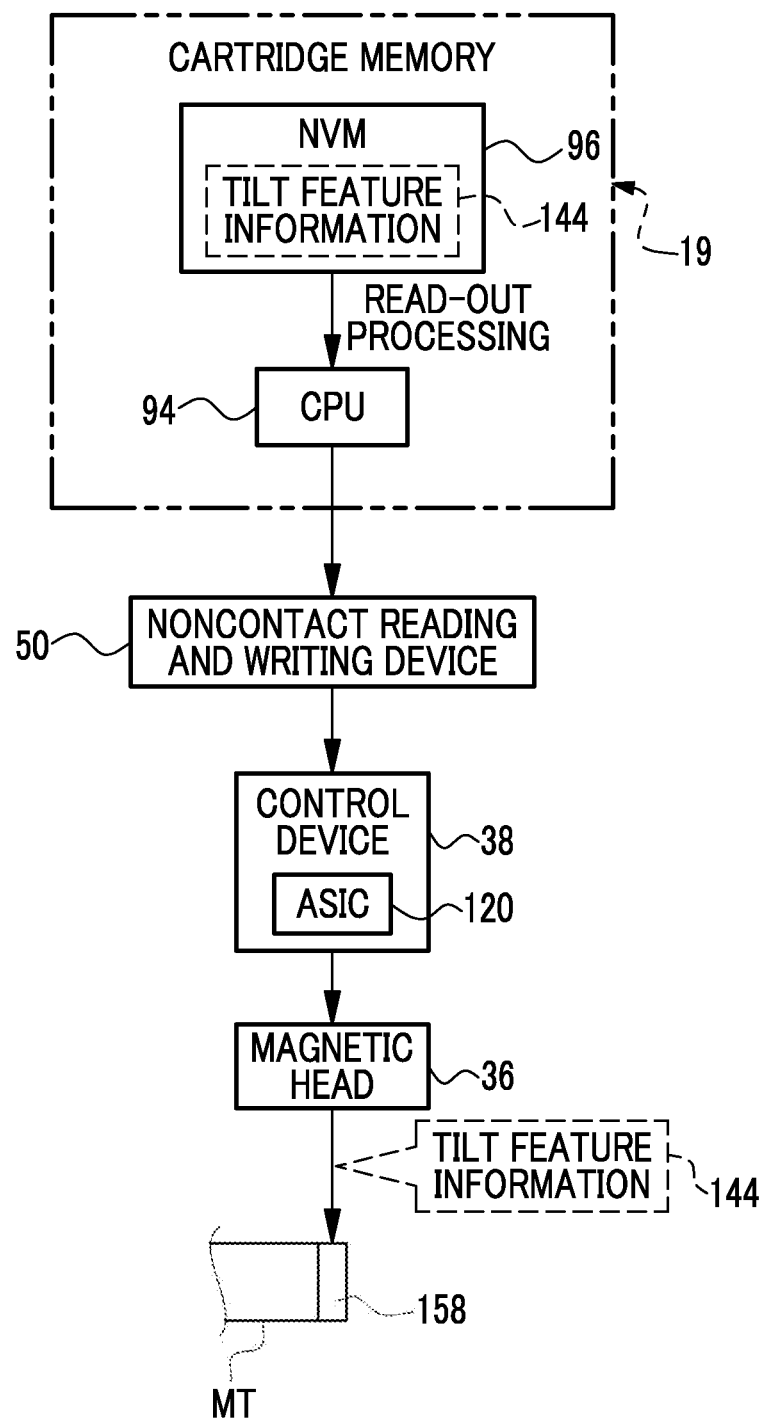
FIG. 33 is a conceptual diagram showing an example of an aspect in which the tilt feature information stored in the cartridge memory is written into the BOT region.

Further, as shown in FIG. 33 as an example, the tilt feature information 144 read out from the cartridge memory 19 by the noncontact reading and writing device 50 may be written into the BOT region 158 by the ASIC 120. In this case, the tilt feature information 144 is stored in both the NVM 96 and the BOT region 158. For this reason, it is possible to verify the reliability of the tilt feature information 144 by matching the tilt feature information 144 stored in the NVM 96 and the tilt feature information 144 stored in the BOT region 158 with each other. In addition, even in a case where a failure has occurred in any one of the NVM 96 or the BOT region 158, the tilt feature information 144 can be obtained from the other.

Further, in a case where the pitch information 142, the servo pattern distance information 148, and/or the tilt feature information 144 are stored in the cartridge memory 19, the pitch information 142, the servo pattern distance information 148, and/or the tilt feature information 144 read out from the cartridge memory 19 by the noncontact reading and writing device 50 may be written into the BOT region 158 by the ASIC 120.

Instead of or in addition to the BOT region 158, the pitch information 142, the servo pattern distance information 148, and/or the tilt feature information 144 may be stored in an EOT region (not shown) provided at the tail of the magnetic tape MT. In addition, the magnetic tape MT is not limited to the BOT region 158 and the EOT region, and, for example, a two-dimensional barcode or a matrix type two-dimensional code (for example, a QR code (registered trademark)) may be used as the storage medium.

In the above-described embodiment, an aspect example in which both the tension applied to the magnetic tape MT and the tilt of the magnetic head 36 are adjusted has been described, but the technology of the present disclosure is not limited thereto. For example, the tension applied to the magnetic tape MT is adjusted without basically tilting the magnetic head 36 (for example, see the positional relationship between the recording head 36A and the magnetic tape MT shown in FIG. 21), and the magnetic head 36 may be tilted only in a case where the tension applied to the magnetic tape MT is below the lower limit value of the allowable range.

Further, for example, the magnetic head 36 may be tilted according to the position of the data track DT without basically adjusting the tension applied to the magnetic tape MT. In this case, the tilt control unit 136 controls the tilting mechanism 131 to make the angle of the tilt of the magnetic head 36 shallow at a position with a wide width and to make the angle of the tilt of the magnetic head 36 deep at a position with a narrow width, depending on a width change of the entire length of the magnetic tape MT. Note that, in a case where the degree of change in the angle of the tilt of the magnetic head 36 exceeds a predetermined upper limit, the running control unit 140 adjusts the tension applied to the magnetic tape MT. That is, in a case where the angle of the tilt of the magnetic head 36 is not sufficient even when the angle of the tilt of the magnetic head 36 is made shallow at a position where the width of the magnetic tape MT is wide (in a case where the magnetic element cannot be located on the data track DT), the tension applied to the magnetic tape MT is strengthened. On the contrary, in a case where the angle of the tilt of the magnetic head 36 is not sufficient even when the angle of the tilt of the magnetic head 36 is made deep at a position where the width of the magnetic tape MT is narrow (in a case where the magnetic element cannot be located on the data track DT), the tension applied to the magnetic tape MT is weakened.

In the above-described embodiment, an aspect example in which the tilt feature information 144 is acquired by the tilt control unit 136 in a stage before data is recorded on the magnetic tape MT has been described, but the technology of the present disclosure is not limited thereto. For example, the magnetic tape drive 30 may start a data recording operation with respect to the magnetic tape MT in a state in which the tension applied to the magnetic tape MT is held at a defined value, and may adjust the angle of the tilt of the magnetic head 36 in a case where the tension applied to the magnetic tape MT approaches the upper and lower limit values of the allowable range while acquiring information for specifying the width of the magnetic tape MT through the servo reading element at any time and adjusting the tension applied to the magnetic tape MT in real time (strengthening the tension in a case where the width of the magnetic tape MT is wide or weakening the tension in a case where the width of the magnetic tape MT is narrow). In this case, the magnetic tape drive 30 need only write the tilt feature information 144 into, for example, the cartridge memory 19 and/or the BOT region 158 after the end of the data recording operation with respect to the magnetic tape MT.

In the above-described embodiment, although the recording head 36A and the reading head 36B have been illustrated, the technology of the present disclosure is not limited thereto, and a magnetic head in which the recording head 36A and the reading head 36B are integrated may be used. That is, the technology of the present disclosure is established even with a magnetic head having a magnetic element (a magnetic element in which the recording element DW and the reading element DR are paired) in which the recording element DW and the reading element DR are integrated.

In the above-described embodiment, although an aspect example in which both the data reading and the data writing-in with respect to the magnetic tape MT are performed by the magnetic head 36 has been described, the technology of the present disclosure is not limited thereto, and one of the data reading and the data wiring-in with respect to the magnetic tape MT may be performed.

In the above-described embodiment, although an aspect example in which the cartridge memory 19 is accommodated in the case 12 has been described, the technology of the present disclosure is not limited thereto, and the cartridge memory 19 may be attached to an outer surface of the case 12.

As the hardware resource that executes the processing of the control device 38, various processors described below can be used. Examples of the processors include a CPU which is a general-purpose processor functioning as a hardware resource that executes software, that is, a program, to execute the processing. Further, examples of the processors include a dedicated electrical circuit which is a processor having a dedicated circuit configuration designed for executing specific processing, such as an FPGA, a PLD, or the illustrated ASIC 120. A memory is incorporated or connected to any processor, and any processor executes the processing using the memory.

The hardware resource that executes the processing of the control device 38 may be composed of one of various processors or may be composed of a combination of two or more processors of the same type or different types (for example, a combination of a plurality of FPGAs or a combination of a CPU and an FPGA). Alternatively, the hardware resource that executes the processing of the control device 38 may be one processor.

A first example in which the hardware resource is composed of one processor is an aspect in which one or more CPUs and software are combined to constitute one processor and the processor functions as the hardware resource that executes the processing. A second example is an aspect in which a processor that realizes the functions of the entire system including a plurality of hardware resources that execute the processing with one IC chip is used, as typified by an SoC or the like. In this way, the processing of the control device 38 is realized using one or more of various processors as the hardware resource.

Furthermore, as the hardware structures of various processors, more specifically, an electrical circuit into which circuit elements, such as semiconductor elements, are combined can be used. Further, the processing of the control device 38 described above is merely an example. Accordingly, it goes without saying that unnecessary steps may be deleted, new steps may be added, or a processing order may be changed without departing from the gist.

The technology of the present disclosure can also appropriately combine the above-mentioned various embodiments and/or various modification examples. In addition, it goes without saying that the technology of the present disclosure is not limited to the above-described embodiment and various configurations may be employed without departing from the gist. Furthermore, in addition to the program, the technology of the present disclosure extends to a storage medium that stores the program in a non-transitory manner.

The content of the above description and the content of the drawings are detailed description of parts according to the technology of the present disclosure, and are merely an example of the technology of the present disclosure. For example, the above description related to configurations, functions, actions, and advantageous effects is description related to an example of the configurations, functions, actions, and advantageous effects of the parts according to the technology of the present disclosure. Accordingly, it is needless to say that unnecessary parts may be deleted, new elements may be added, or replacement may be made to the content of the above description and the content of the drawings without departing from the gist of the technology of the present disclosure. Further, in order to avoid confusion and to facilitate understanding of the parts according to the technology of the present disclosure, description related to common technical knowledge and the like that does not require particular description to enable implementation of the technology of the present disclosure is omitted from the content of the above description and the content of the drawings.

In the present specification, "A and/or B" has the same meaning as "at least one of A or B". That is, "A and/or B" means that only A may be used, only B may be used, or a combination of A and B may be used. In addition, in the present specification, the same concept as "A and/or B" is also applied to a case where three or more matters are expressed by "and/or".

All documents, patent applications, and technical standards described in the present specification are incorporated in the present specification by reference to the same extent as in a case where the individual documents, patent applications, and technical standards were specifically and individually stated to be incorporated by reference.

What is claimed is:

1. A magnetic tape system comprising:
a cartridge including:
a case in which a magnetic tape is accommodated; and
a storage medium provided in the case,
wherein the storage medium stores tilt feature information over an entire length of the magnetic tape at preset intervals, a preset interval being a predetermined length,
wherein the tilt feature information is information about a plurality of magnetic elements that perform at least one of reading from the magnetic tape or writing of data on the magnetic tape, the information indicating a feature of a disposition direction of the plurality of magnetic elements with respect to a width direction of the magnetic tape,
the system further including a tension controller,
wherein the tilt feature information is adjusted by tension information of the magnetic tape at the preset intervals, the tension information determined by the tension controller,
in a case in which the tension information is greater than a preset upper limit value of an allowable range, the tilt feature information is adjusted by using a difference between the tension information and the preset upper limit value, and
in a case in which the tension information is smaller than a preset lower limit value of the allowable range, the tilt feature information is adjusted by using a difference between the tension information and the preset lower limit value.

2. The magnetic tape system according to claim 1,
wherein the tilt feature information includes a direction of the tilt of the disposition direction.

3. The magnetic tape system according to claim 2,
wherein the magnetic tape has a plurality of tracks,
the plurality of magnetic elements correspond to the plurality of tracks, respectively, and
adjacent tracks, among the plurality of tracks, are assigned directions opposite to each other as the direction.

4. The magnetic tape system according to claim 1,
wherein the tilt feature information includes an angle of the tilt of the disposition direction.

5. The magnetic tape system according to claim 1,
wherein the storage medium includes an internal memory of a noncontact communication medium where reading and writing of information are performed in a noncontact manner by a noncontact reading and writing device.

6. The magnetic tape system according to claim 1,
wherein the storage medium includes a partial region of the magnetic tape.

7. The magnetic tape system according to claim 1,
wherein the storage medium further stores pitch information capable of specifying a pitch in the width direction between a plurality of servo bands.

8. The magnetic tape system according to claim 7,
wherein the pitch information includes pitches at a plurality of positions in the width direction in the plurality of servo bands.

9. The magnetic tape system according to claim 8,
wherein the storage medium further stores servo pattern distance information in which the plurality of positions in the width direction in the plurality of servo bands and distances in an entire length direction of the magnetic tape at the plurality of positions between a pair of magnetization regions constituting a servo pattern formed in each of the plurality of servo bands are associated with each other, and
the pitches correspond to positions of the plurality of magnetic elements in the width direction in the plurality of servo bands, the positions being detected by using the servo pattern distance information.

10. The magnetic tape system according to claim 8,
wherein the pitches are calculated on the basis of a result of reading the plurality of servo bands through a plurality of servo reading elements and a distance between the plurality of servo reading elements, in a stage before data recording is performed by a magnetic tape drive with respect to the magnetic tape.

11. The magnetic tape system according to claim 1, the system further comprising:
a tilting mechanism that tilts a head on which the plurality of magnetic elements are mounted toward an entire length direction side of the magnetic tape with respect to the width direction of the magnetic tape; and
a control device that controls the tilting mechanism according to the tilt feature information stored in the storage medium.

12. The magnetic tape system according to claim 11,
wherein the storage medium further stores pitch information capable of specifying a pitch in the width direction between a plurality of servo bands, and
the tension controller adjusts tension applied to the magnetic tape, on the basis of the pitch information.

13. The magnetic tape system according to claim 12,
wherein the pitch information includes pitches at a plurality of positions in the width direction in the plurality of servo bands.

14. The magnetic tape system according to claim 13,
wherein the control device calculates the pitches on the basis of a result of reading the plurality of servo bands through a plurality of servo reading elements and a distance between the plurality of servo reading elements, in a stage before data recording is performed by the magnetic tape system with respect to the magnetic tape.

15. A method of operating a magnetic tape drive, comprising:
acquiring the tilt feature information stored in the storage medium provided in the magnetic tape system according to claim 1; and
controlling a tilting mechanism that tilts a head on which the plurality of magnetic elements are mounted toward an entire length direction side of the magnetic tape with respect to the width direction of the magnetic tape, according to the acquired tilt feature information.

16. The method of operating a magnetic tape drive according to claim 15, further comprising:
applying tension to the magnetic tape.

17. The method of operating a magnetic tape drive according to claim 15,
wherein the storage medium further stores pitch information capable of specifying a pitch in the width direction between a plurality of servo bands, and
the method of operating a magnetic tape drive further comprises adjusting tension applied to the magnetic tape, on the basis of the pitch information.

18. The method of operating a magnetic tape drive according to claim 17,
wherein the pitch information includes pitches at a plurality of positions in the width direction in the plurality of servo bands.

19. The method of operating a magnetic tape drive according to claim 18,
- wherein the storage medium further stores servo pattern distance information in which the plurality of positions in the width direction in the plurality of servo bands and distances in an entire length direction of the magnetic tape at the plurality of positions between a pair of magnetization regions constituting a servo pattern formed in each of the plurality of servo bands are associated with each other, and
- the method of operating a magnetic tape drive further comprises adjusting the tension applied to the magnetic tape by using the pitches corresponding to positions of the plurality of magnetic elements in the width direction in the plurality of servo bands, the positions being detected by using the servo pattern distance information.

20. The method of operating a magnetic tape drive according to claim 18, further comprising:
- calculating the pitches on the basis of a result of reading the plurality of servo bands through a plurality of servo reading elements and a distance between the plurality of servo reading elements, in a stage before data recording is performed by the magnetic tape drive with respect to the magnetic tape.

21. The magnetic tape system of claim 1, wherein the storage medium stores the tilt feature information in advance.

* * * * *